United States Patent
Zhang et al.

(10) Patent No.: US 11,621,921 B2
(45) Date of Patent: Apr. 4, 2023

(54) SYSTEMS AND METHODS FOR TRANSPORT CAPACITY SCHEDULING

(71) Applicant: BEIJING DIDI INFINITY TECHNOLOGY AND DEVELOPMENT CO., LTD., Beijing (CN)

(72) Inventors: Lingyu Zhang, Beijing (CN); Gongzheng Wang, Beijing (CN); Niping Zhang, Beijing (CN); Lu Li, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 237 days.

(21) Appl. No.: 16/713,047

(22) Filed: Dec. 13, 2019

(65) Prior Publication Data

US 2020/0120037 A1   Apr. 16, 2020

Related U.S. Application Data

(63) Continuation of application No. PCT/CN2018/086724, filed on May 14, 2018.

(30) Foreign Application Priority Data

Jun. 14, 2017 (CN) .......................... 201710447357.8
Jun. 21, 2017 (CN) .......................... 201710476717.7
Jul. 19, 2017 (CN) .......................... 201710590255.1

(51) Int. Cl.
*H04L 47/52*       (2022.01)
*H04L 47/283*      (2022.01)
(Continued)

(52) U.S. Cl.
CPC .......... *H04L 47/522* (2013.01); *H04L 47/283* (2013.01); *H04L 47/525* (2013.01);
(Continued)

(58) Field of Classification Search
CPC .. H04L 67/16; G06Q 10/06313; G06Q 50/30; G06Q 50/28
See application file for complete search history.

(56) References Cited

U.S. PATENT DOCUMENTS 10,395,333 B2 *   8/2019  Dicker ............... G06Q 10/1097
10,638,264 B1 *   4/2020  Pao .................... H04W 4/021
(Continued)

FOREIGN PATENT DOCUMENTS

CN    1932921 A      3/2007
CN    101996485 A    3/2011
(Continued)

OTHER PUBLICATIONS

Shuo Li et al., Taxi Supply and Demand Matching Model and Its Application, China Science and Technology Information, 17: 57-60, 2016.
(Continued)

*Primary Examiner* — Redentor Pasia
(74) *Attorney, Agent, or Firm* — Metis IP LLC

(57) ABSTRACT

The present disclosure relates to systems and methods for transport capacity scheduling. The systems and methods may determine a target region, wherein a plurality of service requests that satisfy a preset condition initiate from the target region. The systems and methods may determine a non-busy region based on information of the target region. The non-busy region may include one or more available service providers that are free to accept a service request. The systems and methods may transmit, via a network, a scheduling instruction associated with the plurality of service
(Continued)

requests to a user terminal associated with at least one of the one or more available service providers in the non-busy region. The scheduling instruction may include information inquiring whether the at least one of the one or more available service providers in the non-busy region agrees to go to the target region.

20 Claims, 31 Drawing Sheets

(51) Int. Cl.
*H04L 47/525* (2022.01)
*H04L 47/762* (2022.01)
*H04L 47/783* (2022.01)
*H04W 28/20* (2009.01)
*H04L 67/51* (2022.01)
*H04L 67/52* (2022.01)

(52) U.S. Cl.
CPC .......... *H04L 47/762* (2013.01); *H04L 47/783* (2013.01); *H04L 67/51* (2022.05); *H04L 67/52* (2022.05); *H04W 28/20* (2013.01)

(56) References Cited

U.S. PATENT DOCUMENTS

| | | | |
|---|---|---|---|
| 10,890,457 B2 * | 1/2021 | Yu | H04W 4/02 |
| 10,937,115 B2 * | 3/2021 | Stumpf | G06Q 10/063114 |
| 11,006,479 B2 * | 5/2021 | Pan | H04W 48/18 |
| 2013/0204524 A1 | 8/2013 | Fryer et al. | |
| 2014/0011522 A1 | 1/2014 | Lin et al. | |
| 2016/0209220 A1 * | 7/2016 | Laetz | G06Q 10/047 |
| 2016/0335576 A1 | 11/2016 | Peng | |
| 2017/0041743 A1 * | 2/2017 | Artzt | H04W 4/80 |
| 2017/0185948 A1 | 6/2017 | Magazinik et al. | |
| 2017/0284820 A1 * | 10/2017 | Dryjanski | G01C 21/343 |
| 2018/0101925 A1 * | 4/2018 | Brinig | G07F 17/0057 |
| 2018/0159921 A1 * | 6/2018 | Brinig | G06Q 50/30 |
| 2018/0240128 A1 * | 8/2018 | Lu | G06Q 30/018 |
| 2018/0259351 A1 * | 9/2018 | Broyles | G01C 21/3438 |
| 2018/0336653 A1 * | 11/2018 | Levi | G06Q 30/0284 |
| 2018/0338298 A1 * | 11/2018 | Pan | H04W 84/02 |
| 2018/0342113 A1 * | 11/2018 | Kislovskiy | G07C 5/008 |

FOREIGN PATENT DOCUMENTS

| | | |
|---|---|---|
| CN | 103985247 A | 8/2014 |
| CN | 104077915 A | 10/2014 |
| CN | 104320436 A | 1/2015 |
| CN | 104463509 A | 3/2015 |
| CN | 104599088 A | 5/2015 |
| CN | 104657933 A | 5/2015 |
| CN | 204423429 U | 6/2015 |
| CN | 204496697 U | 7/2015 |
| CN | 104850976 A | 8/2015 |
| CN | 104867065 A | 8/2015 |
| CN | 105139089 A | 12/2015 |
| CN | 105139228 A | 12/2015 |
| CN | 105405285 A | 3/2016 |
| CN | 105608886 A | 5/2016 |
| CN | 105719111 A | 6/2016 |
| CN | 105808784 A | 7/2016 |
| CN | 105825310 A | 8/2016 |
| CN | 105894359 A | 8/2016 |
| CN | 105956908 A | 9/2016 |
| CN | 106373387 A | 2/2017 |
| EP | 2860673 A1 | 4/2015 |
| JP | 2007249790 A | 9/2007 |
| JP | 2007249918 A | 9/2007 |
| JP | 2008269347 A | 11/2008 |
| SG | 191453 A1 | 7/2013 |
| WO | 2014106617 A1 | 7/2014 |
| WO | WO-2018217161 A1 * | 11/2018 ........... G06Q 10/047 |

OTHER PUBLICATIONS

Xiechang Lian et al., Study on Taxi Empty Driving and Countermeasures, Transformation and Innovation of Urban Transportation Development Model-Proceedings of the 2011 Annual Conference on Urban Transportation Planning in China, 2011, pp. 909-914.
First Office Action in Chinese Application No. 201710476717.7 dated Mar. 10, 2020, 18 pages.
Second Office Action in Chinese Application No. 201710447357.8 dated Jul. 23, 2020, 20 pages.
International Search Report in PCT/CN2017/104585 dated Mar. 20, 2018, 4 pages.
Written Opinion in PCT/CN2017/104585 dated Mar. 20, 2018, 4 pages.
Wang Xiaowen, Research and Implementation on Taxi Cruise Path Recommendation Method Based on Pick-up Hotspots Areas, Chinese Master's Theses Full-text Database Engineering Science and Technology Series II, 2016, 83 pages.
The Second Office Action in Chinese Application No. 201710476717.7 dated Sep. 23, 2020, 21 pages.
First Office Action in Chinese Application No. 201710590255.1 dated Sep. 3, 2020, 21 pages.
First Examination report in Australian Application No. 2018284492 dated Nov. 30, 2020, 9 pages.
Zou, Ying, Study on Bus Regional Scheduling Travel Plan Organizing Method, Journal of Transportation Systems Engineering and Information Technology, 7(3): 78-82, 2007.

* cited by examiner

1800

In response to a detection that a target region lacks service providers, transmitting a scheduling instruction to one or more available service providers in a candidate service region associated with the target region, wherein the scheduling instruction is configured to request the one or more available service providers to respond to indicate whether the one or more available service providers agree to go to the target region — 1810

In response to one or more acceptances indicating that the one or more available service providers agree to go to the target region, allocating service requests in the target region to the one or more available service providers — 1820

In response to a detection that a target region lacks service providers, obtaining transport capacities of service regions near the target region and determining at least one of the service regions with an abundant transport capacity as a candidate service region — 1910

Transmitting a scheduling instruction to one or more available service providers in the candidate service region, wherein the scheduling instruction is configured to request the one or more available service providers to respond to indicate whether the one or more available service providers agree to go to the target region — 1920

Determining a service time period for at least one of the one or more available service providers in the candidate service region based on a predetermined time period and at least one of a first time point at which the acceptance of the scheduling instruction from the at least one of the one or more available service providers is received or a second time point at which the at least one of the one or more available service providers arrives in the target region — 1930

Allocating the service requests in the target region to the at least one of one or more available service providers during the service time period — 1940

FIG. 19

SYSTEMS AND METHODS FOR TRANSPORT CAPACITY SCHEDULING

CROSS-REFERENCE TO RELATED APPLICATIONS

This application is a continuation of International Application No. PCT/CN2018/086724, filed on May 14, 2018, which designates the United States of America and claims priority to Chinese Patent Application No. 201710447357.8, filed on Jun. 14, 2017, Chinese Patent Application No. 201710476717.7, filed on Jun. 21, 2017, and Chinese Patent Application No. 201710590255.1, filed on Jul. 19, 2017, the contents of which are hereby incorporated by reference in their entirety.

TECHNICAL FIELD

The present disclosure generally relates to systems and methods for Online-to-Offline services, and in particular, to systems and methods for transport capacity scheduling.

BACKGROUND

With the development of Internet technology, Internet-based Online-to-Offline services (e.g., online taxi-hailing service) become increasingly popular. Service demands associated with the Online-to-Offline services may be different under different situations. For example, during different time periods (e.g., rush hours, non-rush hours), service demands in different regions (e.g., a central business district, a village) may be different. Therefore, it is desirable to provide systems and methods for transport capacity scheduling to meet the service demands efficiently.

SUMMARY

An aspect of the present disclosure relates to a system for transport capacity scheduling. The system may include at least one storage device including a set of instructions and at least one processor in communication with the at least one storage device. When executing the set of instructions, the at least one processor may be configured to cause the system to perform one or more of the following operations. The at least one processor may determine a target region, wherein a plurality of service requests that satisfy a preset condition initiate from the target region. The plurality of service requests may be initiated via a plurality of user terminals associated with a plurality of service requesters. The at least one processor may determine a non-busy region based on information of the target region. The non-busy region may include one or more available service providers that are free to accept a service request. The at least one processor may transmit, via a network, a scheduling instruction associated with the plurality of service requests to a user terminal associated with at least one of the one or more available service providers in the non-busy region. The scheduling instruction may include information inquiring whether the at least one of the one or more available service providers in the non-busy region agrees to go to the target region, wherein at least portion of the scheduling instruction may be displayed via a graphic user interface of an application executed by the user terminal.

Another aspect of the present disclosure relates to a method for transport capacity scheduling. The method may be implemented on a computing device having at least one processor, at least one storage device, and a communication platform connected to a network. The method may include one or more of the following operations. The at least one processor may determine a target region, wherein a plurality of service requests that satisfy a preset condition initiate from the target region. The plurality of service requests may be initiated via a plurality of user terminals associated with a plurality of service requesters. The at least one processor may determine a non-busy region based on information of the target region. The non-busy region may include one or more available service providers that are free to accept a service request. The at least one processor may transmit, via a network, a scheduling instruction associated with the plurality of service requests to a user terminal associated with at least one of the one or more available service providers in the non-busy region. The scheduling instruction may include information inquiring whether the at least one of the one or more available service providers in the non-busy region agrees to go to the target region, wherein at least portion of the scheduling instruction may be displayed via a graphic user interface of an application executed by the user terminal.

A further aspect of the present disclosure relates to a non-transitory computer readable medium. The non-transitory computer readable medium may include a set of instructions for transport capacity scheduling. When executed by at least one processor, the set of instructions may direct the at least one processor to effectuate a method. The method may include one or more of the following operations. The at least one processor may determine a target region, wherein a plurality of service requests that satisfy a preset condition initiate from the target region. The plurality of service requests may be initiated via a plurality of user terminals associated with a plurality of service requesters. The at least one processor may determine a non-busy region based on information of the target region. The non-busy region may include one or more available service providers that are free to accept a service request. The at least one processor may transmit, via a network, a scheduling instruction associated with the plurality of service requests to a user terminal associated with at least one of the one or more available service providers in the non-busy region. The scheduling instruction may include information inquiring whether the at least one of the one or more available service providers in the non-busy region agrees to go to the target region, wherein at least portion of the scheduling instruction may be displayed via a graphic user interface of an application executed by the user terminal.

In some embodiments, the at least one processor may determine a target radius and a target service request number. The at least one processor may divide a predetermined area into a plurality of candidate regions based on the target radius and the target service request number by using a clustering algorithm. For at least one of the plurality of candidate regions, the at least one processor may determine whether an allocation rate is less than an allocation rate threshold; determine whether a ratio of a number count of available service providers in the candidate region to a number count of service requests to be allocated in the candidate region is less than a ratio threshold based on a result of the determination that the allocation rate is less than the allocation rate threshold; and determine the candidate region as the target region based on a result of the determination that the ratio of the number count of available service providers in the candidate region to the number count of service requests to be allocated in the candidate region is less than the ratio threshold.

In some embodiments, the at least one processor may determine a plurality of data pairs, each of the plurality of data pairs including a predetermined radius and a predetermined service request number. The at least one processor may determine a plurality of distribution entropies corresponding to the plurality of data pairs based on the clustering algorithm. The at least one processor may identify a maximum distribution entropy among the plurality of distribution entropies. The at least one processor may select a data pair among the plurality of data pairs that correspond to the maximum distribution entropy. The at least one processor may determine a predetermined radius and a predetermined service request number corresponding to the selected data pair as the target radius and the target service request number.

In some embodiments, the at least one processor may determine a boundary of the target region. The at least one processor may obtain an expansion parameter associated with the target region. The at least one processor may determine a modified boundary based on the expansion parameter. The at least one processor may determine the non-busy region based on the modified boundary.

In some embodiments, in response to an acceptance of the scheduling instruction received from the user terminal associated with the at least one of the one or more available service providers in the non-busy region, the at least one processor may transmit information of at least one of the plurality of service requests to the user terminal associated with the at least one of the one or more available service providers in the non-busy region. The information of the at least one of the plurality of service requests transmitted to the user terminal associated with the at least one of the one or more available service providers in the non-busy region may include a location associated with the at least one of the plurality of service request. The location associated with the at least one of the plurality of service requests may be determined according to GPS data transmitted by a user terminal associated with the at least one of the plurality of service requests.

In some embodiments, the at least one processor may determine a first time point at which the acceptance of the scheduling instruction is received from the user terminal of the at least one of the one or more available service providers in the non-busy region. The at least one processor may determine a second time point at which the at least one of the one or more available service providers in the non-busy region arrives in the target region.

In some embodiments, the at least one processor may determine a predetermined time period. The at least one processor may determine a service time period for the at least one of the one or more available service providers in the non-busy region based on the predetermined time period and at least one of the first time point or the second time point. The at least one processor may transmit information of the at least one of the plurality of service requests initiated from the target region to the user terminal associated with the at least one of the one or more available service providers in the non-busy region during the service time period. The information of the at least one of the plurality of service requests transmitted to the user terminal associated with the at least one of the one or more available service providers in the non-busy region may include a location associated with the at least one of the plurality of service request. The location associated with the at least one of the plurality of service requests may be determined according to GPS data transmitted by a user terminal associated with the at least one of the plurality of service requests.

In some embodiments, the at least one processor may determine a time interval between the first time point and the second time point. The at least one processor may determine whether the time interval is less than a time interval threshold. The at least one processor may transmit information indicative of a reward to the application executed by the user terminal associated with the at least one of the one or more available service providers in the non-busy region based on a result of the determination that the time interval is less than the time interval threshold.

In some embodiments, the at least one processor may transmit the scheduling instruction to one or more user terminals associated with the one or more available service providers in the non-busy region. The at least one processor may receive, from the one or more user terminals of the one or more available service providers, one or more acceptances indicating that corresponding part of the one or more available service providers agree to go to the target region. The at least one processor may determine a number count of the received one or more acceptances. The at least one processor may determine whether the number count of the one or more acceptances is larger than a predetermined threshold. The at least one processor may stop transmitting the scheduling instruction to the one or more user terminals associated with the one or more available service providers in the non-busy region based on a result of the determination that the number count of the one or more acceptances is larger than the predetermined threshold.

In some embodiments, the at least one processor may determine a location of the at least one of the one or more available service providers in the non-busy region based on GPS (Global Positioning System) data received from the application executed by the user terminal associated with the at least one of the one or more available service providers. The GPS data may be determined by a GPS chipset of the user terminal.

In some embodiments, the at least one processor may identify a scheduling location in the target region, wherein a service request density within a predetermined range of the scheduling location is larger than a density threshold. The at least one processor may determine a distance between the location of the at least one of the one or more available service providers and the scheduling location. The at least one processor may determine whether the distance between the location of the at least one of the one or more available service providers and the scheduling location is less than a distance threshold. The at least one processor may transmit information of the scheduling location to the user terminal associated with the at least one of the one or more available service providers based on a result of the determination that the distance between the location of the at least one of the one or more available service providers and the scheduling location is less than the distance threshold.

In some embodiments, the at least one processor may determine an estimated travel time from the location of the at least one of the one or more available service providers to the target region. The at least one processor may determine a profit value associated with the at least one of the one or more available service providers if the at least one of the one or more available service providers arrives in the target region. The at least one processor may determine whether a rate of the profit value to the estimated travel time is larger than a rate threshold. The at least one processor may transmit the scheduling instruction associated with the plurality of service requests to the application executed by the user terminal associated with the at least one of the one or more available service providers based on a result of the determination that the rate of the profit value to the estimated travel time is larger than the rate threshold.

In some embodiments, the at least one processor may estimate a travel cost of the at least one of the one or more available service providers travelling from the location of the at least one of the one or more available service providers to the target region. The at least one processor may determine a probability that the at least one of the one or more available service providers is allocated a service request if the at least one of the one or more available service providers arrives in the target region. The at least one processor may estimate a service fee of the service request allocated to the at least one of the one or more available service providers if the at least one of the one or more available service providers arrives in the target region. The at least one processor may estimate the profit value associated with the at least one of the one or more available service providers based on the travel cost, the probability, and the service fee.

In some embodiments, the at least one processor may determine a prediction time period based on the estimated travel time. The at least one processor may estimate a number count of service requests to be allocated in the target region and a number count of available service providers in the target region within the prediction time period. The at least one processor may determine the probability that the at least one of the one or more available service providers is allocated a service request based on the number count of service requests to be allocated and the number count of available service providers.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 18 is a flowchart illustrating an exemplary process for transport capacity scheduling according to some embodiments of the present disclosure;

FIG. 19 is a flowchart illustrating an exemplary process for transport capacity scheduling according to some embodiments of the present disclosure;

DETAILED DESCRIPTION

Figure 1:
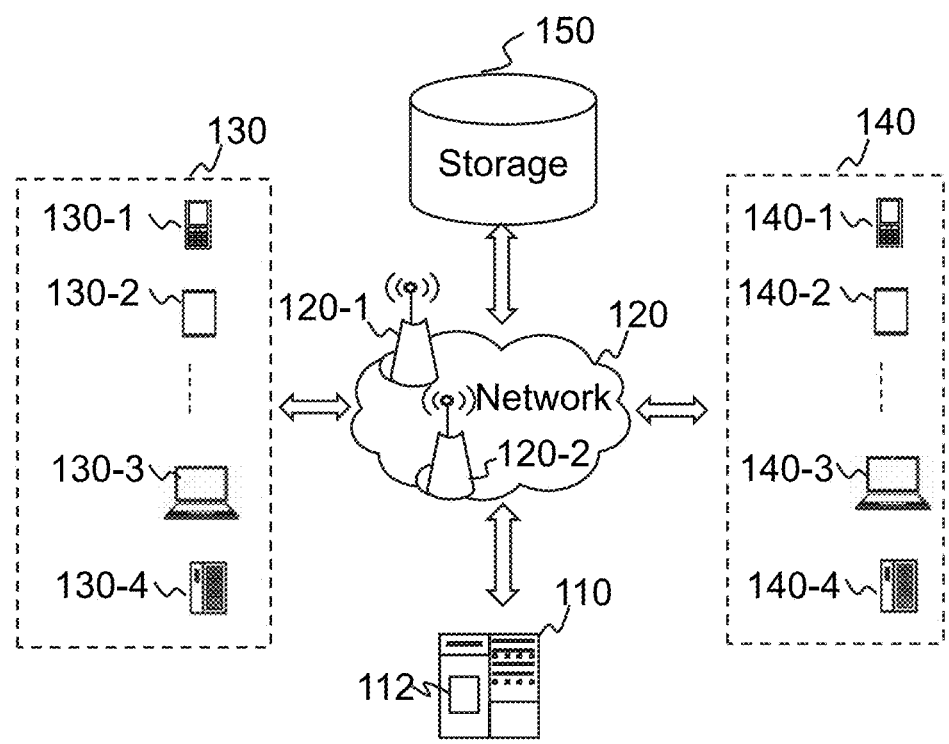
FIG. 1 is a schematic diagram illustrating an exemplary on-demand service system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to some embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding on-demand service, it should also be understood that this is only one exemplary embodiment. The systems and methods of the present disclosure may be applied to any other kind of on-demand service. For example, the systems and methods of the present disclosure may be applied to transportation systems of different environments including land, ocean, aerospace, or the like, or a combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or a combination thereof. The transportation system may also include any transportation system for management and/or distribution, for example, a system for sending and/or receiving an express. The application of the systems and methods of the present disclosure may include a webpage, a plug-in of a browser, a client terminal, a custom system, an internal analysis system, an artificial intelligence robot, or the like, or a combination thereof.

The terms "passenger," "requester," "requester," "service requester," "service requester," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity or a tool that may provide a service or facilitate the providing of the service. The term "user" in the present disclosure refers to an individual, an entity or a tool that may request a service, order a service, provide a service, or facilitate the providing of the service. In the present disclosure, terms "requester" and "requester terminal" may be used interchangeably, and terms "provider" and "provider terminal" may be used interchangeably.

The terms "request," "service," "service request," and "order" in the present disclosure are used interchangeably to refer to a request that may be initiated by a passenger, a requester, a service requester, a customer, a driver, a provider, a service provider, a supplier, or the like, or a combination thereof. The service request may be accepted by any one of a passenger, a requester, a service requester, a customer, a driver, a provider, a service provider, or a supplier. The service request may be chargeable or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or a combination thereof. One or more of the above positioning technologies may be used interchangeably in the present disclosure.

An aspect of the present disclosure relates to systems and methods for transport capacity scheduling associated with Online-to-Offline services. For example, a system may determine a target region, where the number of available service providers is less than the number of service requests. The system may further determine a non-busy region based on the information of the target region, and in the non-busy region one or more available service providers are free to accept a service request. The system may also transmit a scheduling instruction to a user terminal associated with at least one of the one or more available service providers in the non-busy region, which may include the information inquiring whether the user associated with the user terminal agrees to go to the target region. According to the transport capacity scheduling method, the system may schedule available service providers in non-busy regions to a busy region (i.e., the target region), which may improve service efficiency of the Online-to-Offline services.

It should be noted that online on-demand service, such as online taxi-hailing services, is a new form of service rooted only in post-Internet era. It provides technical solutions to users and service providers that could raise only in post-Internet era. In the pre-Internet era, when a passenger hails a taxi on the street, the taxi request and acceptance occur only between the passenger and one taxi driver that sees the passenger. If the passenger hails a taxi through a telephone call, the service request and acceptance may occur only between the passenger and one service provider (e.g., one taxi company or agent). Online taxi, however, allows a user of the service to real-time and automatically distribute a service request to a vast number of individual service providers (e.g., taxi) distance away from the user. It also allows a plurality of service providers to respond to the service request simultaneously and in real-time. Therefore, through the Internet, the on-demand service system may provide a much more efficient transaction platform for the users and the service providers that may never meet in a traditional pre-Internet on-demand service system.

FIG. 1 is a schematic diagram illustrating an exemplary on-demand service system according to some embodiments of the present disclosure. In some embodiments, the on-demand service system 100 may be a system for Online-to-Offline services. For example, the on-demand service system 100 may be an online transportation service platform for transportation services such as taxi hailing, chauffeur services, delivery vehicles, carpool, bus service, driver hiring, and shuttle services. The on-demand service system 100 may be a platform including a server 110, a network 120, a requester terminal 130, a provider terminal 140, and a storage 150.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the requester terminal 130, the provider terminal 140, and/or the storage 150 via the network 120. As another example, the server 110 may connect the requester terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or a combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to a service request to perform one or more functions described in the present disclosure. For example, the processing engine 112 may determine a target region with a transport capacity lower than a threshold, determine a non-busy region including one or more available service providers based on the target region, and transmit a scheduling instruction to the one or more available service providers. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or a combination thereof.

The network 120 may facilitate exchange of information and/or data. In some embodiments, one or more components of the on-demand service system 100 (e.g., the server 110, the requester terminal 130, the provider terminal 140, and the storage 150) may transmit information and/or data to another component(s) in the on-demand service system 100 via the network 120. For example, the server 110 may receive GPS data from the provider terminal 140 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or a combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a service requester may be a user of the requester terminal 130. In some embodiments, the user of the requester terminal 130 may be someone other than the service requester. For example, a user A of the requester terminal 130 may use the requester terminal 130 to transmit a service request for a user B, or receive a service confirmation and/or information or instructions from the server 110. In some embodiments, a service provider may be a user of the provider terminal 140. In some embodiments, the user of the provider terminal 140 may be someone other than the service provider. For example, a user C of the provider terminal 140 may use the provider terminal 140 to receive a service request for a user D, and/or information or instructions from the server 110. In some embodiments, "service requester" and "requester terminal" may be used interchangeably, and "service provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or a combination thereof. In some embodiments, the mobile device 130-1 may include a smart home device, a wearable device, a smart mobile device, a virtual reality device, an augmented reality device, or the like, or a combination thereof. In some embodiments, the smart home device may include a smart lighting device, a control device of an intelligent electrical apparatus, a smart monitoring device, a smart television, a smart video camera, an interphone, or the like, or a combination thereof. In some embodiments, the wearable device may include a smart bracelet, a smart footgear, a smart glass, a smart helmet, a smartwatch, a smart clothing, a smart backpack, a smart accessory, or the like, or a combination thereof. In some embodiments, the smart mobile device may include a smartphone, a personal digital assistant (PDA), a gaming device, a navigation device, a point of sale (POS) device, or the like, or a combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or a combination thereof. For example, the virtual reality device and/or the augmented reality device may include a Google Glass™, a RiftCon™, a Fragments™, a Gear VR™, etc. In some embodiments, the built-in device in the motor vehicle 130-4 may include an onboard computer, an onboard television, etc. In some embodiments, the requester terminal 130 may be a device with positioning technology for locating the position of the requester and/or the requester terminal 130.

In some embodiments, the provider terminal 140 may be similar to, or the same device as the requester terminal 130. In some embodiments, the provider terminal 140 may be a device with positioning technology for locating the position of the provider and/or the provider terminal 140. In some embodiments, the provider terminal 140 may periodically transmit GPS data to the server 110. In some embodiments, the requester terminal 130 and/or the provider terminal 140 may communicate with another positioning device to determine the position of the requester, the requester terminal 130, the provider, and/or the provider terminal 140. In some embodiments, the requester terminal 130 and/or the provider terminal 140 may transmit positioning information to the server 110.

The storage 150 may store data and/or instructions. In some embodiments, the storage 150 may store data obtained from the requester terminal 130 and/or the provider terminal 140. In some embodiments, the storage 150 may store data and/or instructions that the server 110 may execute or use to perform exemplary methods described in the present disclosure. In some embodiments, the storage 150 may include a mass storage, removable storage, a volatile read-and-write memory, a read-only memory (ROM), or the like, or a combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or a combination thereof.

In some embodiments, the storage 150 may be connected to the network 120 to communicate with one or more components of the on-demand service system 100 (e.g., the server 110, the requester terminal 130, the provider terminal 140). One or more components in the on-demand service system 100 may access the data or instructions stored in the storage 150 via the network 120. In some embodiments, the storage 150 may be directly connected to or communicate with one or more components in the on-demand service system 100 (e.g., the server 110, the requester terminal 130, the provider terminal 140). In some embodiments, the storage 150 may be part of the server 110.

In some embodiments, one or more components of the on-demand service system 100 (e.g., the server 110, the requester terminal 130, the provider terminal 140) may access the storage 150. In some embodiments, one or more components of the on-demand service system 100 may read and/or modify information relating to the requester, provider, and/or the public when one or more conditions are met. For example, the server 110 may read and/or modify one or more users' information after a service. As another example, the provider terminal 140 may access information relating to the requester when receiving a service request from the requester terminal 130, but the provider terminal 140 may not modify the relevant information of the requester.

In some embodiments, information exchanging of one or more components of the on-demand service system 100 may be achieved by way of requesting a service. The object of the service request may be any product. In some embodiments, the product may be a tangible product or immaterial product. The tangible product may include food, medicine, commodity, chemical product, electrical appliance, clothing, car, housing, luxury, or the like, or a combination thereof. The immaterial product may include a servicing product, a financial product, a knowledge product, an internet product, or the like, or a combination thereof. The internet product may include an individual host product, a web product, a mobile internet product, a commercial host product, an embedded product, or the like, or a combination thereof. The mobile internet product may be used in software of a mobile terminal, a program, a system, or the like, or a combination thereof. The mobile terminal may include a tablet computer, a laptop computer, a mobile phone, a personal digital assistant (PDA), a smartwatch, a point of sale (POS) device, an onboard computer, an onboard television, a wearable device, or the like, or a combination thereof. For example, the product may be any software and/or application used on the computer or mobile phone. The software and/or application may relate to socializing, shopping, transporting, entertainment, learning, investment, or the like, or a combination thereof. In some embodiments, the software and/or application relating to transporting may include a traveling software and/or application, a vehicle scheduling software and/or application, mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or a combination thereof.

One of ordinary skill in the art would understand that when an element of the on-demand service system 100 performs, the element may perform through electrical signals and/or electromagnetic signals. For example, when a requester terminal 130 processes a task, such as making a determination, identifying or selecting an object, the requester terminal 130 may operate logic circuits in its processor to process such task. When the requester terminal 130 sends out a service request to the server 110, a processor of the requester terminal 130 may generate electrical signals encoding the service request. The processor of the requester terminal 130 may then send the electrical signals to an output port. If the requester terminal 130 communicates with the server 110 via a wired network, the output port may be physically connected to a cable, which may further transmit the electrical signals to an input port of the server 110. If the requester terminal 130 communicates with the server 110 via a wireless network, the output port of the requester terminal 130 may be one or more antennas, which may convert the electrical signals to electromagnetic signals. Similarly, a provider terminal 140 may process a task through operation of logic circuits in its processor, and receive an instruction and/or service request from the server 110 via electrical signals or electromagnet signals. Within an electronic device, such as the requester terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium (e.g., the storage 150), it may send out electrical signals to a read/write device of the storage medium, which may read or write structured data in the storage medium. The structured data may be transmitted to the processor in the form of electrical signals via a bus of the electronic device. Here, an electrical signal refers to one electrical signal, a series of electrical signals, and/or a plurality of discrete electrical signals.

Figure 2:
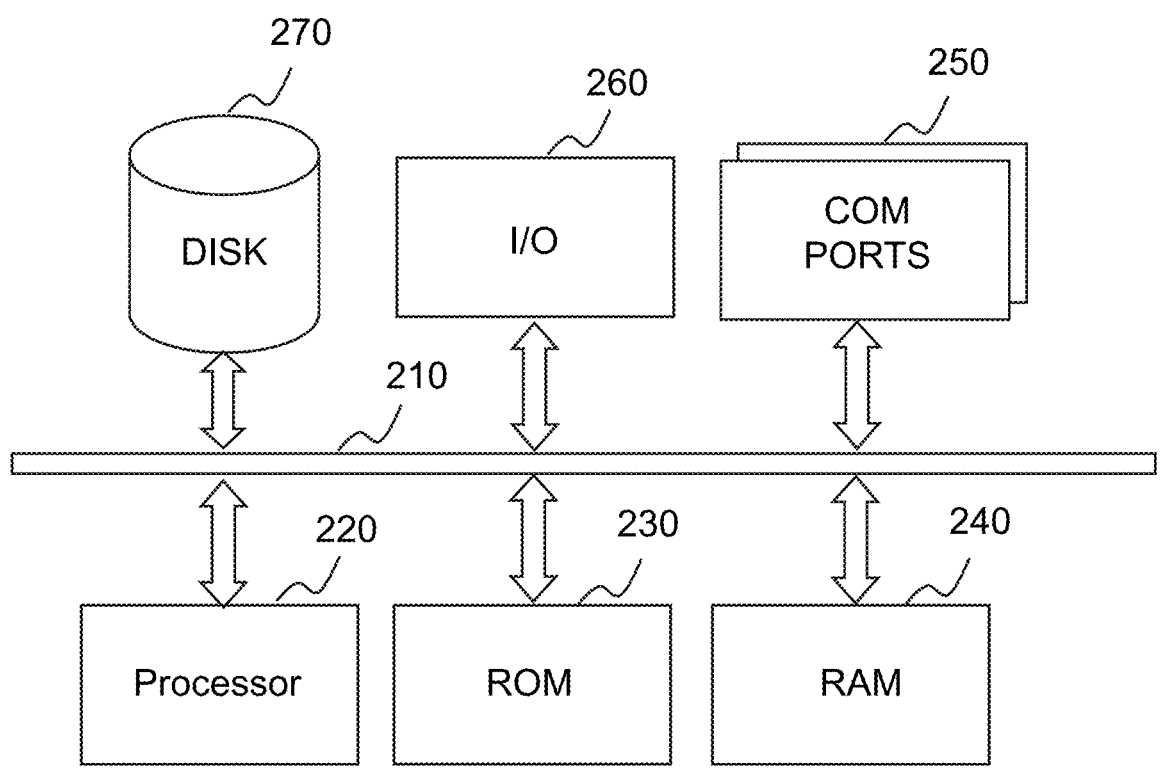
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 according to some embodiments of the present disclosure. In some embodiments, the server 110, the requester terminal 130, and/or the provider terminal 140 may be implemented on the computing device 200. For example, the processing engine 112 may be implemented on the computing device 200 and configured to perform functions of the processing engine 112 disclosed in this disclosure.

The computing device 200 may be used to implement any component of the on-demand service system 100 as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or another type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method operations performed by one CPU and/or processor as described in the present disclosure may also be jointly or separately performed by the multiple CPUs and/or processors. For example, if in the present disclosure the CPU and/or processor of the computing device 200 executes both operation A and operation B, it should be understood that operation A and operation B may also be performed by two different CPUs and/or processors jointly or separately in the computing device 200 (e.g., the first processor executes operation A and the second processor executes operation B, or the first and second processors jointly execute operations A and B).

Figure 3:
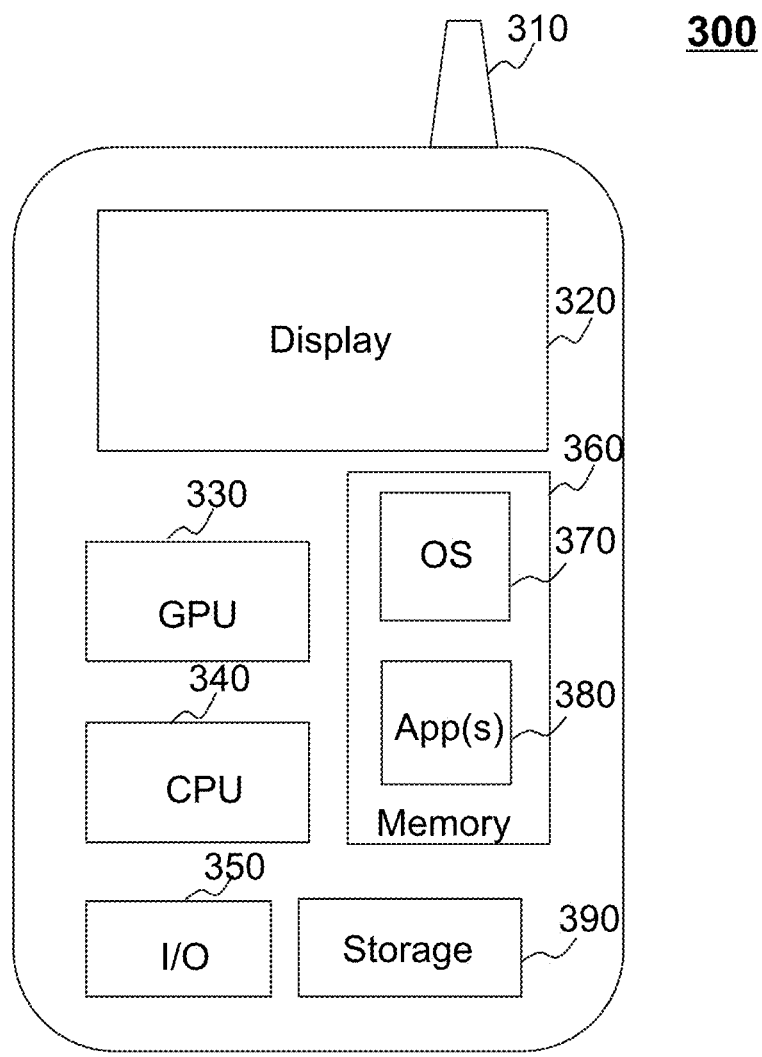
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, the requester terminal 130 or the provider terminal 140 may be implemented on the mobile device 300. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to on-demand services or other information from the on-demand service system 100. User interactions with the information stream may be achieved via the I/O 350 and provided to the processing engine 112 and/or other components of the on-demand service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
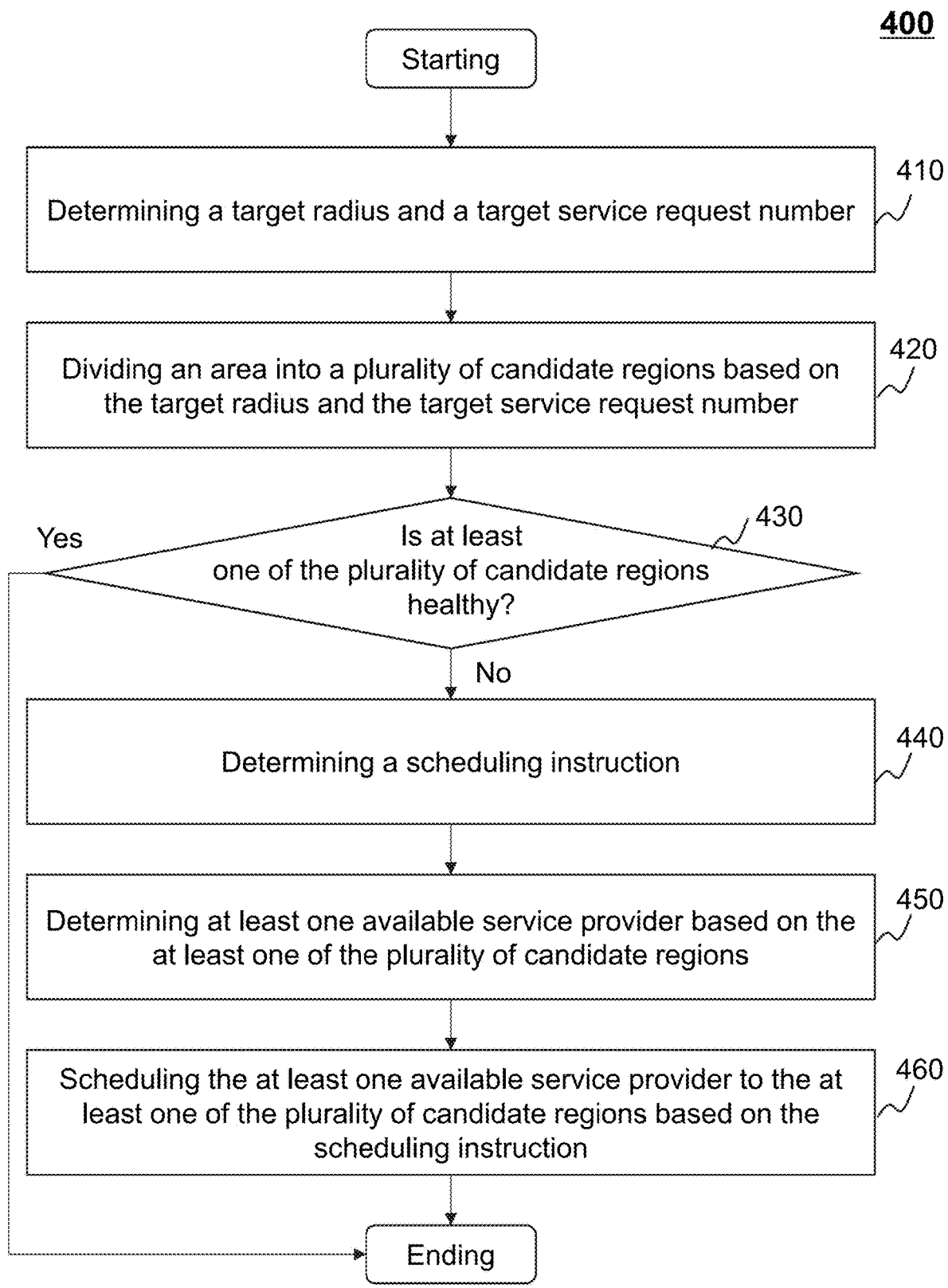
FIG. 4 is a flowchart illustrating an exemplary process for transport capacity scheduling based on the distribution of service requests according to some embodiments of the present disclosure.

FIG. 4 is a flowchart illustrating an exemplary process for scheduling transport capacity based on the distribution of service requests according to some embodiments of the present disclosure. The process 400 may be executed by the on-demand service system 100. For example, the process 400 may be implemented as a set of instructions (e.g., an application) stored in the storage ROM 230 or RAM 240. The processor 220 and/or modules and/or units in FIGS. 10-14 may execute the set of instructions, and when executing the instructions, the processor 220, the modules, and/or the units may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process as illustrated in FIG. 4 and described below is not intended to be limiting.

In 410, a target radius and a target service request number may be determined.

In 420, an area may be divided into a plurality of candidate regions based on the target radius and the target service request number.

In 430, whether at least one of the plurality of candidate regions is healthy may be determined.

In 440, a scheduling instruction may be determined based on a result of the determination that the at least one of the plurality of candidate regions is unhealthy.

In 450, at least one available service provider may be determined based on the at least one of the plurality of candidate regions.

In 460, the at least one available service provider may be scheduled to the at least one of the plurality of candidate regions based on the scheduling instruction.

According to the method for transport capacity scheduling based on the distribution of service requests, the target radius and the target service request number according to which an area can be divided into reasonable regions are determined. The area may be divided into a plurality of candidate regions reasonably based on the target radius and the target service request number. As used herein, "divided reasonably" refers to that the number count of the plurality of candidate regions is relatively large, the number count of service requests in each candidate region is relatively large, and the distribution of the plurality of candidate regions is relatively uniform. It should be noted that as one having ordinary skills in the art would understand, the term "relatively" used herein refers to that a corresponding parameter is larger than or smaller than a predetermined threshold, for example, the number count of the plurality of candidate regions is larger than a first predetermined threshold, the number count of service requests in each candidate region is larger than a second predetermined threshold, and the distribution of the plurality of candidate regions is larger than a uniformity threshold. After the plurality of candidate regions are determined, whether at least one of the plurality of candidate regions is an unhealthy (or busy) region with a low allocation rate and an insufficient ratio of the number count of available service providers to the number count of service requests to be allocated may be determined based on the allocation rate and the ratio of the number count of available service providers to the number count of service requests to be allocated of the at least one of the plurality of candidate regions. According to a result of the determination that the at least one of the plurality of candidate regions is an unhealthy region, a scheduling instruction may be determined, at least one available service provider near the at least one of the plurality of candidate regions may be determined, and the at least one available service provider may be scheduled to the at least one of the plurality of candidate regions. According to some embodiments of the present disclosure, available service providers in regions with a low service request density may be scheduled to regions with a high request density and an insufficient ratio of the number count of available service providers to the number count of service requests to be allocated. Accordingly, the timeliness and the effectiveness of transport capacity scheduling may be ensured, the allocation rate of the service requests may be increased, and service providers' experience may be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 5:
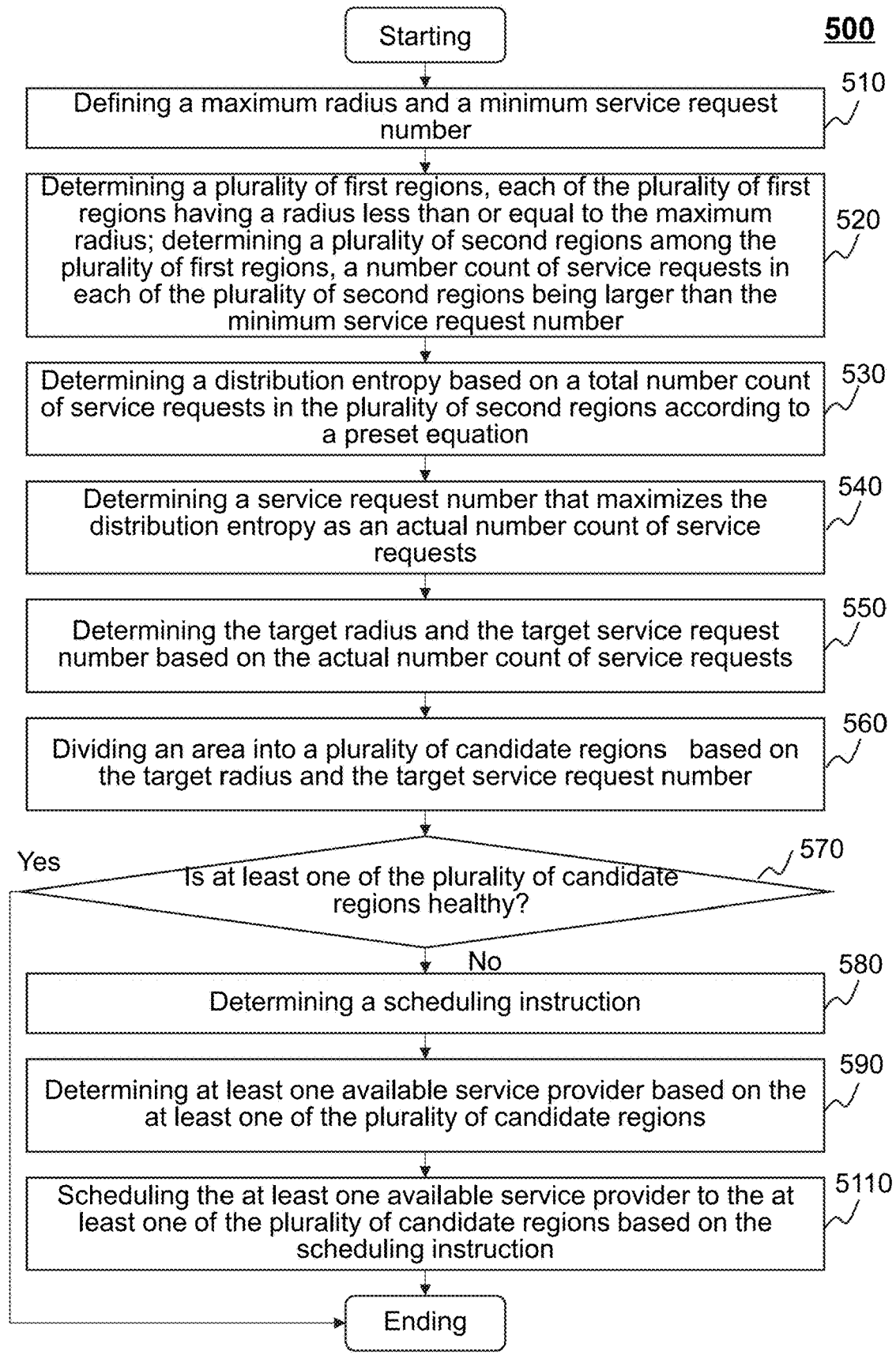
FIG. 5 is a flowchart illustrating an exemplary process for transport capacity scheduling based on the distribution of service requests according to some embodiments of the present disclosure.

FIG. 5 is a flowchart illustrating an exemplary process for scheduling transport capacity based on the distribution of service requests according to some embodiments of the present disclosure. The process 500 may be executed by the on-demand service system 100. For example, the process 500 may be implemented as a set of instructions (e.g., an application) stored in the storage ROM 230 or RAM 240. The processor 220 and/or modules and/or units in FIGS. 10-14 may execute the set of instructions, and when executing the instructions, the processor 220, the modules, and/or the units may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, a maximum radius and a minimum service request number may be defined.

In 520, a plurality of first regions may be determined, each of the plurality of first regions having a radius less than or equal to the maximum radius; and a plurality of second regions may be determined among the plurality of first regions, a number count of service requests in each of the plurality of second regions being larger than the minimum service request number.

In 530, a distribution entropy may be determined based on a total number count of service requests in the plurality of second regions according to a preset equation.

In 540, a service request number that maximizes the distribution entropy may be determined as an actual number count of service requests.

In 550, the target radius and the target service request number may be determined based on the actual number count of service requests.

In 560, the area may be divided into a plurality of candidate regions based on the target radius and the target service request number.

In 570, whether at least one of the plurality of candidate regions is healthy may be determined.

In 580, a scheduling instruction may be determined based on a result of the determination that the at least one of the plurality of candidate regions is unhealthy.

In 590, at least one available service provider may be determined based on the at least one of the plurality of candidate regions.

In 5110, the at least one available service provider may be scheduled to the at least one of the plurality of candidate regions based on the scheduling instruction.

According to some embodiments of the present disclosure, the method for transport capacity scheduling based on the distribution of service requests may further include the following technical features. The operation for determining the target radius and the target service request number may include the following operations. A maximum radius and a minimum service request number may be defined. A plurality of first regions may be determined, each of the plurality of first regions having a radius less than or equal to the maximum radius. A plurality of second regions may be determined among the plurality of first regions, the number count of service requests in each of the plurality of second regions being larger than the minimum service request number. A distribution entropy may be determined based on a total number count of service requests in the plurality of second regions according to a preset equation. A service request number that maximizes the distribution entropy may be determined as an actual number count of service requests. The target radius and the target service request number may be determined based on the actual number count of service requests. The preset equation may be expressed as below:

$$E_{r,m} = -\Sigma_{i=1}^{n} P_i \times \log(P_i) \quad (1)$$

where $E_{r,m}$ refers to the distribution entropy, $P_i$ refers to a proportion of the number count of service requests in an ith second region to a total number count of service requests in the plurality of second regions, and n refers to the number of the plurality of second regions.

In some embodiments, the maximum radius and the minimum service request number may be defined. During rush hours, since the number count of service requests is relatively large, in order to avoid a plurality of regions being automatically merged, the maximum radius should be appropriately reduced, or the minimum service request number should be appropriately increased. In non-rush hours, since the number count of service requests is relatively small and the distribution of the service requests is relatively disperse, in order to avoid mistaking the service requests as noises, the maximum radius should be appropriately increased or the minimum service request number should be appropriately reduced. After the maximum radius and the minimum service request number are defined, a plurality of first regions may be determined, each of the plurality of first regions having a radius less than or equal to the maximum radius. A plurality of second regions may be determined among the plurality of first regions, the number count of service requests in each of the plurality of second regions being larger than the minimum service request number. A total number count of service requests in the plurality of second regions may be determined by adding a plurality of number counts of service requests in the plurality of second regions, and a distribution entropy may be determined based on the total number count of service requests in the second regions, wherein the total number count of service requests is determined based on the number count of the second regions and the number count of service requests in each of the second regions. According to equation (1), the distribution entropy is positively correlated with the number count of the plurality of second regions; that is, the larger the number count of clusters is, the larger the distribution entropy may be, and the more uniform the distribution of service request numbers corresponding to the clusters is, the larger the distribution entropy may be. A service request number that maximizes the distribution entropy may be determined as an actual number count of service requests and the target radius, and the target service request number may be determined based on the actual number count of service requests. Accordingly, it can be ensured that the number count of service requests in each of the divided regions is relatively large and the distribution of the divided regions may be relatively uniform, thereby improving the accuracy of transport capacity scheduling.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6:
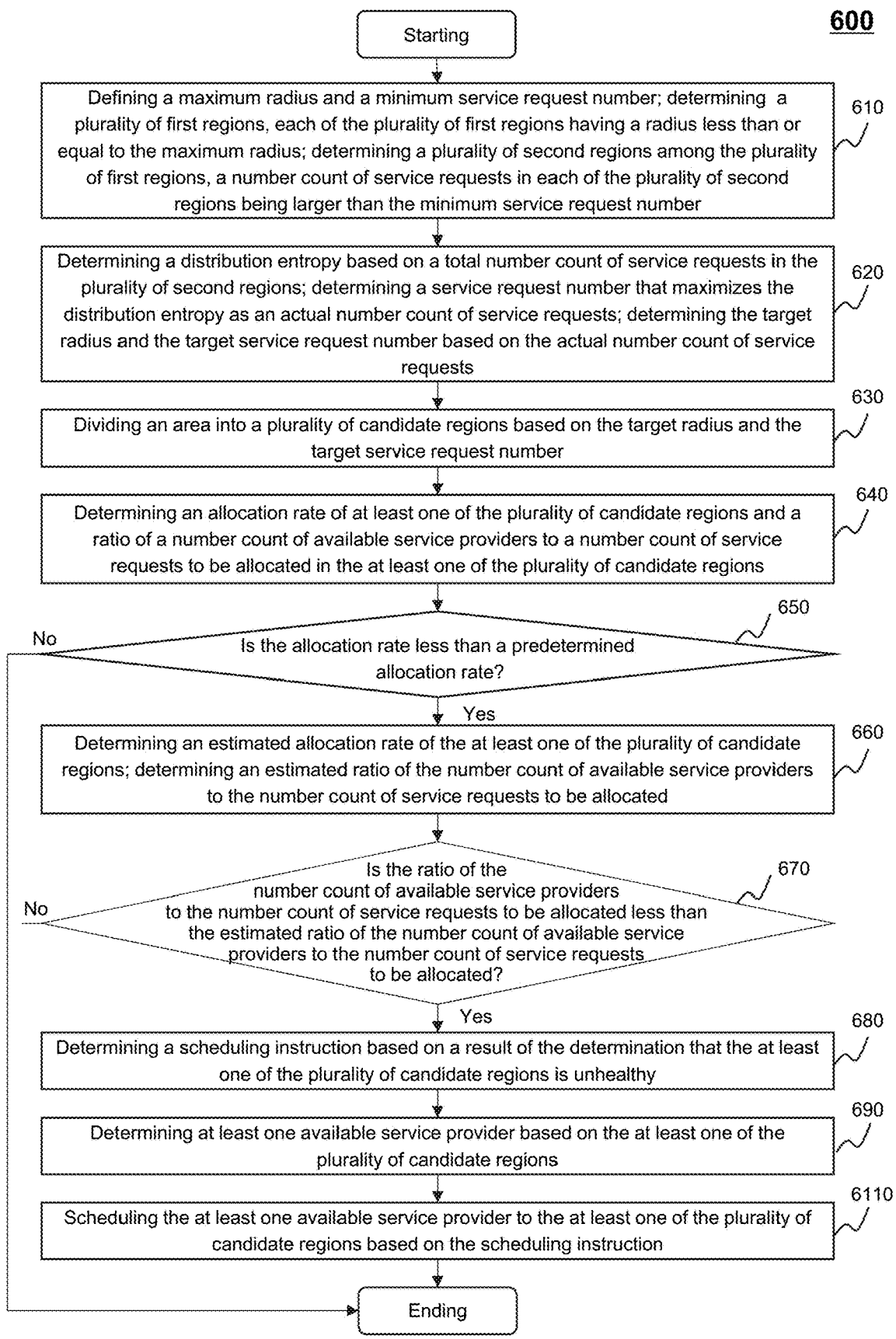
FIG. 6 is a flowchart illustrating an exemplary process for transport capacity scheduling based on the distribution of service requests according to some embodiments of the present disclosure.

FIG. 6 is a flowchart illustrating an exemplary process for scheduling transport capacity based on the distribution of service requests according to some embodiments of the present disclosure. The process 600 may be executed by the on-demand service system 100. For example, the process 600 may be implemented as a set of instructions (e.g., an application) stored in the storage ROM 230 or RAM 240. The processor 220 and/or modules and/or units in FIGS. 10-14 may execute the set of instructions, and when executing the instructions, the processor 220, the modules, and/or the units may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 610, a maximum radius and a minimum service request number may be defined; a plurality of first regions may be determined, each of the plurality of first regions having a radius less than or equal to the maximum radius; and a plurality of second regions may be determined among the plurality of first regions, the number count of service requests in each of the plurality of second regions being larger than the minimum service request number.

In 620, a distribution entropy may be determined based on the total number count of service requests in the plurality of second regions according to a preset equation; the service request number that maximizes the distribution entropy may be determined as an actual number count of service requests; and the target radius and the target service request number may be determined based on the actual number count of service requests.

In 630, the area may be divided into a plurality of candidate regions based on the target radius and the target service request number.

In 640, an allocation rate of at least one of the plurality of candidate regions and the ratio of the number count of available service providers to the number count of service requests to be allocated in the at least one of the plurality of candidate regions may be determined. As used herein, an allocation rate of a region refers to the ratio of the number count of service requests that are accepted by service providers to the total number count of service requests initiated in the region within a predetermined time period (e.g., 5 minutes, 10 minutes).

In 650, whether the allocation rate is less than a predetermined allocation rate may be determined. The predetermined allocation rate may be default settings of the on-demand service system 100 or may be adjustable under different situations. For example, during rush hours, the predetermined allocation rate may be relatively small as one having ordinary skills in the art would understand, while during non-rush hours, the predetermined allocation rate may be relatively large as one having ordinary skills in the art would understand.

In 660, an estimated allocation rate of the at least one of the plurality of candidate regions may be determined based on a result of the determination that the allocation rate is less than the predetermined allocation rate; and an estimated ratio of the number count of available service providers to the number count of service requests to be allocated may be determined based on the estimated allocation rate.

In 670, whether the ratio of the number count of available service providers to the number count of service requests to be allocated is less than the estimated ratio of the number count of available service providers to the number count of service requests to be allocated may be determined.

In 680, the at least one of the plurality of candidate regions may be determined as unhealthy or busy (i.e., the at least one of the plurality of candidate regions may be determined as a target region) the based on a result of the determination that the ratio of the number count of available service providers to the number count of service requests to be allocated is less than the estimated ratio of the number count of available service providers to the number count of service requests to be allocated; and a scheduling instruction may be determined.

In 690, at least one available service provider may be determined based on the at least one of the plurality of candidate regions.

In 6110, the at least one available service provider may be scheduled to the at least one of the plurality of candidate regions based on the scheduling instruction.

Figure 16:
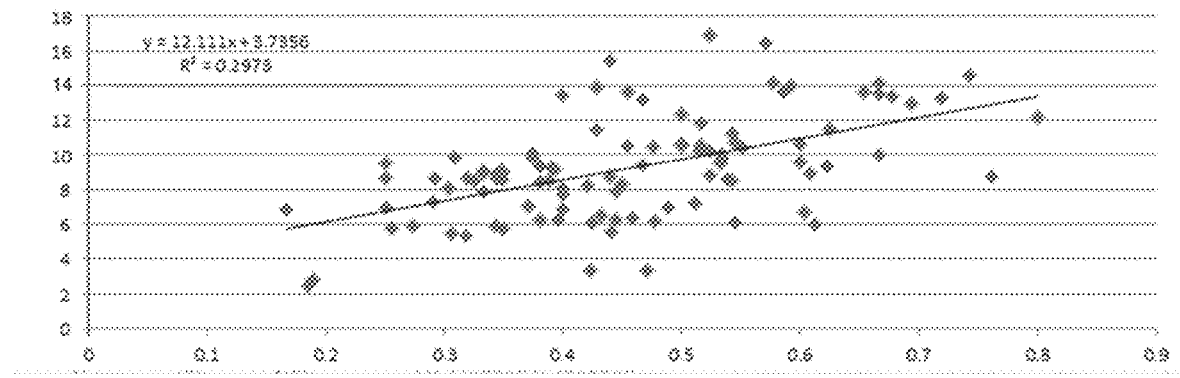
FIG. 16 is a schematic diagram illustrating an exemplary relationship between the ratio of the number count of available service providers to the number count of service requests to be allocated and an allocation rate according to some embodiments of the present disclosure.

In some embodiments, an allocation rate of at least one of the plurality of candidate regions and the ratio of the number count of available service providers to the number count of service requests to be allocated in the at least one of the plurality of candidate regions may be determined. If the allocation rate is less than a predetermined allocation rate; that is, the allocation rate is relatively low, an estimated allocation rate of the at least one of the plurality of candidate regions may be determined. An estimated ratio of the number count of available service providers to the number count of service requests to be allocated may be determined based on the estimated allocation rate, wherein the estimated ratio of the number count of available service providers to the number count of service requests to be allocated may be a linear function of the estimated allocation rate. For example, the linear function may be expressed as equation (2) below:

$$Y = a \times X + b \tag{2}$$

where Y refers to the estimated ratio of the number count of available service providers to the number count of service requests to be allocated, X refers to the estimated allocation rate, and a and b may be obtained based on samples according to a linear regression process illustrated in FIG. 16. Further, whether the ratio of the number count of available service providers to the number count of service requests to be allocated is less than the estimated ratio of the number count of available service providers to the number count of service requests to be allocated may be determined. The at least one of the plurality of candidate regions may be determined as unhealthy based on a result of the determination that the ratio of the number count of available service providers to the number count of service requests to be allocated is less than the estimated ratio of the number count of available service providers to the number count of service requests to be allocated. Available service providers may be scheduled to the at least one of the plurality of candidate regions. Accordingly, a success rate of online taxi-hailing services and a success rate of receiving service requests in the at least one of the plurality of candidate regions may be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
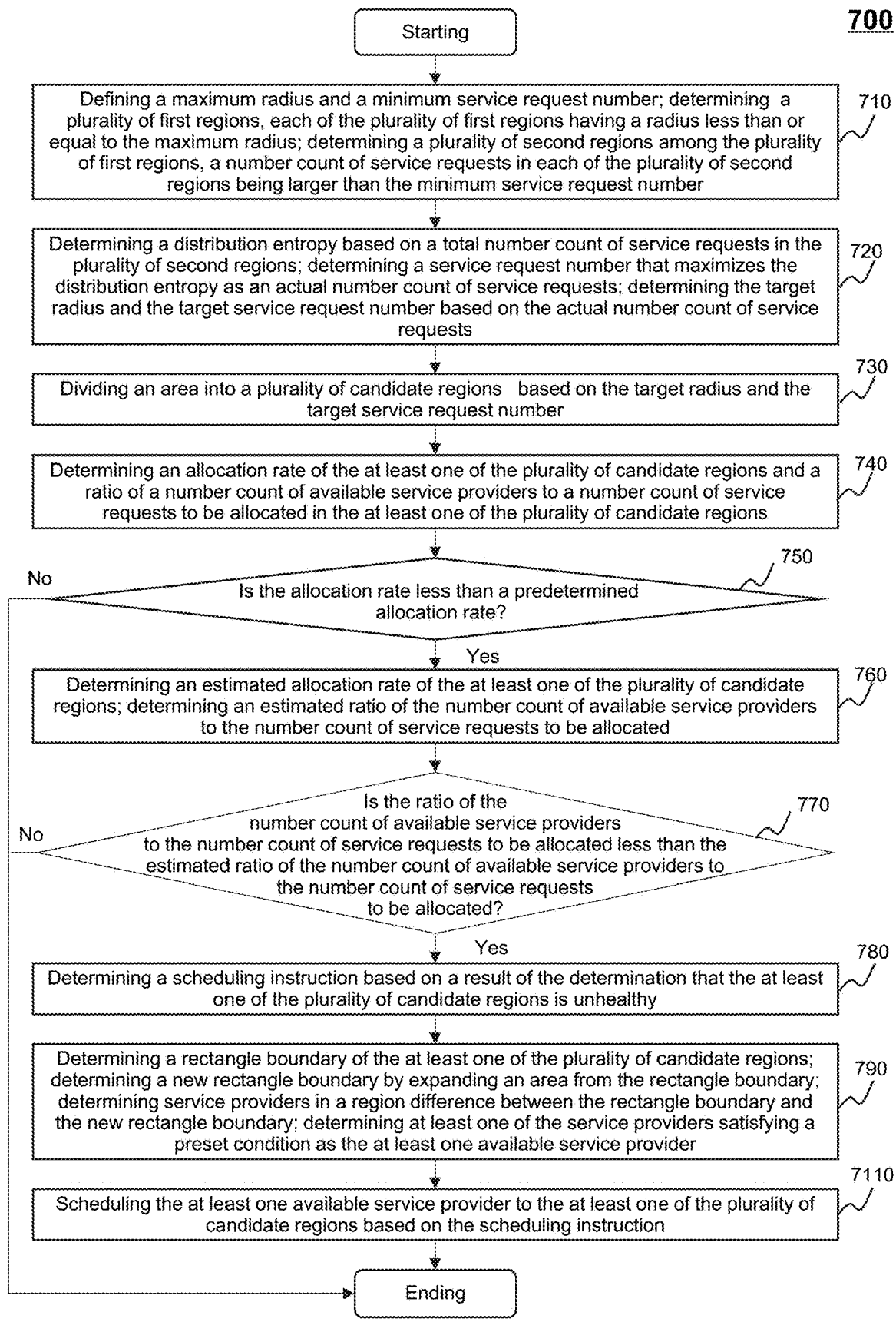
FIG. 7 is a flowchart illustrating an exemplary process for transport capacity scheduling based on the distribution of service requests according to some embodiments of the present disclosure.

FIG. 7 is a flowchart illustrating an exemplary process for scheduling transport capacity based on the distribution of service requests according to some embodiments of the present disclosure. The process 700 may be executed by the on-demand service system 100. For example, the process 700 may be implemented as a set of instructions (e.g., an application) stored in the storage ROM 230 or RAM 240. The processor 220 and/or modules and/or units in FIGS. 10-14 may execute the set of instructions, and when executing the instructions, the processor 220, the modules, and/or the units may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, a maximum radius and a minimum service request number may be defined; a plurality of first regions may be determined, each of the plurality of first regions having a radius less than or equal to the maximum radius; and a plurality of second regions may be determined among the plurality of first regions, the number count of service requests in each of the plurality of second regions being larger than the minimum service request number.

In 720, a distribution entropy may be determined based on the total number count of service requests in the plurality of second regions according to a preset equation; the service request number that maximizes the distribution entropy may be determined as an actual number count of service requests; and the target radius and the target service request number may be determined based on the actual number count of service requests.

In 730, the area may be divided into a plurality of candidate regions based on the target radius and the target service request number.

In 740, an allocation rate of at least one of the plurality of candidate regions and the ratio of the number count of available service providers to the number count of service requests to be allocated in the at least one of the plurality of candidate regions may be determined.

In 750, whether the allocation rate is less than a predetermined allocation rate may be determined.

In 760, an estimated allocation rate of the at least one of the plurality of candidate regions may be determined based on a result of the determination that the allocation rate is less than the predetermined allocation rate; and an estimated ratio of the number count of available service providers to the number count of service requests to be allocated may be determined based on the estimated allocation rate.

In 770, whether the ratio of the number count of available service providers to the number count of service requests to be allocated is less than the estimated ratio of the number count of available service providers to the number count of service requests to be allocated may be determined.

In 780, the at least one of the plurality of candidate regions may be determined as unhealthy (or busy) based on a result of the determination that the ratio of the number count of available service providers to the number count of service requests to be allocated is less than the estimated ratio of the number count of available service providers to the number count of service requests to be allocated; and a scheduling instruction may be determined.

In 790, a rectangle boundary of the at least one of the plurality of candidate regions may be determined; a new rectangle boundary may be determined by expanding an area from the rectangle boundary; service providers in the region difference between the rectangle boundary and the new rectangle boundary may be determined; and at least one of the service providers satisfying a preset condition may be determined as at least one available service provider.

In 7110, the at least one available service provider may be scheduled to the at least one of the plurality of candidate regions based on the scheduling instruction.

In some embodiments, a rectangle boundary of the at least one of the plurality of candidate regions may be determined according to a boundary determination process. According to the boundary determination process, the maximum latitude and longitude (maxing, maxlat) and the minimum latitude and longitude (mining, minlat) of start locations of the service requests in the at least one of the plurality of candidate regions may be determined, and the boundary of the region may be determined based on a rectangle expressed by the following four points including (maxing, maxlat), (maxing, minlat), (mining, maxlat), (mining, minlat). A new rectangle boundary may be determined by expanding an area from the rectangle boundary, which refers to expanding the four points by a predetermined value, determining four new points respectively, and determining the new rectangle boundary based on a rectangle expressed by the four new points. A region difference between the rectangle boundary and the new rectangle boundary may be determined. The region difference may be a concentric-square-shaped region between the rectangle boundary and the new rectangle boundary. At least one of the service providers in the region difference satisfying a preset condition may be determined as the at least one available service provider, wherein the preset condition is that the number count of service requests within a first predetermined range of the location of the at least one of the service providers is less than a first predetermined service request number and the location of the at least one of the service providers is not in a region with a high service request density. Therefore, it is possible to determine service providers near whom the number count of service requests is relatively small and who are closer to the target scheduling region, ensuring the effectiveness and the reasonableness of transport capacity scheduling. Accordingly, a better supply and demand effect of the number count of available service providers to the number count of service requests to be allocated may be achieved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
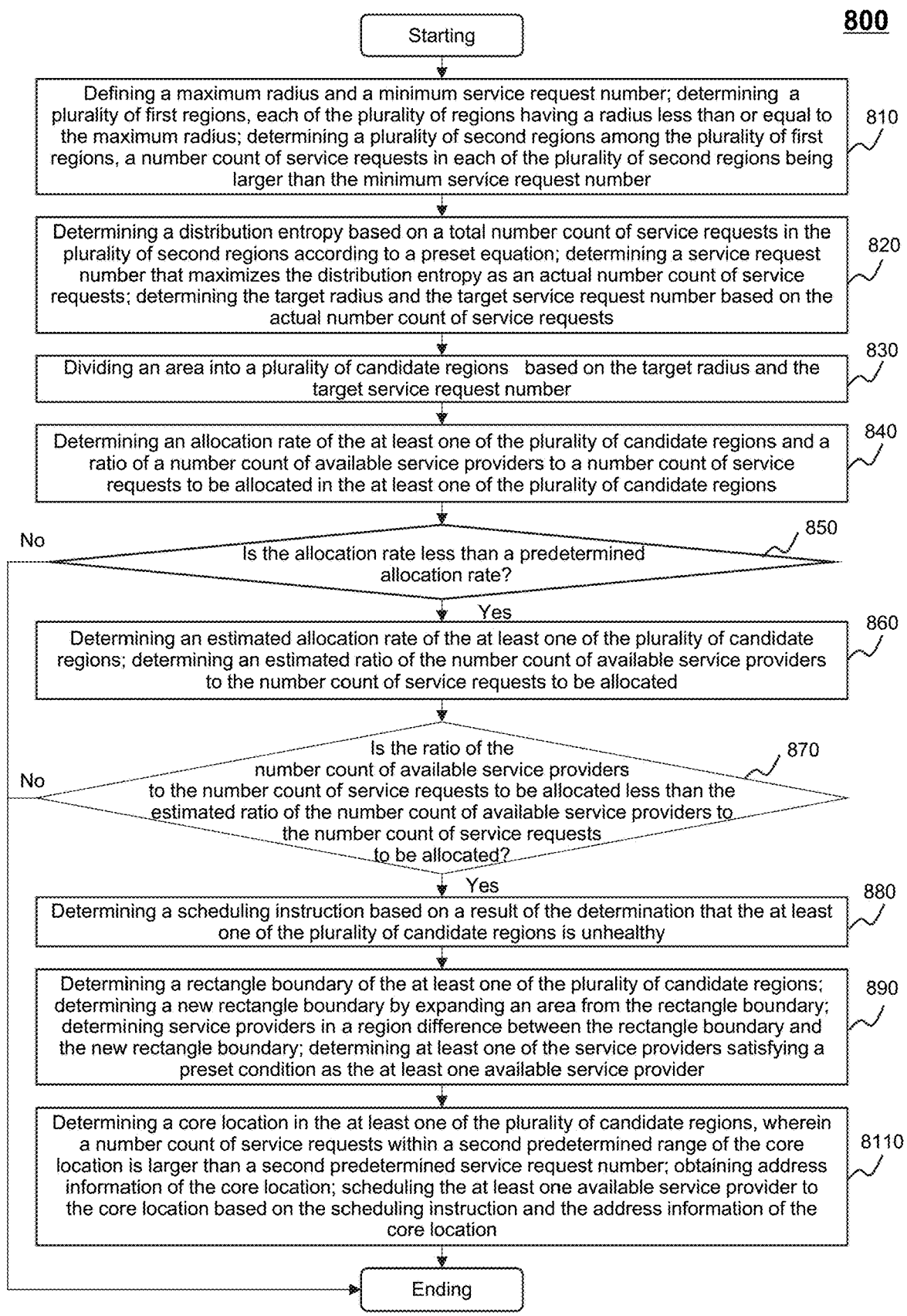
FIG. 8 is a flowchart illustrating an exemplary process for transport capacity scheduling based on the distribution of service requests according to some embodiments of the present disclosure.

FIG. 8 is a flowchart illustrating an exemplary process for scheduling transport capacity based on the distribution of service requests according to some embodiments of the present disclosure. The process 800 may be executed by the on-demand service system 100. For example, the process 800 may be implemented as a set of instructions (e.g., an application) stored in the storage ROM 230 or RAM 240. The processor 220 and/or modules and/or units in FIGS. 10-14 may execute the set of instructions, and when executing the instructions, the processor 220, the modules, and/or the units may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In 810, a maximum radius and a minimum service request number may be defined; a plurality of first regions may be determined, each of the plurality of first regions having a radius less than or equal to the maximum radius; and a plurality of second regions may be determined among the plurality of first regions, the number count of service requests in each of the plurality of second regions being larger than the minimum service request number.

In 820, a distribution entropy may be determined based on the total number count of service requests in the plurality of second regions according to a preset equation; the service request number that maximizes the distribution entropy may be determined as an actual number count of service requests; and the target radius and the target service request number may be determined based on the actual number count of service requests.

In 830, the area may be divided into a plurality of candidate regions based on the target radius and the target service request number.

In 840, an allocation rate of at least one of the plurality of candidate regions and the ratio of the number count of available service providers to the number count of service requests to be allocated in the at least one of the plurality of candidate regions may be determined.

In 850, whether the allocation rate is less than a predetermined allocation rate may be determined.

In 860, an estimated allocation rate of the at least one of the plurality of candidate regions may be determined based on a result of the determination that the allocation rate is less than the predetermined allocation rate; and an estimated ratio of the number count of available service providers to the number count of service requests to be allocated may be determined based on the estimated allocation rate.

In 870, whether the ratio of the number count of available service providers to the number count of service requests to be allocated is less than the estimated ratio of the number count of available service providers to the number count of service requests to be allocated may be determined.

In 880, the at least one of the plurality of candidate regions may be determined as unhealthy (or busy) based on a result of the determination that the ratio of the number count of available service providers to the number count of service requests to be allocated is less than the estimated ratio of the number count of available service providers to the number count of service requests to be allocated; and a scheduling instruction may be determined.

In 890, a rectangle boundary of the at least one of the plurality of candidate regions may be determined; a new rectangle boundary may be determined by expanding an area from the rectangle boundary; service providers in a region difference between the rectangle boundary and the new rectangle boundary may be determined; and at least one of the service providers satisfying a preset condition may be determined as the at least one available service provider.

In 8110, a core location (also referred to as a "scheduling location") in the at least one of the plurality of candidate regions may be determined, wherein the number count of service requests within a second predetermined range of the core location is larger than a second predetermined service request number; address information of the core location may be obtained; and the at least one available service provider may be scheduled to the core location based on the scheduling instruction and the address information of the core location.

In some embodiments, since the at least one of the plurality of candidate regions (i.e., a region with a high service request density) is relatively large, after the at least one available service provider is determined, it is suitable to schedule the at least one available service provider to a core location nearest to the at least one available service provider. As used herein, the core location refers to a location where the number count of service requests within a predetermined range from the location is not less than a predetermined service request number. Address information of a plurality of core locations may be obtained and the at least one available service provider may be scheduled to a core location that is nearest to the available service provider. Accordingly, available service providers can be quickly scheduled to a region with a high service request density and receiving rates of the available service providers may be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 9:
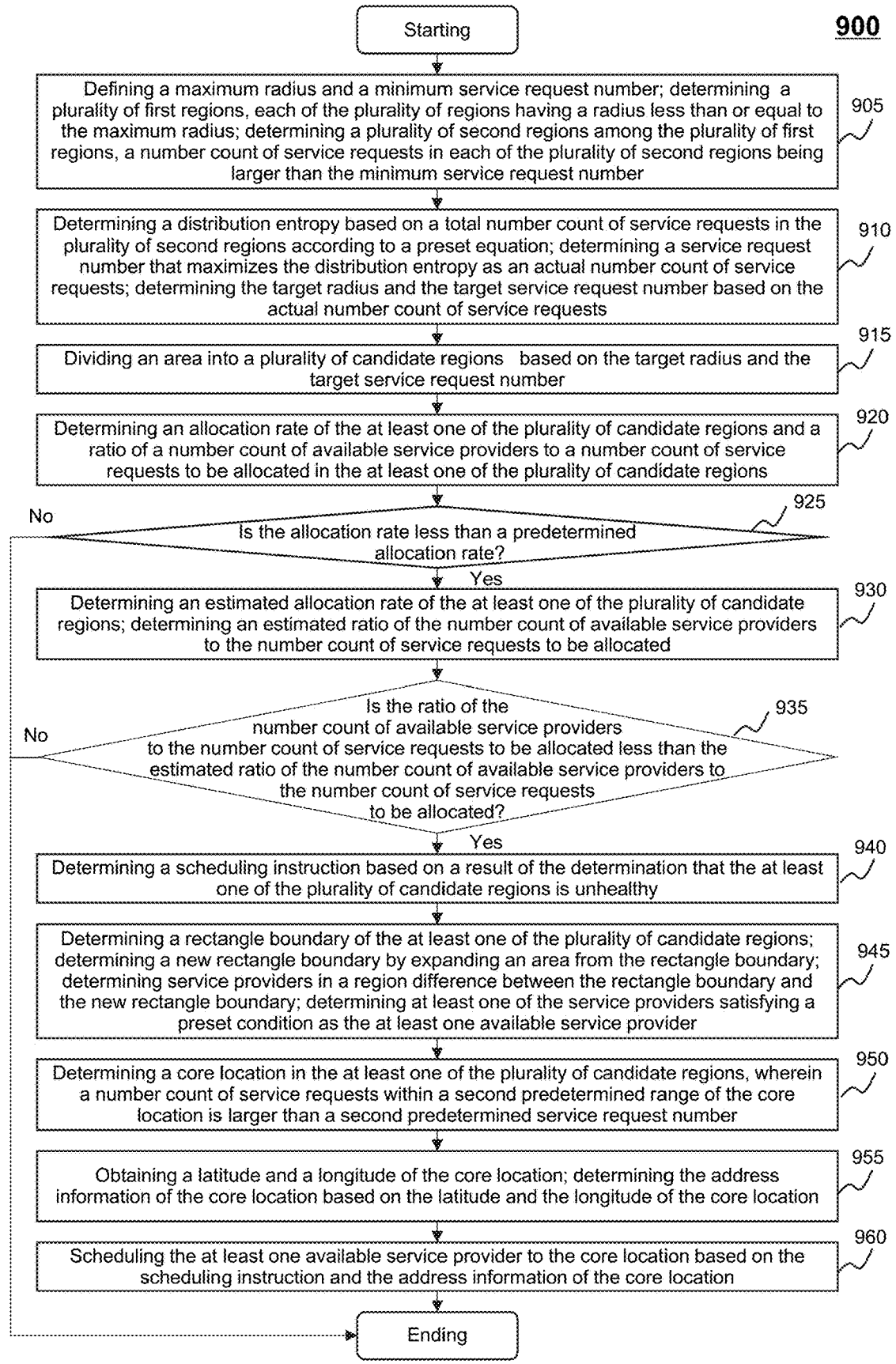
FIG. 9 is a flowchart illustrating an exemplary process for transport capacity scheduling based on the distribution of service requests according to some embodiments of the present disclosure.

FIG. 9 is a flowchart illustrating an exemplary process for scheduling transport capacity based on the distribution of service requests according to some embodiments of the present disclosure. The process 900 may be executed by the on-demand service system 100. For example, the process 900 may be implemented as a set of instructions (e.g., an application) stored in the storage ROM 230 or RAM 240. The processor 220 and/or modules and/or units in FIGS. 10-14 may execute the set of instructions, and when executing the instructions, the processor 220, the modules, and/or the units may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 905, a maximum radius and a minimum service request number may be defined; a plurality of first regions may be determined, each of the plurality of first regions having a radius less than or equal to the maximum radius; and a plurality of second regions may be determined among the plurality of first regions, and the number count of service requests in each of the plurality of second regions is larger than the minimum service request number.

In 910, a distribution entropy may be determined based on the total number count of service requests in the plurality of second regions according to a preset equation; the service request number that maximizes the distribution entropy may be determined as an actual number count of service requests; and the target radius and the target service request number may be determined based on the actual number count of service requests.

In 915, the area may be divided into a plurality of candidate regions based on the target radius and the target service request number.

In 920, an allocation rate of at least one of the plurality of candidate regions and the ratio of the number count of available service providers to the number count of service requests to be allocated in the at least one of the plurality of candidate regions may be determined.

In 925, whether the allocation rate is less than a predetermined allocation rate may be determined.

In 930, an estimated allocation rate of the at least one of the plurality of candidate regions may be determined based on a result of the determination that the allocation rate is less than the predetermined allocation rate; and an estimated ratio of the number count of available service providers to the number count of service requests to be allocated may be determined based on the estimated allocation rate.

In 935, whether the ratio of the number count of available service providers to the number count of service requests to be allocated is less than the estimated ratio of the number count of available service providers to the number count of service requests to be allocated may be determined.

In 940, the at least one of the plurality of candidate regions may be determined as unhealthy (or busy) based on a result of the determination that the ratio of the number count of available service providers to the number count of service requests to be allocated is less than the estimated ratio of the number count of available service providers to the number count of service requests to be allocated; and a scheduling instruction may be determined.

In 945, a rectangle boundary of the at least one of the plurality of candidate regions may be determined; a new rectangle boundary may be determined by expanding an area from the rectangle boundary; service providers in a region difference between the rectangle boundary and the new rectangle boundary may be determined; and at least one of the service providers satisfying a preset condition may be determined as the at least one available service provider.

In 950, a core location in the at least one of the plurality of candidate regions may be determined, wherein the number count of service requests within a second predetermined range of the core location is larger than a second predetermined service request number.

In 955, the latitude and the longitude of the core location may be obtained; and the address information of the core location may be determined based on the latitude and the longitude of the core location.

In 950, the at least one available service provider may be scheduled to the core location based on the scheduling instruction and the address information of the core location. The address information of the core location may include a district, a street, and a business district.

In some embodiments, the address information of a core location may be determined based on the latitude and the longitude of the core location, and the address information of the core location includes a district, a street, and a business district. Accordingly, the at least one available service provider can quickly arrive at the core location, the efficiency of transport capacity scheduling can be improved, an arrival time of the at least one available the service provider can be saved, and users can use transportation services in time.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 10:
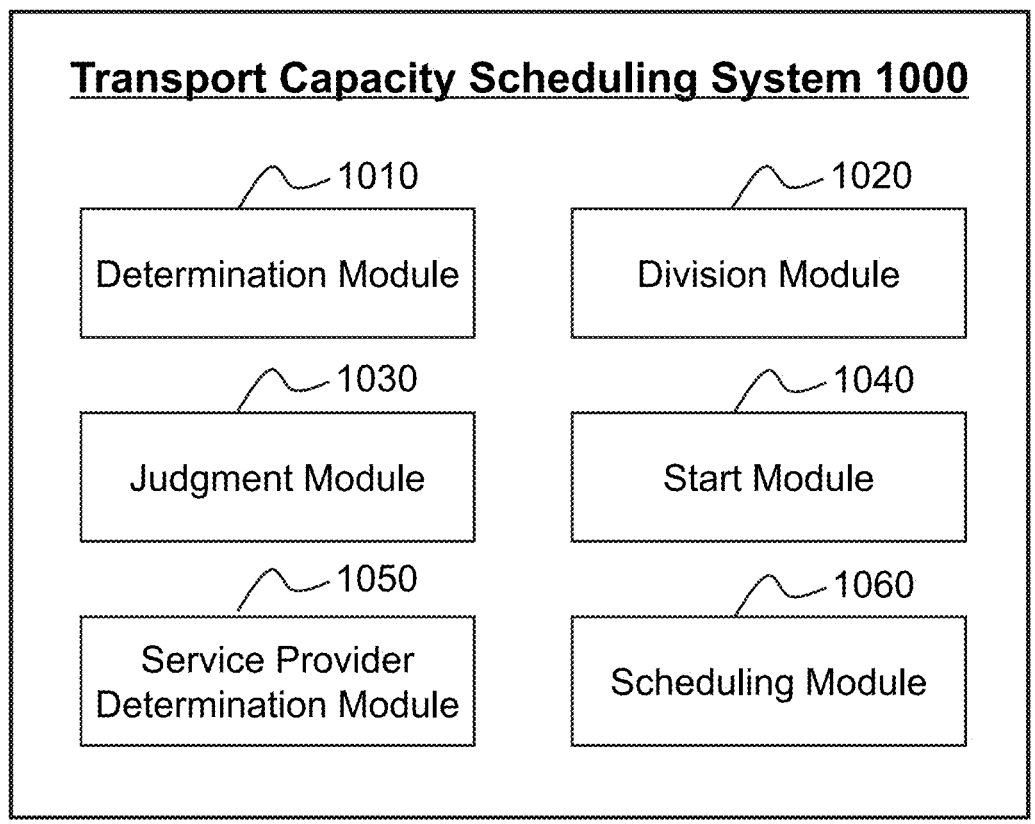
FIG. 10 is a block diagram illustrating an exemplary transport capacity scheduling system according to some embodiments of the present disclosure.

FIG. 10 is a block diagram illustrating an exemplary transport capacity scheduling system according to some embodiments of the present disclosure. The transport capacity scheduling system 1000 may include a determination module 1010, a division module 1020, a judgment module 1030, a start module 1040, a service provider determination module 1050, and a scheduling module 1060. In some embodiments, the transport capacity scheduling system 1000 may be integrated into the server 110. For example, the transport capacity scheduling system 1000 may be part of the processing engine 112.

The determination module 1010 may be configured to determine a target radius and the target service request number.

The division module 1020 may be configured to divide an area into a plurality of candidate regions based on the target radius and the target service request number.

The judgment module 1030 may be configured to determine whether at least one of the plurality of candidate regions is healthy.

The start module 1040 may be configured to determine a scheduling instruction based on a result of the determination that the at least one of the plurality of candidate regions is unhealthy.

The service provider determination module 1050 may be configured to determine at least one available service provider based on the at least one of the plurality of candidate regions.

The scheduling module 1060 may be configured to schedule the at least one available service provider to the at least one of the plurality of candidate regions based on the scheduling instruction.

According to the transport capacity scheduling system 1000 illustrated in some embodiments, the determination module 1010 may determine the target radius and the target service request number according to which an area can be divided into reasonable regions. The division module 1020 may divide the area into a plurality of candidate regions reasonably based on the target radius and the target service request number. As used herein, "divided reasonably" refers to that the number count of the plurality of candidate regions is relatively large, the number count of service requests in each candidate region is relatively large, and the distribution of the plurality of candidate regions is relatively uniform. After the plurality of candidate regions are determined, the judgment module 1030 may determine whether at least one of the plurality of candidate regions is an unhealthy (or busy) region with a low allocation rate and an insufficient ratio of the number count of available service providers to the number count of service requests to be allocated based on the allocation rate and the ratio of the number count of available service providers to the number count of service requests to be allocated of the at least one of the plurality of candidate regions. According to a result of the determination that the at least one of the plurality of candidate regions is an unhealthy region, the start module 1040 may determine a scheduling instruction, the service provider determination module 1050 may determine at least one available service provider near the at least one of the plurality of candidate regions, and the scheduling module 1060 may schedule the at least one available service provider to the at least one of the plurality of candidate regions. According to some embodiments of the present disclosure, available service providers in regions with a low service request density may be scheduled to regions with a high request density and an insufficient ratio of the number count of available service providers to the number count of service requests to be allocated. Accordingly, the timeliness and the effectiveness of transport capacity scheduling may be ensured, the allocation rate of the service requests may be increased, and service providers' experience may be improved.

The modules in the transport capacity scheduling system 1000 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 11:
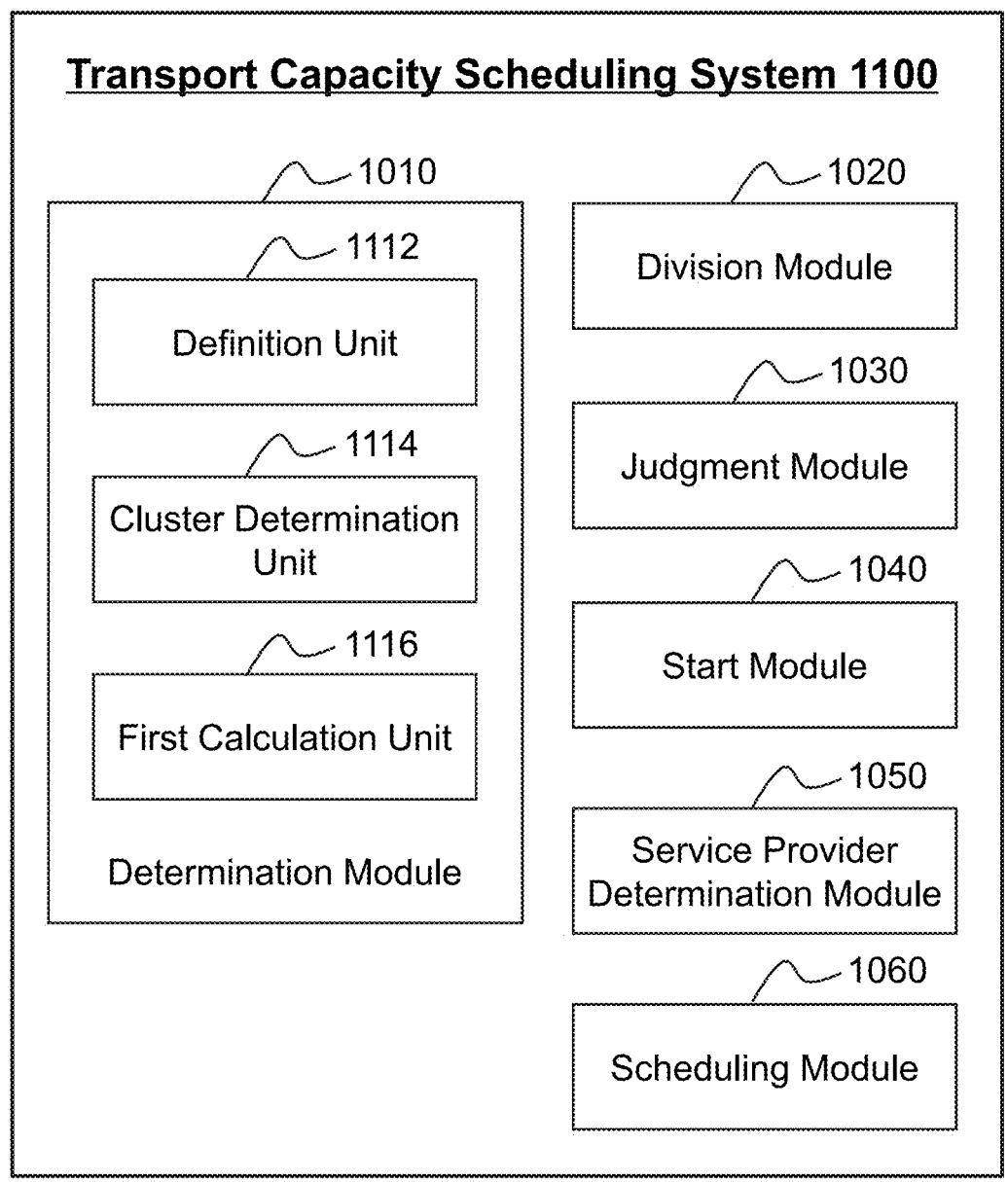
FIG. 11 is a block diagram illustrating an exemplary transport capacity scheduling system according to some embodiments of the present disclosure.

FIG. 11 is a block diagram illustrating an exemplary transport capacity scheduling system according to some embodiments of the present disclosure. As illustrated, modules in the transport capacity scheduling system 1100 are the same with the modules in the transport capacity scheduling system 1000. For brevity, the descriptions of the modules are omitted here. Further, the determination module 1010 may include a definition unit 1112, a cluster determination unit 1114, and a first calculation unit 1116. In some embodiments, the transport capacity scheduling system 1100 may be integrated into the server 110. For example, the transport capacity scheduling system 1100 may be part of the processing engine 112.

The definition unit 1112 may be configured to define a maximum radius and a minimum service request number.

The cluster determination unit 1114 may be configured to determine a plurality of first regions, each of the plurality of first regions having a radius less than or equal to the maximum radius; and determine a plurality of second regions among the plurality of first regions, the number count of service requests in each of the plurality of second regions being larger than the minimum service request number.

The first calculation unit 1116 may be configured to determine a distribution entropy based on the total number count of service requests in the plurality of second regions according to a preset equation; and determine the service request number that maximizes the distribution entropy as an actual number count of service requests. Further, the determination module 1010 may determine the target radius and the target service request number based on the actual number count of service requests according to equation (1).

In some embodiments, the definition unit 1112 may determine the maximum radius and the minimum service request number. During rush hours, since the number count of service requests is relatively large, in order to avoid a plurality of regions being automatically merged, the maximum radius should be appropriately reduced, or the minimum service request number should be appropriately increased. In non-rush hours, since the number count of service requests is relatively small and the distribution of the service requests is relatively disperse, in order to avoid mistaking the service requests as noises, the maximum radius should be appropriately increased or the minimum service request number should be appropriately reduced. After the maximum radius and the minimum service request number are defined, the cluster determination unit 1114 may determine a plurality of first regions, each of the plurality of first regions having a radius less than or equal to the maximum radius. The cluster determination unit 1114 may further determine a plurality of second regions among the plurality of first regions, the number count of service requests in each of the plurality of second regions being larger than the minimum service request number. The first calculation unit 1116 may determine a total number count of service requests in the plurality of second regions by adding a plurality of number counts of service requests in the plurality of second regions, and determine a distribution entropy based on the total number count of service requests in the second regions, wherein the total number count of service requests is determined based on the number count of the second regions and the number count of service requests in each of the second regions. According to equation (1), the distribution entropy is positively correlated with the number count of the plurality of second regions; that is, the larger the number count of clusters is, the larger the distribution entropy may be, and the more uniform the distribution of service request numbers corresponding to the clusters is, the larger the distribution entropy may be. The determination module 1010 may determine a service request number that maximizes the distribution entropy as an actual number count of service requests and the target radius, and determine the target service request number determined based on the actual number count of service requests. Accordingly, it can be ensured that the number count of service requests in each of the divided regions is relatively large and the distribution of the divided regions may be relatively uniform, thereby improving the accuracy of transport capacity scheduling.

Figure 12:
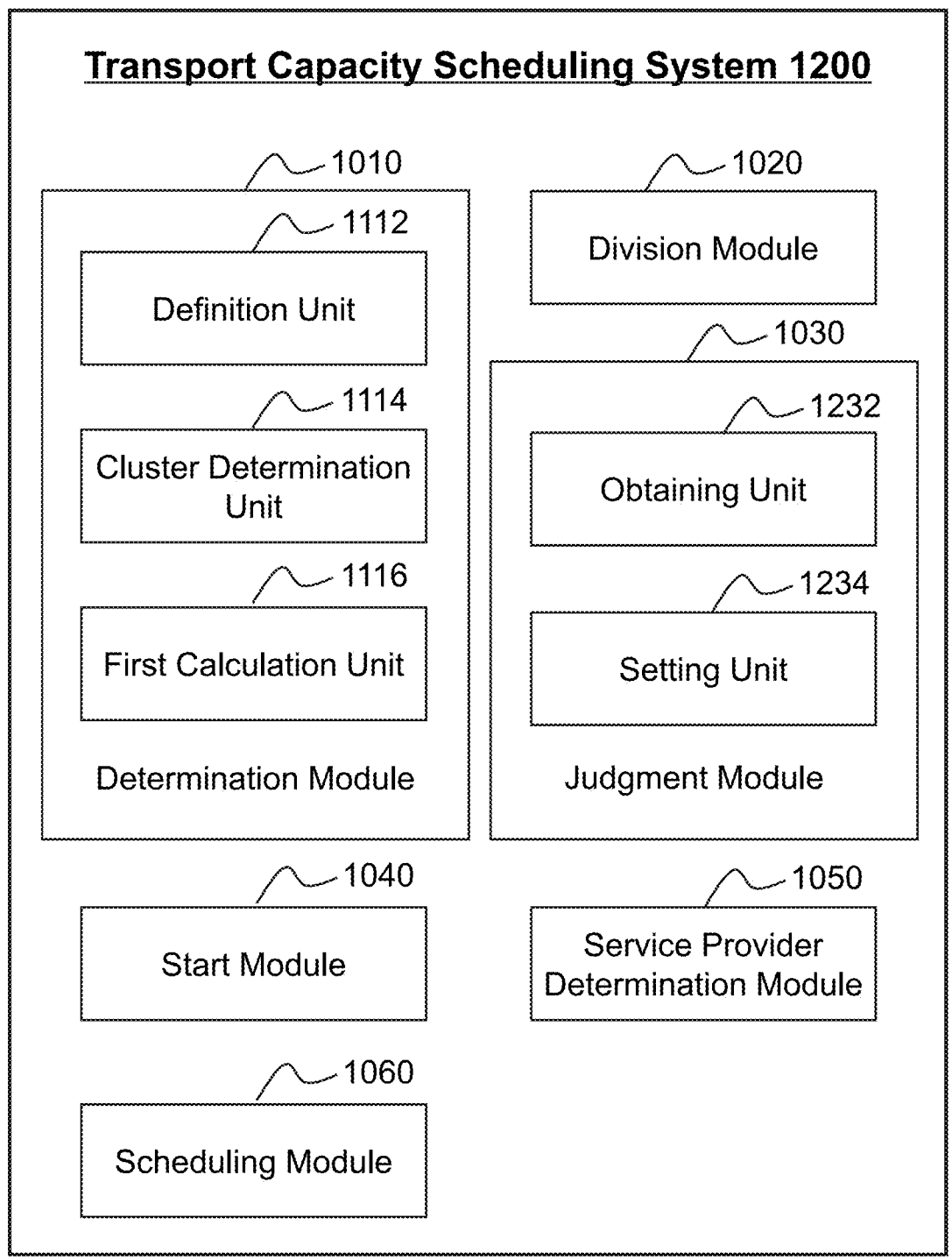
FIG. 12 is a block diagram illustrating an exemplary transport capacity scheduling system according to some embodiments of the present disclosure.

FIG. 12 is a block diagram illustrating an exemplary transport capacity scheduling system according to some embodiments of the present disclosure. As illustrated, modules in the transport capacity scheduling system 1200 are the same with the modules in the transport capacity scheduling system 1000 or 1100. For brevity, the descriptions of the modules are omitted here. Further, the judgment module 1030 may include an obtaining unit 1232 and a setting unit 1234. In some embodiments, the transport capacity scheduling system 1200 may be integrated into the server 110. For example, the transport capacity scheduling system 1200 may be part of the processing engine 112.

The obtaining unit 1232 may be configured to determine an allocation rate of the at least one of the plurality of candidate regions and the ratio of the number count of available service providers to the number count of service requests to be allocated in the at least one of the plurality of candidate regions.

The setting unit 1234 may be configured to determine an estimated allocation rate of the at least one of the plurality of candidate regions, in response to a determination that the allocation rate of the at least one of the plurality of candidate regions is less than a predetermined allocation rate. The obtaining unit 1232 may be further configured to determine an estimated ratio of the number count of available service providers to the number count of service requests to be allocated based on an estimated allocation rate of the at least one of the plurality of candidate regions.

In some embodiments, the obtaining unit 1232 may determine an allocation rate of at least one of the plurality of candidate regions and the ratio of the number count of available service providers to the number count of service requests to be allocated in the at least one of the plurality of candidate regions. If the allocation rate is less than a predetermined allocation rate; that is, the allocation rate is relatively low, the setting unit 1234 may determine an estimated allocation rate of the at least one of the plurality of candidate regions. The obtaining unit 1232 may determine an estimated ratio of the number count of available service providers to the number count of service requests to be allocated based on the estimated allocation rate, wherein the estimated ratio of the number count of available service providers to the number count of service requests to be allocated may be a linear function of the estimated allocation rate. The judgment module 1030 may determine whether the ratio of the number count of available service providers to the number count of service requests to be allocated is less than the estimated ratio of the number count of available service providers to the number count of service requests to be allocated. The judgment module 1030 may determine the at least one of the plurality of candidate regions as unhealthy based on a result of the determination that the ratio of the number count of available service providers to the number count of service requests to be allocated is less than the estimated ratio of the number count of available service providers to the number count of service requests to be allocated. Available service providers may be scheduled to the at least one of the plurality of candidate regions. Accordingly, a success rate of online taxi-hailing services and a success rate of receiving service requests in the at least one of the plurality of candidate regions may be improved.

Figure 13:
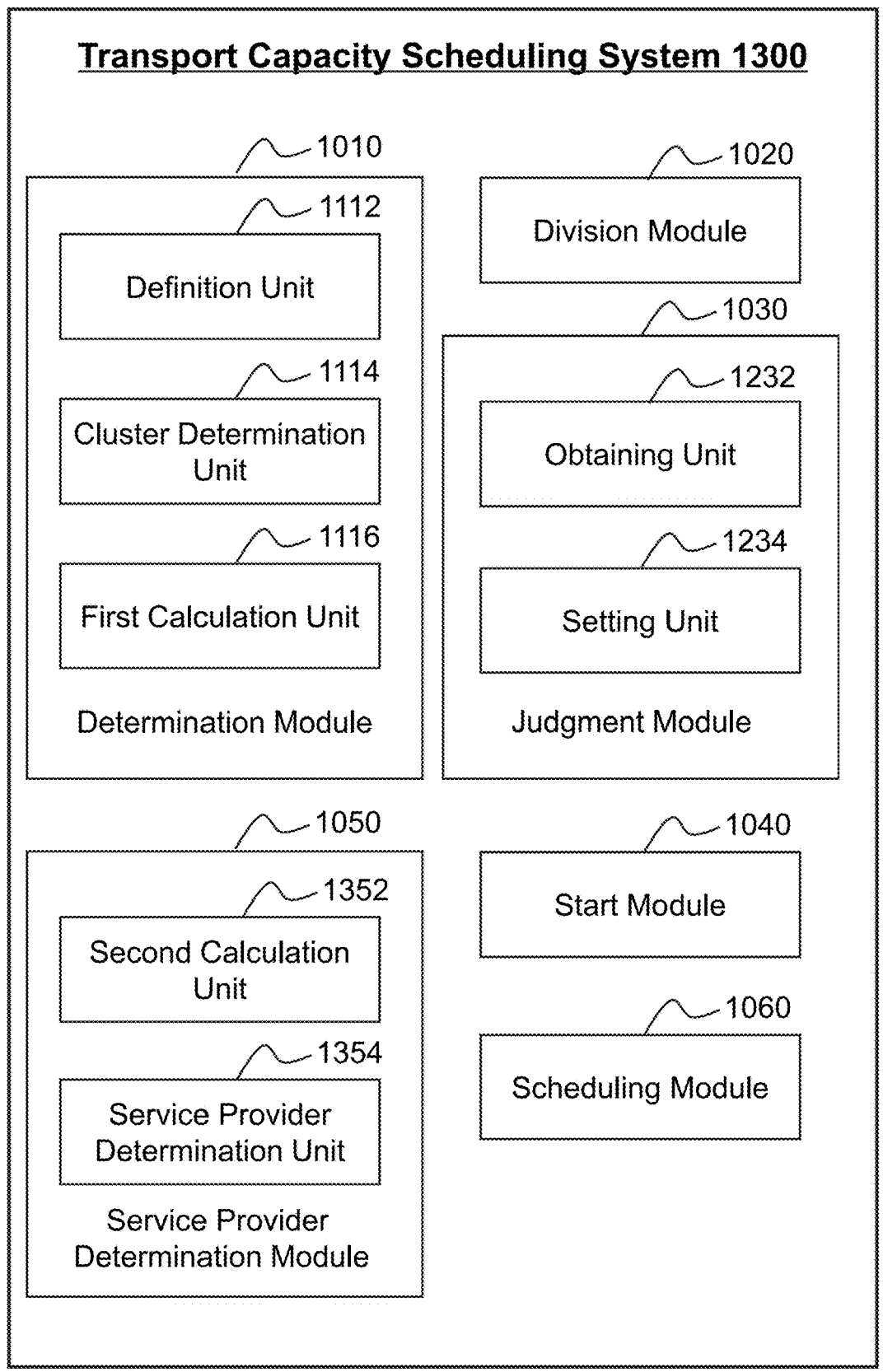
FIG. 13 is a block diagram illustrating an exemplary transport capacity scheduling system according to some embodiments of the present disclosure.

FIG. 13 is a block diagram illustrating an exemplary transport capacity scheduling system according to some embodiments of the present disclosure. As illustrated, modules in the transport capacity scheduling system 1300 are the same with the modules in the transport capacity scheduling system 1000, 1100, and/or 1200. For brevity, the descriptions of the modules are omitted here. Further, the service provider determination module 1050 may include a second calculation unit 1352 and a service provider determination unit 1354. In some embodiments, the transport capacity scheduling system 1300 may be integrated into the server 110. For example, the transport capacity scheduling system 1300 may be part of the processing engine 112.

The second calculation unit 1352 may be configured to determine a rectangle boundary of the at least one of the plurality of candidate regions.

The service provider determination unit 1354 may be configured to determine a new rectangle boundary by expanding an area from the rectangle boundary; determine service providers in a region difference between the rectangle boundary and the new rectangle boundary; and determine at least one of the service providers satisfying a preset condition as the at least one available service provider, wherein the preset condition is that the number count of service requests within a first predetermined range of a location of the at least one of the service providers is less than a first predetermined service request number and the location of the at least one of the service providers is not in a region with a high request density.

In some embodiments, the second calculation unit 1352 may determine a rectangle boundary of the at least one of the plurality of candidate regions according to a boundary determination process. According to the boundary determination process, the maximum latitude and longitude (maxing, maxlat) and the minimum latitude and longitude (mining, minlat) of start locations of the service requests in the at least one of the plurality of candidate regions may be determined, and the boundary of the region may be determined based on a rectangle expressed by the following four points including (maxing, maxlat), (maxing, minlat), (mining, maxlat), (mining, minlat). A new rectangle boundary may be determined by expanding an area from the rectangle boundary, which refers to expanding the four points by a predetermined value, determining four new points respectively, and determining the new rectangle boundary based on a rectangle expressed by the four new points. The service provider determination unit 1354 may determine a region difference between the rectangle boundary and the new rectangle boundary. The region difference may be a concentric-square-shaped region between the rectangle boundary and the new rectangle boundary. The service provider determination unit 1354 may determine at least one of the service providers in the region difference satisfying a preset condition as the at least one available service provider, wherein the preset condition is that the number count of service requests within a first predetermined range of the location of the at least one of the service providers is less than a first predetermined service request number and the location of the at least one of the service providers is not in a region with a high service request density. Therefore, it is possible to determine service providers near whom the number count of service requests is relatively small and who are closer to the target scheduling region, ensuring the effectiveness and the reasonableness of transport capacity scheduling. Accordingly, a better supply and demand effect of the number count of available service providers to the number count of service requests to be allocated may be achieved.

Figure 14:
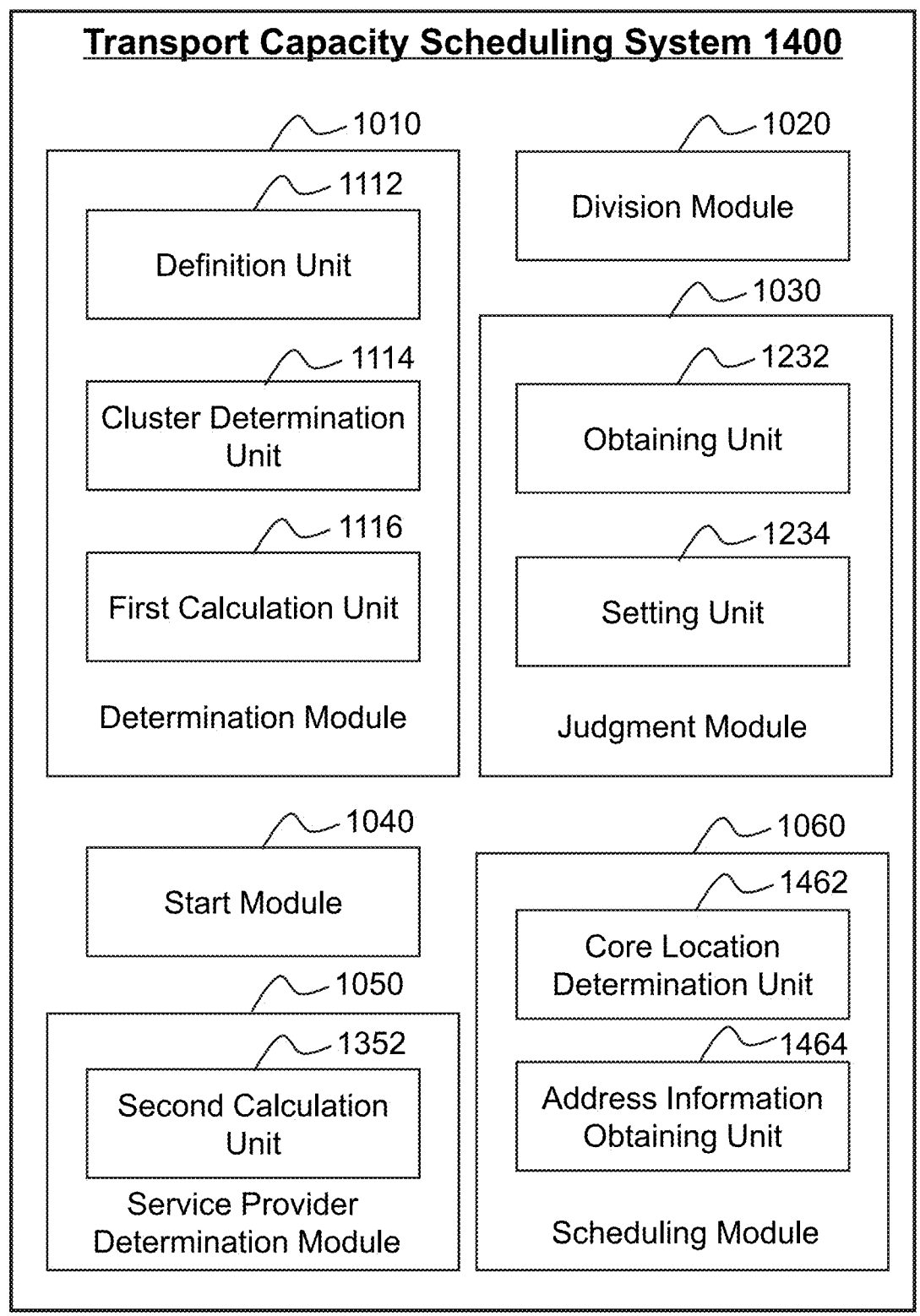
FIG. 14 is a block diagram illustrating an exemplary transport capacity scheduling system according to some embodiments of the present disclosure.

FIG. 14 is a block diagram illustrating an exemplary transport capacity scheduling system according to some embodiments of the present disclosure. As illustrated, modules in the transport capacity scheduling system 1400 are the same with the modules in the transport capacity scheduling system 1000, 1100, 1200, and/or 1300. For brevity, the descriptions of the modules are omitted here. Further, the scheduling module 1060 may include a core location determination unit 1462 and an address information obtaining unit 1464. In some embodiments, the transport capacity scheduling system 1400 may be integrated into the server 110. For example, the transport capacity scheduling system 1400 may be part of the processing engine 112.

The core location determination unit 1462 may be configured to determine a core location in the at least one of the plurality of candidate regions, wherein the number count of service requests within a second predetermined range of the core location is larger than a second predetermined service request number.

The address information obtaining unit 1464 may be configured to obtain address information of the core location.

In some embodiments, since the at least one of the plurality of candidate regions (i.e., a region with a high service request density) is relatively large, after the at least one available service provider is determined, the core location determination unit 1462 should schedule the at least one available service provider to a core location nearest to the at least one available service provider. As used herein, the core location refers to a location where the number count of service requests within a predetermined range from the location is not less than a predetermined service request number. The address information obtaining unit 1464 may obtain address information of a plurality of core location. The scheduling module 1060 may schedule the at least one available service provider to a core location that is nearest to the available service provider. Accordingly, available service providers can be quickly scheduled to a region with a high service request density and receiving rates of the available service providers may be improved.

In some embodiments, the address information obtaining unit 1464 may be specifically configured to obtain the latitude and the longitude of the core location and determine address information of the core location based on the latitude and the longitude of the core location. As used herein, the address information of the core location may include a district, a street, and a business district.

Some embodiments of the present disclosure may take the form of a computer program product embodied in one or more computer-readable media having computer readable program code embodied thereon. For example, the computer-readable storage medium may include but not limited to disk storage, a CD-ROM, and optical memory.

The present disclosure may also provide a first computer storage medium including first instructions. When executing by at least one processor, the first instructions may direct the at least one processor to perform a process (e.g., process 400, process 500, process 600, process 700, process 800, process 900) described elsewhere in the present disclosure.

FIG. 15A through FIG. 15D are schematic diagrams illustrating an exemplary process for determining a plurality of regions based on a clustering operation according to some embodiments of the present disclosure. The transport capacity scheduling method according to some embodiments may include the following operations.

1. Regional Granularity for Reasonably Determining Regions.

Figure 15A:
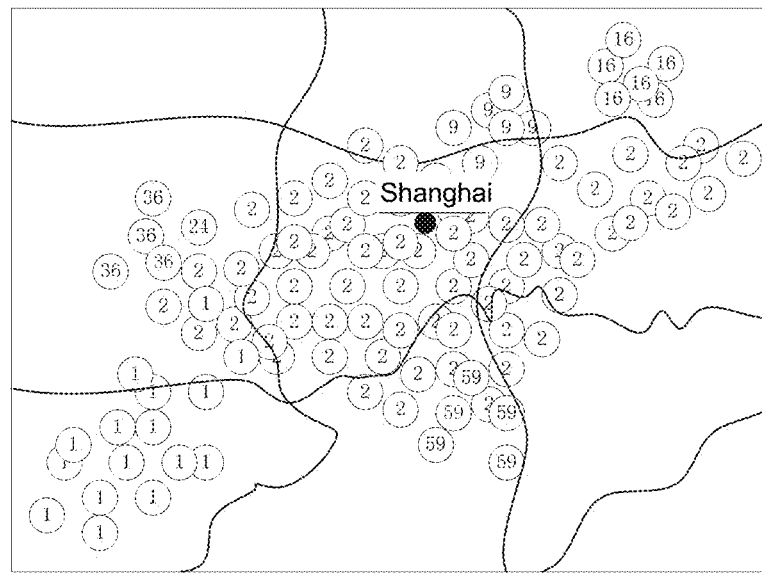
FIG. 15A through FIG. 15D are schematic diagrams illustrating an exemplary process for determining a plurality of regions based on a clustering operation according to some embodiments of the present disclosure.
Figure 15B:
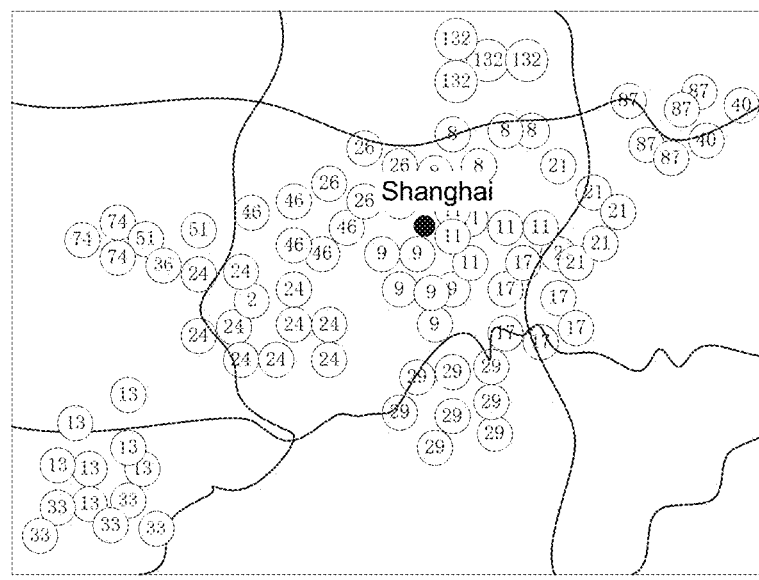
Figure 15C:
Figure 15D:
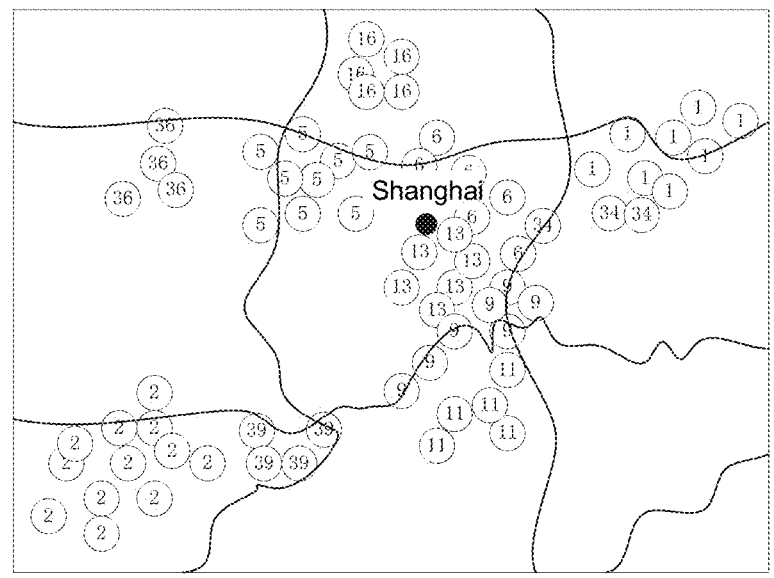

According to a Dbscan algorithm, a maximum radius r and a minimum service request number m should be defined, and a clustering operation may be performed based on the two parameters. During the clustering operation, adjacent regions which are relatively close to each other may be merged automatically, and noises may be automatically identified. As illustrated in FIGS. 15A-15D, different maximum radiuses r, different minimum service request numbers m, and service request numbers in different time periods t may be selected and different clustering results may be determined. FIG. 15A illustrates a cluster result under a condition "r=1500 meters, m=5, t=08:00 to 08:10," FIG. 15B illustrates a cluster result under a condition "r=1000 meters, m=5, t=08:00 to 08:10," FIG. 15C illustrates a cluster result under a condition "r=1000 meters, m=5, t=06:36 to 06:46," and FIG. 15D illustrates a cluster result under a condition "r=1800 meters, m=4, t=06:36 to 06:46."

Comparing FIG. 15A through FIG. 15D, it can be seen that when the service request number in the city within a time period from 08:00 to 08:10 is 400, the clustering result illustrated in FIG. 15B is better than that illustrated in FIG. 15A. As illustrated in FIG. 15A, the entire middle region is determined as a cluster, whereas as illustrated in FIG. 15B, although the number count of discarded points is relatively large, the regional granularity is relatively better than that illustrated in FIG. 15A. Further, it also can be seen that when the number count of service requests in the city within a time period from 06:36 to 06:46 is 167, the clustering result illustrated in FIG. 15D is significantly better than the result illustrated in FIG. 15C.

According to the four situations illustrated in FIG. 15A through FIG. 15D, it can be seen that since the number count of service requests is relatively large during rush hours, in order to avoid that a plurality of regions are automatically merged, the maximum radius r should be appropriately reduced or the minimum service request number m should be increased. Otherwise, since the number count of service requests is relatively small and the distribution of the service requests is relatively dispersed in non-rush hours, in order to avoid that some of the service requests are mistaken as noises, the maximum radius r should be appropriately increased or the minimum service request number m should be appropriately reduced.

With business needs taken into consideration, service request numbers and regional distributions in different cities are quite different. Even if for a specific city, service request numbers and regional distributions in different time periods are quite different. Therefore, for different cities or different time periods in a specific city, the two parameters r and m of the Dbscan algorithm need to be defined separately. Accordingly, although the Dbscan algorithm is an unsupervised learning algorithm, selecting appropriate r and m in different situations becomes a supervised learning process based on historical data.

The estimated cluster distribution should satisfy the following objectives:
objective 1: the number count of service requests included in each cluster should not be too small;
objective 2: the number count of clusters should not be too small; and
objective 3: the distribution of a plurality of clusters should be as uniform as possible.

According to the three objectives, the cluster results illustrated in FIG. 15B and FIG. 15D are relatively good and the cluster results illustrated in FIG. 15A and FIG. 15C are relatively poor. According to objective 1, the number count of service requests included in each cluster should not be too small. Therefore, a minimum value can be set for m. It is assumed that the minimum value is 5, the minimum service request number of each cluster is greater than 5. Otherwise the service requests may be identified as noises. Further, a broadcast distance associated with service request allocation may be taken into consideration. Therefore, the maximum value of r should not exceed 2000 meters. As used herein, the term "broadcast distance" refers to a distance range from a start location of a service request and the service request may be allocated to available service providers within the distance range.

In order to evaluate objective 2 and objective 3, the concept of distribution entropy is introduced here. The definition of the distribution entropy is that, for a certain time period in a city, for a given r and a given m, a distribution entropy of clusters determined based on the Dbscan algorithm may be expressed as equation (1). According to equation (1), it can be seen that $E_{r,m} \in [0, \log n]$ (i.e., $E_{r,m}$ is positively correlated with n); that is, the more the number count of clusters is, the larger the distribution entropy may be; the more uniform the distribution of the service request numbers in the clusters is, the larger the distribution entropy may be, which is consistent with objective 2 and objective 3. Therefore, the model becomes an optimization problem as follows:

$$\begin{cases} \text{target: } \max(E_{r,m}) \\ m \geq 5 \\ r \leq 2000 \\ m = f(c) \\ r = g(c) \\ E_{r,m} = -\sum_{i=1}^{n} P_i \times \log(P_i) \\ \sum_{i=1}^{n} P_i = 1 \end{cases} \quad (3)$$

where f(c) or g(c) is a linear function or a non-linear function which may be expressed as equation (4) and equation (5) below respectively:

$$m = f(c) = \frac{1}{1 + e^{(a1 \times c + b1)}}, \quad (4)$$

$$r = g(c) = \frac{1}{1 + e^{(a2 \times c + b2)}}, \quad (5)$$

where c is a constant which may be default settings of the on-demand service system 100 or may be adjustable under different situations, and $a_1$, $b_1$, $a_2$, and $b_2$ may be determined based on sample data according to a linear regression under the objectives.

Further, the model may be validated according to the following process. As illustrated, Table 1 shows the sample data under the situation illustrated in FIG. 15A, Table 2 shows the sample data under the situation illustrated in FIG. 15B, Table 3 shows the sample data under the situation illustrated in FIG. 15C, and Table 4 shows the sample data under the situation illustrated in FIG. 15D.

TABLE 1

| Cluster Serial Number | Service Request Number | Proportion of Service Request Number (Pi) |
|---|---|---|
| 1 | 39 | 0.117117 |
| 2 | 257 | 0.771772 |
| 9 | 9 | 0.027027 |
| 16 | 8 | 0.024024 |
| 24 | 6 | 0.018018 |
| 36 | 8 | 0.024024 |
| 59 | 6 | 0.018018 |

TABLE 2

| Cluster Serial Number | Service Request Number | Proportion of Service Request Number (Pi) |
|---|---|---|
| 8 | 13 | 0.053498 |
| 9 | 23 | 0.09465 |
| 11 | 20 | 0.082305 |
| 13 | 16 | 0.065844 |
| 17 | 13 | 0.053498 |
| 21 | 22 | 0.090535 |
| 24 | 33 | 0.135802 |
| 26 | 15 | 0.061728 |
| 29 | 14 | 0.057613 |
| 33 | 9 | 0.037037 |
| 40 | 7 | 0.028807 |
| 46 | 31 | 0.127572 |

TABLE 3

| Cluster Serial Number | Service Request Number | Proportion of Service Request Number (Pi) |
|---|---|---|
| 12 | 5 | 0.121951 |
| 23 | 8 | 0.195122 |
| 26 | 5 | 0.121951 |
| 31 | 13 | 0.317073 |
| 75 | 5 | 0.121951 |
| 91 | 5 | 0.121951 |

TABLE 4

| Cluster Serial Number | Service Request Number | Proportion of Service Request Number (Pi) |
|---|---|---|
| 1 | 17 | 0.144068 |
| 2 | 25 | 0.211864 |
| 5 | 14 | 0.118644 |
| 6 | 15 | 0.127119 |
| 9 | 12 | 0.101695 |
| 11 | 8 | 0.067797 |
| 13 | 8 | 0.067797 |
| 16 | 4 | 0.033898 |
| 33 | 6 | 0.050847 |
| 34 | 4 | 0.033898 |
| 39 | 5 | 0.042373 |
| 51 | 5 | 0.020576 |
| 74 | 7 | 0.028807 |
| 87 | 10 | 0.041152 |
| 132 | 5 | 0.020576 |

The distribution entropies of the cluster results illustrated in FIGS. 15A-15D may be determined. The distribution entropy of the clustering result illustrated in FIG. 15A may be determined as $E_{r,m}1=0.26988$, and the distribution entropy of the cluster result illustrated in FIG. 15B may be determined as $E_{r,m}2=1.14058$. According to the distribution entropies, $E_{r,m}2>E_{r,m}1$, which is consistent with the expectation that the cluster result illustrated in FIG. 15B is better than that illustrated in FIG. 15A. The distribution entropy of the cluster result illustrated in FIG. 15C may be determined as $E_{r,m}3=0.74241$, and the distribution entropy of the cluster result illustrated in FIG. 15D may be determined as $E_{r,m}4=0.97075$. According to the distribution entropies, $4>E_{r,m}3$, which is consistent with the expectation that the cluster result illustrated in FIG. 15D is better than that illustrated in FIG. 15C.

Furthermore, it can be seen that $E_{r,m}2>E_{r,m}4>E_{r,m}3>E_{r,m}1$, accordingly, the larger the number count of the service requests is, the larger the number count of the clusters is, and the more uniform the distribution of the clusters is, the larger the distribution entropy may be. As illustrated in FIG. 15C and FIG. 15D, the distributions of the clusters are both relatively uniform, but the cluster result illustrated in FIG. 15D recalls more points than that illustrated in FIG. 15C, therefore, the number count of the clusters illustrated in FIG. 15D is relatively large. As illustrated in FIG. 15A, a plurality of clusters are merged, resulting in that the number count of the clusters is relatively small. The distribution of the clusters is also non-uniform, and therefore, the distribution entropy is the lowest.

2. Standards for Determining Whether a Region is Healthy.

The standards for determining whether a region is healthy may include the allocation rate and the ratio of the number count of available service providers to the number count of service requests to be allocated. The allocation rate and the ratio of the number count of available service providers to the number count of service requests to be allocated satisfy a linear relationship. For a region with a low allocation rate, an estimated allocation rate may be determined, an estimated ratio of the number count of available service providers to the number count of service requests to be allocated may be determined according to equation (2), and then the estimated ratio of the number count of available service providers to the number count of service requests to be allocated may be compared with the current ratio of the number count of available service providers to the number count of service requests to be allocated. Further, a scheduling instruction may be determined based on a result of the determination that the ratio of the number count of available service providers to the number count of service requests to be allocated is insufficient to a certain extent. As used herein, the term "insufficient to a certain extent" refers to that an absolute value of a difference between the ratio of the number count of available service providers to the number count of service requests to be allocated and the estimated ratio of the number count of available service providers to the number count of service requests to be allocated is larger than a threshold.

According to the linear relationship, the situation illustrated in FIG. 15B is compared with the situation illustrated in FIG. 15D. For the situation illustrated in FIG. 15B, the time period (8:00 to 8:10) is within morning rush hours; it can be seen that the allocation rate is relatively low and the ratio of the number count of available service providers to the number count of service requests to be allocated is seriously insufficient. Table. 5 illustrates three regions where the service request number is relatively large, the allocation rate is significantly low, and the ratio of the number count of available service providers to the number count of service requests to be allocated is significantly insufficient; that is, the three regions are severely unhealthy and a transport capacity scheduling for scheduling service providers to the three regions can be performed.

TABLE 5

| Cluster Serial Number | Service Request Number | Service Success Number | Service Provider Number | Allocation Rate | Ratio of Available Service Provider Number to Service Request Number |
|---|---|---|---|---|---|
| 21 | 22 | 7 | 140 | 0.318182 | 6.363636 |
| 24 | 33 | 12 | 299 | 0.363636 | 9.060606 |
| 46 | 31 | 11 | 275 | 0.354839 | 8.870968 |

For the situation illustrated in FIG. 15D, the time period (6:36 to 6:46) is within relatively non-rush hours, and for regions where the service request number is relatively large, the allocation rate is significantly low, and the ratio of the number count of available service providers to the number count of service requests to be allocated is insufficient, a transport capacity scheduling for scheduling service providers to the three regions can be performed. Table 6 illustrates four regions selected from the regions illustrated in Table 4, for which a transport capacity scheduling can be performed. For cluster 5 illustrated in Table 4, since the allocation rate is acceptable and the ratio of the number count of available service providers to the number count of service requests to be allocated is relatively high, a transport capacity scheduling for scheduling service providers to a region corresponding to cluster 5 may not be performed.

TABLE 6

| Cluster Serial Number | Service Request Number | Success Number | Service Provider Number | Allocation Rate | Ratio of Available Service Provider Number to Service Request Number |
|---|---|---|---|---|---|
| 1 | 17 | 7 | 67 | 0.411765 | 3.941176 |
| 2 | 25 | 15 | 134 | 0.6 | 5.36 |
| 9 | 12 | 5 | 72 | 0.416667 | 6 |
| 11 | 8 | 4 | 31 | 0.5 | 3.875 |

Considering the above situations illustrated in FIG. 15B and FIG. 15D, it can be summarized that a region for which a transport capacity scheduling can be performed may satisfy the following features:

feature 1: the service request number in the region is relatively large (in a scenario in which the service request number is low, even if service providers are scheduled to the region, it may be impossible for the service providers to receive service requests); that is, the service request number is larger than a service request number threshold;

feature 2: the allocation rate of the region is relatively low (which is one of the core scheduling targets); that is, the allocation rate is lower than an allocation rate threshold; and feature 3: the ratio of the number count of available service providers to the number count of service requests to be allocated is insufficient in the region (which can be solved based on a transport capacity scheduling, if the ratio of the number count of available service providers to the number count of service requests to be allocated is sufficient, a transport capacity scheduling is somehow useless); that is, the ratio of the number count of available service providers to the number count of service requests to be allocated is lower than a ratio threshold.

For different cities and different time periods, the above three thresholds may be different, and the values of the thresholds may be determined based on historical data. For the situation illustrated in FIG. 15B, the service request number threshold, the allocation rate threshold, and the ratio threshold may be determined as 15, 0.6, and 10 respectively; for the situation illustrated in FIG. 15D, the service request number threshold, the allocation rate threshold, and the ratio threshold may be determined as 8, 0.65, and 8 respectively.

3. How to Determine Available Service Providers.

The standard for determining available service providers should be considered in service providers' point of view; that is, under what circumstances the service providers will be willing to accept the scheduling. According to experience, the following objectives should be satisfied as much as possible:

objective 1, the number count of service requests within a predetermined range of a location of a service provider is relatively small;

objective 2, the number count of service requests in a target scheduling region is relatively large; and objective 3, a distance between the location of the service provider and the target scheduling region is relatively small.

In order to achieve the three objectives, the following operations may be performed.

In operation 1, for a specific unhealthy region, the boundary of the region may be determined according to a boundary determination process. According to the boundary determination process, the maximum latitude and longitude (also referred to as maxing and maxlat, respectively) and the minimum latitude and longitude (also referred to as mining and minlat, respectively) of start locations of the service requests in the region may be determined, and the boundary of the region may be determined based on a rectangle expressed by the following four points including (maxing, maxlat), (maxing, minlat), (mining, maxlat), (mining, minlat).

In operation 2, after the boundary of the region is determined, a second boundary may be determined by expanding an area from the boundary, which refers to expanding the four points by 1000 meters, determining four new points respectively, and determining the second boundary based on a rectangle expressed by the four new points. Further, service providers in a region difference (i.e., a concentric-square-shaped region) between the boundary and the second boundary may be determined as available service providers.

In operation 3, service providers in the concentric-square-shaped region satisfying the following condition may be determined as the available service providers. As used herein, the condition refers to that the number count of service requests within 2000 meters range from a location of a service provider is less than 3 and the service provider is not in a region with a high service request density (i.e., a region with a service request density larger than a density threshold).

In operation 4, after available service providers are determined, since an area of a region with a high service request density (i.e., a target scheduling region) is relatively large, a core location may be determined for a specific available service provider. As used herein, the number count of service requests from a range r from the core location is not less than m.

In operation 5, for each available service provider, the nearest core location may be determined, and a scheduling instruction may be transmitted to the available service provider.

Figure 17:
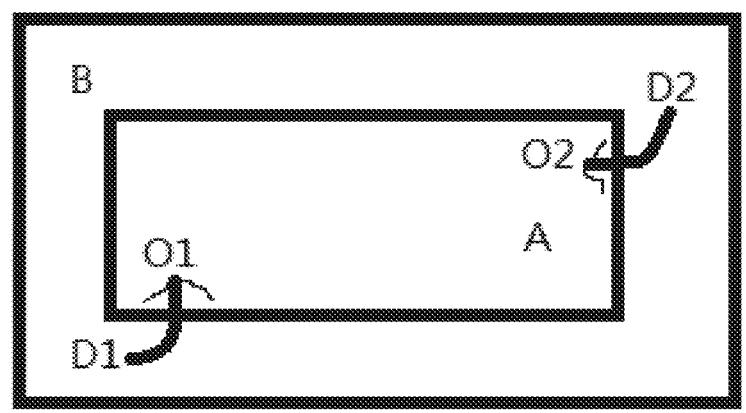
FIG. 17 is a schematic diagram illustrating an exemplary process for scheduling service providers according to some embodiments of the present disclosure.

As illustrated in FIG. 17, region A is a region with a high service request density, region B (i.e., the concentric-square-shaped region) refers to a region including available service providers, D1 and D2 refer to available service providers, and O1 and O2 refer to core locations which are nearest to the two available service providers respectively.

4. Address Information Description of the Scheduling Region.

After the available service providers and the core locations to which the available service providers will be scheduled are determined, the key is the address description of the core locations. The latitude and the longitude of the core location may be obtained, the address information of the core location may be determined based on the latitude and the longitude of the core location according to a map API (e.g., Baidu map API), and the address information may be expressed by a combination of "district+street+business."

FIG. 18 is a flowchart illustrating an exemplary process for scheduling transport capacity according to some embodiments of the present disclosure. The process 1800 may be executed by the on-demand service system 100. For example, the process 1800 may be implemented as a set of instructions (e.g., an application) stored in the storage ROM 230 or RAM 240. The processor 220 and/or modules and/or unit in FIGS. 20-25 may execute the set of instructions, and when executing the instructions, the processor 220, the modules, and/or the units may be configured to perform the process 1800. The operations of the illustrated process presented below are intended to be illustrative. In some embodiments, the process 1800 may be accomplished with one or more additional operations not described and/or without one or more of the operations discussed. Additionally, the order in which the operations of the process as illustrated in FIG. 18 and described below is not intended to be limiting.

In 1810, in response to a detection that a target region lacks service providers, a scheduling instruction may be transmitted to one or more available service providers in a candidate service region (also referred to as a "non-busy region") associated with the target region, wherein the scheduling instruction is configured to request the one or more available service providers to respond to indicate whether the one or more available service providers agree to go to the target region. As used herein, the term "lacks service providers" refers to that the ratio of the number count of available service providers in the region to the number count of service requests to be allocated in the region is less than a predetermined threshold, or the number count of available service providers in the region is less than the number count of service requests to be allocated in the region.

Generally, in order to improve service efficiency of Online-to-Offline services, a relatively large area may be divided into a plurality of service regions (also referred to as a "candidate region" described in connection with FIGS. 6-9) according to an area division rule. For example, an area may be divided into a plurality of service regions according to the distribution of office buildings, wherein the service region refers to a region where one or more available service providers provide services.

In some embodiments of the present disclosure, the available service provider refers to a user who is waiting for receiving service requests, that is, a user who provides Online-to-Offline services. In a scenario of online taxi-hailing, the available service provider refers to a driver; in a scenario of take-out delivery, the available service provider refers to a delivery staff. In a scenario of other Online-to-Offline services, the available service provider refers to a user of an identity. The embodiments of the present disclosure are not intended to be limiting.

In some embodiments of the present disclosure, the transport capacity refers to a supply and demand relationship between the number count of service requests in a service region and the number count of available service providers in the service region. For example, the transport capacity refers to the ratio of the number count of available service providers in the service region to the number count of service requests in the service region. The transport capacity of a service region is considered to be balanced if the number count of available service providers is close to the number count of service requests in the service region; the transport capacity of a service region is considered to be abundant if the number count of available service providers is much larger than the number count of service requests in the service region (i.e., the ratio of the number count of available service providers in the service region to the number count of service requests in the service region is larger than a first threshold); and the transport capacity of a service region is considered to be insufficient if the number count of available service providers is much less than the number count of service requests in the service region (i.e., the ratio of the number count of available service providers in the service region to the number count of service requests in the service region is less than a second threshold).

In some embodiments of the present disclosure, the transport capacity of the target region may be determined by determining the number count of service requests and the number count of available service providers in the target region.

In some embodiments of the present disclosure, the transport capacity of the target region may be determined in real time or only when a certain preset triggering condition is satisfied. Specifically, whether the transport capacity of the target region is insufficient may be determined when an event of a preset type is detected, wherein the event of a preset type may include at least one of weather of a preset type, a rush hour, a festival, or a conference.

In some embodiments of the present disclosure, the weather of the preset type may include rain, snow, wind, smog, hail, or the like, or any other bad weather that may affect traffic condition. The festival may include a festival when a great number of people intensively travel, such as National Day, Labor Day, etc. It should be understood that the event of a preset type may be any other event, such as a star concert, and so on. The present disclosure is not intended to be limiting.

Generally, an event of a preset type may affect traffic condition in some service regions. For example, if the event of the preset type is "rush hour," the traffic condition of a service region with relatively more office buildings may be congested.

In some embodiments of the present disclosure, current weather information may be obtained from the website of a weather bureau or the Internet, and whether the current weather is the weather of a preset type may be determined based on the current weather information. If the current weather is the weather of a preset type, it may be determined that an event of a preset type has happened. Alternatively, current time information may be obtained and whether it is a rush hour or a festival may be determined based on the current time information.

In some embodiments of the present disclosure, the candidate service region of the target region may include any service region near the target region, any service region with an abundant transport capacity near the target region, or a defined service region. The embodiments of the present disclosure are not intended to be limiting.

In some embodiments of the present disclosure, in the scenario of online taxi-hailing, the available service provider in the candidate service region refers to a driver currently located in the candidate service region; in the scenario of take-out delivery, the available service provider in the candidate service region refers to a delivery staff whose delivery range is within the candidate service region.

In some embodiments of the present disclosure, the scheduling instruction may be transmitted to the one or more available service providers by transmitting a corresponding message to a third-party application of the Online-to-Offline services installed in a terminal device of the one or more available service providers. In the scenario of online taxi-hailing, the third party application of the Online-to-Offline services installed in the terminal device may be a map application or a driver application of online taxi-hailing. In the scenario of take-out delivery, the third party application of the Online-to-Offline services installed in the terminal device may be a take-out application.

In some embodiments of the present disclosure, when the scheduling instruction is transmitted to the third party application of the Online-to-Offline services installed in the terminal device of the one or more available service providers, the third party application of the Online-to-Offline services may display the scheduling instruction on a user interface of the service application in the form of a window or a card and provide an interface for inputting feedback information by a user.

In some embodiments of the present disclosure, the scheduling instruction may be transmitted to the one or more available service providers in the candidate service region. The scheduling instruction may be configured to request the one or more available service providers to respond to indicate whether the one or more available service providers agree to accept the scheduling of the Online-to-Offline service system.

In 1820, in response to one or more acceptances indicating that the one or more available service providers agree to go to the target region, service requests in the target region may be allocated to the one or more available service providers.

In some embodiments of the present disclosure, responses provided by the available service providers may include accepting the scheduling of the Online-to-Offline service system; that is, agreeing to go to the target region; or refusing the scheduling of the Online-to-Offline service system, that is, refusing to go to the target region.

In some embodiments of the present disclosure, the service requests in the target region may be allocated to the one or more available service providers when it is determined that the one or more available service providers in the candidate service region accept the scheduling of the Online-to-Offline service system.

Generally, a service request corresponding to the Online-to-Offline services includes a start location and a destination. For example, in the scenario of online taxi-hailing, the service request refers to a travel service request which includes a pick-up location (i.e., the start location) and a drop-off location (i.e., the destination) defined by a passenger. As another example, in the scenario of take-out delivery, the service request refers to a take-out service request which includes a business address (i.e., the start location) and a customer address (i.e., the destination). During a process for providing the service, a travel route of a user who provides the service needs to cover at least one of the start location or the destination. In some embodiments of the present disclosure, the start location and/or the destination of the service request allocated to the one or more available service providers should be within the target region.

Specifically, one or more service requests to be allocated in the Online-to-Offline service system may be obtained, start location(s) and destination(s) of the one or more service requests to be allocated may be obtained, and service request(s) with start location(s) and/or destination(s) within the target region may be determined. Finally, the service request(s) may be allocated to the one or more available service providers who accept the scheduling of the system.

Take the scenario of online taxi-hailing as an example; during rush hours, the number count of travel service requests in Xi'erqi Service Region is relatively large while the number count of available service providers is relatively small. However, the number count of available service providers in Shangdi Service Region is relatively large. In this situation, the on-demand service system 100 (e.g., an online taxi-hailing service system) may transmit a scheduling instruction to service providers in Shangdi Service Region and allocate travel service requests with start locations and/or destinations within Shangdi Service Region to the service providers after he or she accepts the scheduling.

It can be seen from the above embodiments that, when the transport capacity of the target region is insufficient, it is possible to schedule available service providers in other service regions to the target region and only allocate service requests in the target region to the available service providers, so that service resources are concentrated to a service region with a high service demand, and the waste of service resources is reduced.

In order to ensure that the transport capacity in the candidate service region can satisfy the service demand in the candidate service region, in some embodiments of the present disclosure, the candidate service region of the target region refers to a service region with an abundant transport capacity.

In some embodiments of the present disclosure, the candidate service region may be filtered from service regions near the target region or service regions of which transport capacities are always abundant in historical time may be identified based on big data processing and the service regions may be determined as candidate service regions of the target region. The embodiments of the present disclosure are not intended to be limiting.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 19 is a flowchart illustrating an exemplary process for scheduling transport capacity according to some embodiments of the present disclosure. The process 1900 may be executed by the on-demand service system 100. For example, the process 1900 may be implemented as a set of instructions (e.g., an application) stored in the storage ROM 230 or RAM 240. The processor 220 and/or modules and/or unit in FIGS. 20-25 may execute the set of instructions, and when executing the instructions, the processor 220, the modules, and/or the units may be configured to perform the process 1900. The operations of the illustrated process presented below are intended to be illustrative. In some embodiments, the process 1900 may be accomplished with one or more additional operations not described and/or without one or more of the operations discussed. Additionally, the order in which the operations of the process as illustrated in FIG. 19 and described below is not intended to be limiting.

In 1910, in response to a detection that a target region lacks service providers, transport capacities of service regions near the target region may be obtained, and at least one of the service regions with an abundant transport capacity may be determined as a candidate service region.

Generally, compared to service regions not near the target region, one or more available service providers in the service regions near the target region may arrive in the target region more quickly after accepting a scheduling.

In some embodiments of the present disclosure, one or more service regions with an abundant transport capacity near the target region may be determined as the candidate service region(s). The embodiments of the present disclosure are not intended to be limiting.

In 1920, a scheduling instruction may be transmitted to one or more available service providers in the candidate service region, wherein the scheduling instruction is configured to request the one or more available service providers to respond and indicate, in a response, whether the one or more available service providers agree to go to the target region.

According to some embodiments of the present disclosure, operation 1920 is similar to operation 1810 described in FIG. 18, and therefore, detailed descriptions are omitted here.

In 1930, a service time period may be determined for at least one of the one or more available service providers in the candidate service region based on a predetermined time period and at least one of a first time point at which the acceptance of the scheduling instruction from the at least one of the one or more available service providers is received or a second time point at which the at least one of the one or more available service providers arrives in the target region.

Generally, the status insufficient transport capacity status of a service region will be alleviated, or the transport capacity of the service region will be back to balance after a period of time. At this time, it may be unnecessary to schedule available service providers from candidate service regions to the service region. Therefore, in some embodiments of the present disclosure, a certain service time period may be determined. During the service time period, the service requests in the target region may be allocated to the one or more available service providers; while beyond the service time period, a general allocation strategy may be applied. As used herein, the term "general allocation strategy" refers to that a service request may be allocated to a service provider whose location is within a predetermined range (e.g., 1 km, 3 km) of a start location of the service request.

In some embodiments of the present disclosure, the service time period for the at least one of the one or more available service providers may be determined based on a preset service time period and a time point at which the at least one of the one or more available service providers accepts the scheduling. For example, the preset service time period may be expressed as $\Delta T$, the time point at which the at least one of the one or more available service providers accepts the scheduling may be represented by $T_0$, and the service time period for the at least one of the one or more available service providers may be $(T_0, T_0+\Delta T)$.

Alternatively, in some embodiments of the present disclosure, the service time period for the at least one of the one or more available service providers may be determined based on the preset service time period and the time point at which the at least one of the one or more available service providers arrive in the target region. For example, the preset service time period may be expressed as $\Delta T$, the time point at which the at least one of the one or more available service providers arrives in the target region may be represented by $T_1$, and the service time period for the at least one of the one or more available service providers may be $(T_1, T_1+\Delta T)$.

In 1940, the service requests in the target region may be allocated to the at least one of one or more available service providers during the service time period.

In some embodiments of the present disclosure, under a situation that the service time period is determined based on the preset service time period and the time point at which the at least one of the one or more available service providers accepts the scheduling, during the service time period and before the at least one of the one or more available service providers arrives in the target region, the system may only allocate service requests with destinations within the target region to the at least one of the one or more available service providers; while after the at least one of the one or more available service providers arrives in the target region, the system may only allocate service requests with start locations within the target region or service requests with both start locations and destinations within the target region to the at least one of the one or more available service providers.

Alternatively, in some embodiments of the present disclosure, under a situation that the service time period is determined based on the preset service time period and the time point at which the at least one of the one or more available service providers arrive in the target region, during the service time period, the system may only allocate service requests with start locations within the target region or service requests with both start locations and destinations within the target region to the one or more available service providers. In addition, before the at least one of the one or more available service providers arrives in the target region, the system may allocate no service request to the one or more available service providers, or only allocate service requests with destinations within the target region to the at least one of the one or more available service providers.

It can be seen from the above embodiments that the candidate service region may be selected from the service regions near the target region. Compared to the service providers in service regions not near the target region, the one or more available service providers in the service regions near the target region may arrive in the target region more quickly after accepting the scheduling, and therefore, the efficiency of the Online-to-Offline services may be improved. In addition, the system may allocate the service requests in the target region to the one or more available service providers only in the service time period, and stop allocating service requests in the target region to the one or more available service providers beyond the service time period. Therefore, it is possible to avoid concentrating the service resources to one service region for a long time, so as to avoid the waste of the service resources.

In order to avoid over-scheduling available service providers from other service regions to the target region, which may result in an excess transport capacity in the target region and the waste of service resources, some alternative embodiments may be provided in which operation 1950 and operation 1955 may be added.

In 1950, the number count of the received one or more acceptances may be determined.

In 1955, the system may stop transmitting the scheduling instruction to the one or more available service providers in the candidate service region in response to a determination that the number count of the received one or more acceptances is larger than a preset threshold.

In some embodiments of the present disclosure, the preset threshold may be set based on a condition which can ensure that the transport capacity of the target region can be back to balance.

It can be seen from the above embodiments that it is possible to avoid over-scheduling available service providers from other service regions to the target region, which may result in an excess transport capacity in the target region and the waste of service resources by controlling the number count of available service providers scheduled to the target region.

In some alternative embodiments of the present disclosure, a reward may be transmitted to the available service providers when the available service providers arrive in the target region within a predetermined time. In this situation, operation 1960 and operation 1965 may be added to some embodiments illustrated in FIG. 18 or FIG. 19.

In 1960, after at least one of the one or more available service providers agrees to go to the target region, whether the at least one of the one or more available service providers arrives in the target region within the predetermined time may be determined.

In 1965, a reward may be transmitted to the at least one of the one or more available service providers when the at least one of the one or more available service providers arrives in the target region within the predetermined time. The reward may include a discount, a cash bonus, a voucher, etc.

Figure 20:
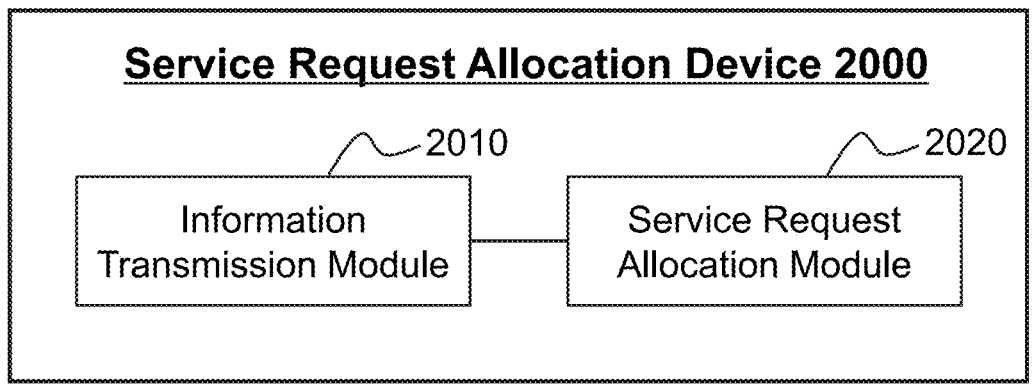
FIG. 20 is a block diagram illustrating an exemplary service request allocation device according to some embodiments of the present disclosure.

FIG. 20 is a block diagram illustrating an exemplary service request allocation device according to some embodiments of the present disclosure. The service request allocation device 2000 may include an information transmission module 2010 and a service request allocation module 2020. In some embodiments, the service request allocation device 2000 may be integrated into the server 110. For example, the service request allocation device 2000 may be integrated into the processing engine 112.

The information transmission module 2010 may be configured to transmit a scheduling instruction to one or more available service providers in a candidate service region associated with the target region in response to a detection that a target region lacks service providers, wherein the scheduling instruction is configured to request the one or more available service providers to respond to indicate whether the one or more available service providers agree to go to the target region.

Generally, in order to improve service efficiency of Online-to-Offline services, a relatively large area may be divided into a plurality of service regions according to an area division rule. For example, an area may be divided into a plurality of service regions according to the distribution of office buildings, wherein the service region refers to a region where one or more available service providers provide services.

In some embodiments of the present disclosure, the available service provider refers to a user who is waiting for receiving service requests, that is, a user who provides Online-to-Offline services. In a scenario of online taxi-hailing, the available service provider refers to a driver; in a scenario of take-out delivery, the available service provider refers to a delivery staff. In a scenario of other Online-to-Offline services, the available service provider refers to a user of an identity. The embodiments of the present disclosure are not intended to be limiting.

In some embodiments of the present disclosure, the transport capacity refers to a supply and demand relationship between the number count of service requests in a service region and the number count of available service providers in the service region. The transport capacity of a service region is considered to be balanced if the number count of available service providers is close to the number count of service requests in the service region; the transport capacity of a service region is considered to be abundant if the number count of available service providers is much larger than the number count of service requests in the service region; and the transport capacity of a service region is considered to be insufficient if the number count of available service providers is much less than the number count of service requests in the service region.

In some embodiments of the present disclosure, the transport capacity of the target region may be determined by determining the number count of service requests and the number count of available service providers in the target region.

In some embodiments of the present disclosure, the transport capacity of the target region may be determined in real time or only when a certain preset triggering condition is satisfied. Specifically, whether the transport capacity of the target region is insufficient may be determined when an event of a preset type is detected, wherein the event of a preset type may include at least one of weather of a preset type, a rush hour, a festival, or a conference.

In some embodiments of the present disclosure, the weather of the preset type may include rain, snow, wind, smog, hail, or the like, or any other bad weather that may affect traffic condition. The festival may include a festival when a great number of people intensively travel, such as National Day, Labor Day, etc. It should be understood that the event of a preset type may be any other event, such as a star concert, and so on. The present disclosure is not intended to be limiting.

Generally, an event of a preset type may affect traffic condition in some service regions. For example, if the event of the preset type is "rush hour," the traffic condition of a service region with relatively more office buildings may be congested.

In some embodiments of the present disclosure, current weather information may be obtained from the website of a weather bureau or the Internet, and whether the current weather is the weather of a preset type may be determined based on the current weather information. If the current weather is the weather of a preset type, it may be determined that an event of a preset type has happened. Alternatively, current time information may be obtained and whether it is a rush hour or a festival may be determined based on the current time information.

In some embodiments of the present disclosure, the candidate service region of the target region may include any service region near the target region, any service region with an abundant transport capacity near the target region, or a defined service region. The embodiments of the present disclosure are not intended to be limiting.

In some embodiments of the present disclosure, in the scenario of online taxi-hailing, the available service provider in the candidate service region refers to a driver currently located in the candidate service region; in the scenario of take-out delivery, the available service provider in the candidate service region refers to a delivery staff whose delivery range is within the candidate service region.

In some embodiments of the present disclosure, the scheduling instruction may be transmitted to the one or more available service providers by transmitting a corresponding message to a third-party application of the Online-to-Offline services installed in a terminal device of the one or more available service providers. In the scenario of online taxi-hailing, the third party application of the Online-to-Offline services installed in the terminal device may be a map application or a driver application of online taxi-hailing. In the scenario of take-out delivery, the third party application of the Online-to-Offline services installed in the terminal device may be a take-out application.

In some embodiments of the present disclosure, when the scheduling instruction is transmitted to the third party application of the Online-to-Offline services installed in the terminal device of the one or more available service providers, the third party application of the Online-to-Offline services may display the scheduling instruction on a user interface of the service application in the form of a window or a card and provide an interface for inputting feedback information by a user.

In some embodiments of the present disclosure, the scheduling instruction may be transmitted to the one or more available service providers in the candidate service region. The scheduling instruction may be configured to request the one or more available service providers to respond to indicate whether the one or more available service providers agree to accept the scheduling of the Online-to-Offline service system.

The service request allocation module 2020 may be configured to allocate service requests in the target region to the one or more available service providers in response to one or more acceptances indicating that the one or more available service providers agree to go to the target region.

In some embodiments of the present disclosure, responses provided by the available service providers may include accepting the scheduling of the Online-to-Offline service system; that is, agreeing to go to the target region; or refusing the scheduling of the Online-to-Offline service system, that is, refusing to go to the target region.

In some embodiments of the present disclosure, the service requests in the target region may be allocated to the one or more available service providers when it is determined that the one or more available service providers in the candidate service region accept the scheduling of the Online-to-Offline service system.

Generally, a service request corresponding to the Online-to-Offline services includes a start location and a destination. For example, in the scenario of online taxi-hailing, the service request refers to a travel service request which includes a pick-up location (i.e., the start location) and a drop-off location (i.e., the destination) defined by a passenger. As another example, in the scenario of take-out delivery, the service request refers to a take-out service request which includes a business address (i.e., the start location) and a customer address (i.e., the destination). During a process for providing the service, a travel route of a user who provides the service needs to cover at least one of the start location or the destination. In some embodiments of the present disclosure, the start location and/or the destination of the service request allocated to the one or more available service providers should be within the target region.

Specifically, one or more service requests to be allocated in the Online-to-Offline service system may be obtained, start location(s) and destination(s) of the one or more service requests to be allocated may be obtained, and service request(s) with start location(s) and/or destination(s) within the target region may be determined. Finally, the service request(s) may be allocated to the one or more available service providers who accept the scheduling of the system.

Take the scenario of online taxi-hailing as an example; during rush hours, the number count of travel service requests in Xi'erqi Service Region is relatively large while the number count of available service providers is relatively small. However, the number count of available service providers in Shangdi Service Region is relatively large. In this situation, the on-demand service system 100 (e.g., an online taxi-hailing service system) may transmit a scheduling instruction to service providers in Shangdi Service Region and allocate travel service requests with start locations and/or destinations within Shangdi Service Region to the service providers after he or she accepts the scheduling.

It can be seen from the above embodiments that, when the transport capacity of the target region is insufficient, it is possible to schedule available service providers in other service regions to the target region and only allocate service requests in the target region to the available service providers, so that service resources are concentrated to a service region with a high service demand, and the waste of service resources is reduced.

In order to ensure that the transport capacity in the candidate service region can satisfy the service demand in the candidate service region, in some embodiments of the present disclosure, the candidate service region of the target region refers to a service region with an abundant transport capacity.

In some embodiments of the present disclosure, the candidate service region may be filtered from service regions near the target region or service regions of which transport capacities are always abundant in historical time may be identified based on big data processing and the service regions may be determined as candidate service regions of the target region. The embodiments of the present disclosure are not intended to be limiting.

The modules in the service request allocation device 2000 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 21:
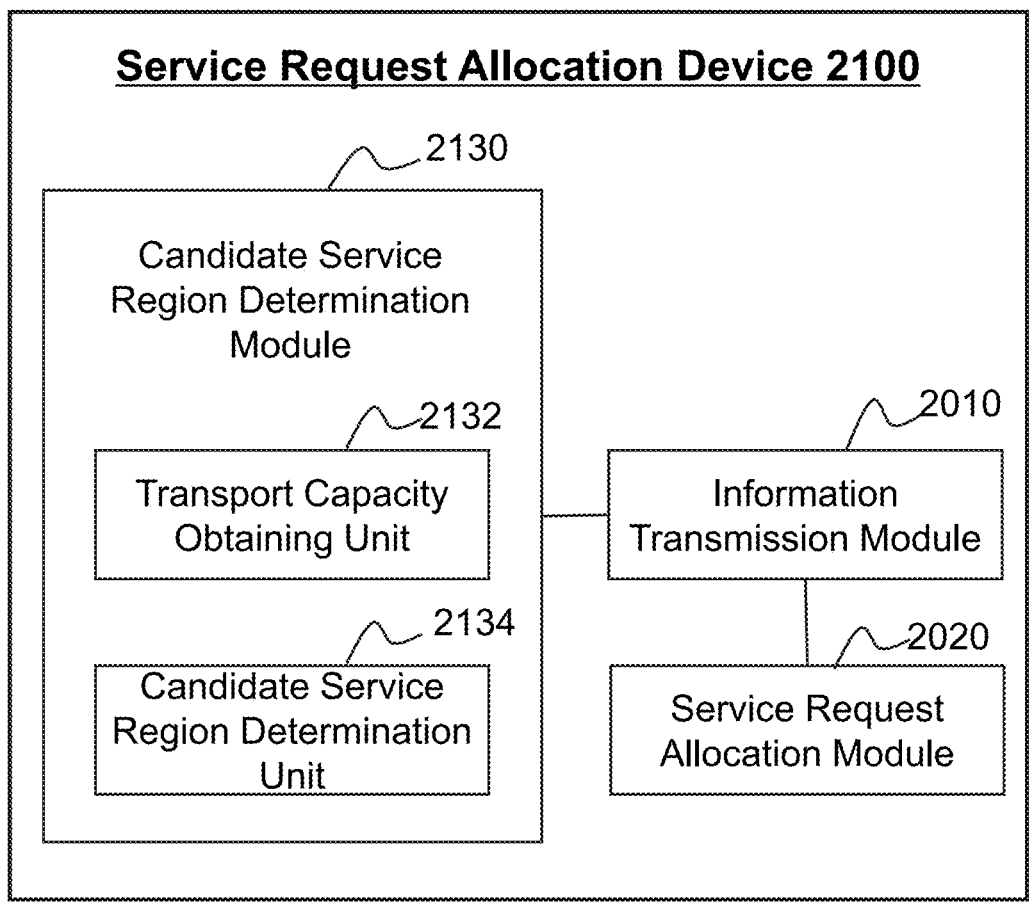
FIG. 21 is a block diagram illustrating an exemplary service request allocation device according to some embodiments of the present disclosure.

FIG. 21 is a block diagram illustrating an exemplary service request allocation device according to some embodiments of the present disclosure. According to the service request allocation device 2000, the service request allocation device 2100 may further include a candidate service region determination module 2130. The candidate service region determination module 2130 may include a transport capacity obtaining unit 2132 and a candidate service region determination unit 2134. In some embodiments, the service request allocation device 2100 may be integrated into the server 110. For example, the service request allocation device 2100 may be integrated into the processing engine 112.

The transport capacity obtaining unit 2132 may be configured to obtain transport capacities of service regions near the target region in response to a detection that a target region lacks service providers.

The candidate service region determination unit 2134 may be configured to determine at least one of the service regions with an abundant transport capacity as a candidate service region.

Generally, compared to service regions not near the target region, one or more available service providers in the service regions near the target region may arrive in the target region more quickly after accepting a scheduling.

In some embodiments of the present disclosure, one or more service regions with an abundant transport capacity near the target region may be determined as the candidate service region(s). The embodiments of the present disclosure are not intended to be limiting.

It can be seen from the above embodiments that the candidate service region may be selected from the service regions near the target region. Compared to the service providers in service regions not near the target region, the one or more available service providers in the service regions near the target region may arrive in the target region more quickly after accepting the scheduling, and therefore, the efficiency of the Online-to-Offline services may be improved.

The modules and/or units in the service request allocation device 2100 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 22:
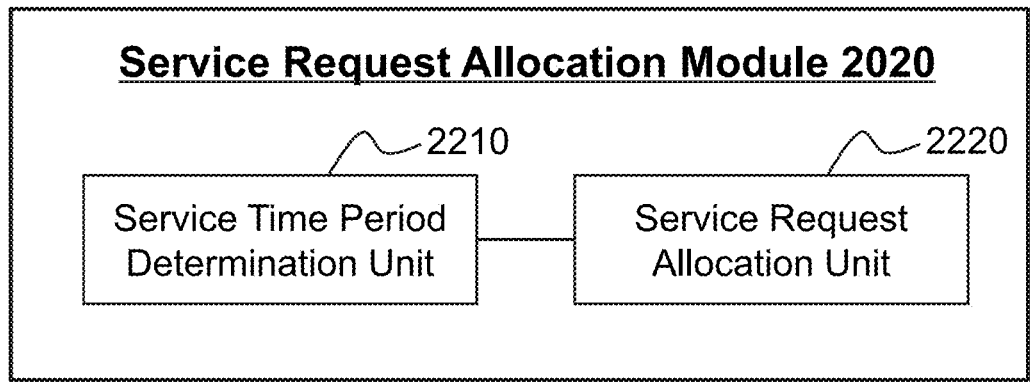
FIG. 22 is a block diagram illustrating an exemplary service request allocation module according to some embodiments of the present disclosure.

FIG. 22 is a block diagram illustrating an exemplary service request allocation module according to some embodiments of the present disclosure. The service request allocation module 2020 may include a service time period determination unit 2210 and a service request allocation unit 2220.

The service time period determination unit 2210 may be configured to determine a service time period for at least one of the one or more available service providers in the candidate service region based on a predetermined time period and at least one of a first time point at which the acceptance of the scheduling instruction from the at least one of the one or more available service providers is received or a second time point at which the at least one of the one or more available service providers arrives in the target region.

Generally, the status insufficient transport capacity status of a service region will be alleviated, or the transport capacity of the service region will be back to balance after a period of time. At this time, it may be unnecessary to schedule available service providers from candidate service regions to the service region. Therefore, in some embodiments of the present disclosure, a certain service time period may be determined. During the service time period, the service requests in the target region may be allocated to the one or more available service providers; while beyond the service time period, a general allocation strategy may be applied.

In some embodiments of the present disclosure, the service time period for the at least one of the one or more available service providers may be determined based on a preset service time period and a time point at which the at least one of the one or more available service providers accepts the scheduling. For example, the preset service time period may be expressed as $\Delta T$, the time point at which the at least one of the one or more available service providers accepts the scheduling may be represented by $T_0$, and the service time period for the at least one of the one or more available service providers may be $(T_0, T_0+\Delta T)$.

Alternatively, in some embodiments of the present disclosure, the service time period for the at least one of the one or more available service providers may be determined based on the preset service time period and the time point at which the at least one of the one or more available service providers arrive in the target region. For example, the preset service time period may be expressed as $\Delta T$, the time point at which the at least one of the one or more available service providers arrives in the target region may be represented by $T_1$, and the service time period for the at least one of the one or more available service providers may be $(T_1, T_1+\Delta T)$.

The service request allocation unit 2220 may be configured to allocate the service requests in the target region to the at least one of one or more available service providers during the service time period.

In some embodiments of the present disclosure, under a situation that the service time period is determined based on the preset service time period and the time point at which the at least one of the one or more available service providers accepts the scheduling, during the service time period and before the at least one of the one or more available service providers arrives in the target region, the system may only allocate service requests with destinations within the target region to the at least one of the one or more available service providers; while after the at least one of the one or more available service providers arrives in the target region, the system may only allocate service requests with start locations within the target region or service requests with both start locations and destinations within the target region to the at least one of the one or more available service providers.

Alternatively, in some embodiments of the present disclosure, under a situation that the service time period is determined based on the preset service time period and the time point at which the at least one of the one or more available service providers arrive in the target region, during the service time period, the system may only allocate service requests with start locations within the target region or service requests with both start locations and destinations within the target region to the one or more available service providers. In addition, before the at least one of the one or more available service providers arrives in the target region, the system may allocate no service request to the one or more available service providers, or only allocate service requests with destinations within the target region to the at least one of the one or more available service providers.

It can be seen from the above embodiments that the system may allocate the service requests in the target region to the one or more available service providers only in the service time period, and stop allocating service requests in the target region to the one or more available service providers beyond the service time period. Therefore, it is possible to avoid concentrating the service resources to one service region for a long time, so as to avoid the waste of the service resources.

The units in the service request allocation module 2020 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the units may be combined into a single module, and any one of the modules may be divided into two or more sub-units.

Figure 23:
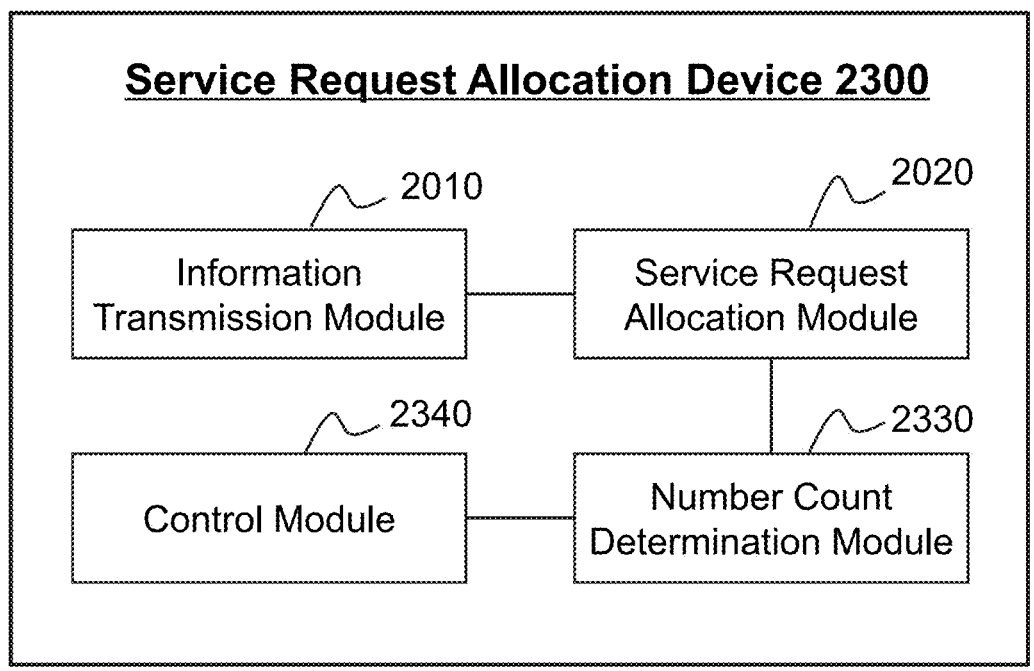
FIG. 23 is a block diagram illustrating an exemplary service request allocation device according to some embodiments of the present disclosure.

FIG. 23 is a block diagram illustrating an exemplary service request allocation device according to some embodiments of the present disclosure. According to the service request allocation device 2000 or 2100, the service request allocation device 2300 may further include a number count determination module 2330 and a control module 2340. In some embodiments, the service request allocation device 2300 may be integrated into the server 110. For example, the service request allocation device 2300 may be integrated into the processing engine 112.

The number count determination module 2330 may be configured to obtain a number count of the received one or more acceptances.

The control module 2340 may be configured to stop transmitting the scheduling instruction to one or more available service providers in the candidate service region in response to a determination that the number count of the received one or more acceptances is larger than a preset threshold.

In some embodiments of the present disclosure, the preset threshold may be set based on a condition which can ensure that the transport capacity of the target region can be back to balance.

It can be seen from the above embodiments that it is possible to avoid over-scheduling available service providers from other service regions to the target region, which may result in an excess transport capacity in the target region and the waste of service resources by controlling the number count of available service providers scheduled to the target region.

The modules in the service request allocation device 2300 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 24:
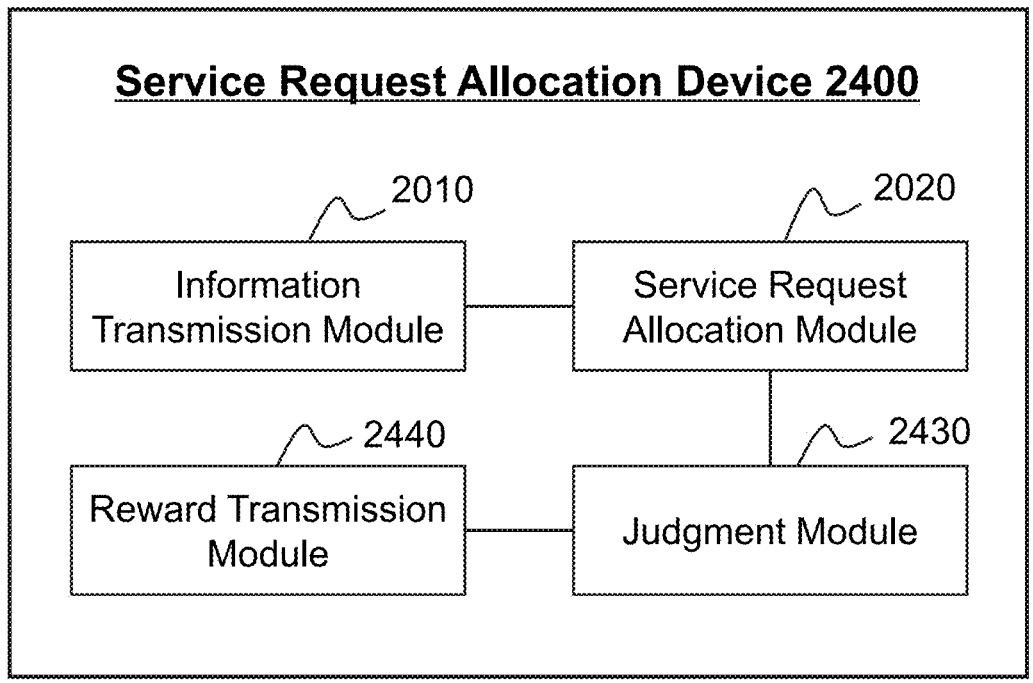
FIG. 24 is a block diagram illustrating an exemplary service request allocation device according to some embodiments of the present disclosure.

FIG. 24 is a block diagram illustrating an exemplary service request allocation device according to some embodiments of the present disclosure. According to the service request allocation device 2000, 2100, and/or 2300, the service request allocation device 2400 may further include a judgment module 2430 and a reward transmission module 2440. In some embodiments, the service request allocation device 2400 may be integrated into the server 110. For example, the service request allocation device 2400 may be integrated into the processing engine 112.

The judgment module 2430 may be configured to determine whether at least one of the one or more available service providers arrives in the target region within the predetermined time when the at least one of the one or more available service providers agrees to go to the target region.

The reward transmission module 2440 may be configured to transmit the reward to the at least one of the one or more available service providers when the at least one of the one or more available service providers arrives in the target region within the predetermined time.

The modules in the service request allocation device 2400 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 25:
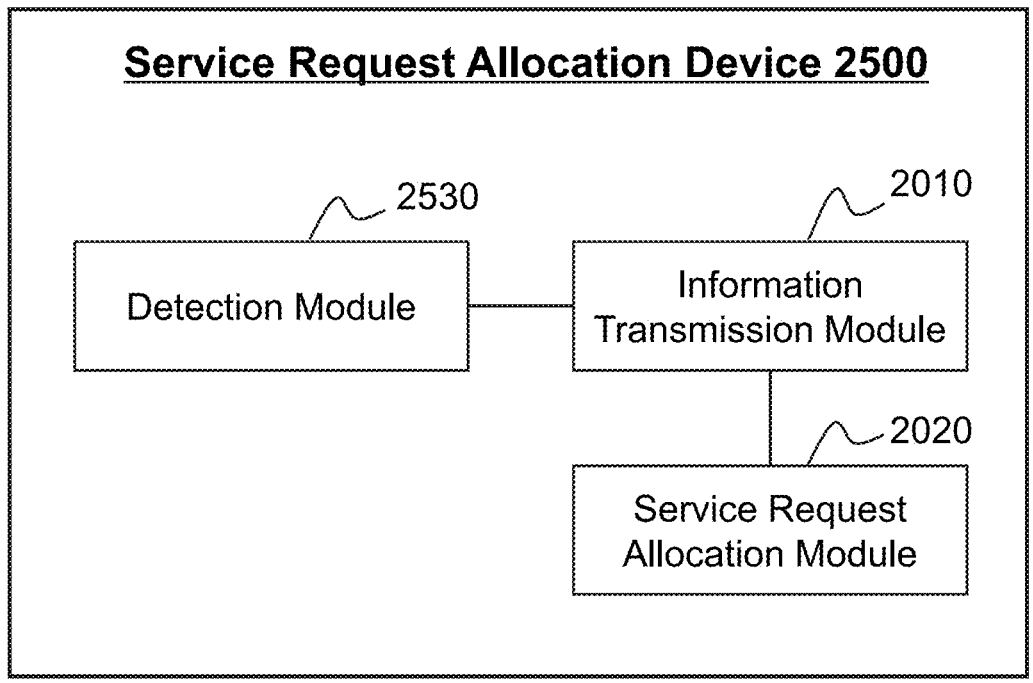
FIG. 25 is a block diagram illustrating an exemplary service request allocation device according to some embodiments of the present disclosure.

FIG. 25 is a block diagram illustrating an exemplary service request allocation device according to some embodiments of the present disclosure. According to the service request allocation device 2000, 2100, 2300, and/or 2400, the service request allocation device 2500 may further include a detection module 2530. In some embodiments, the service request allocation device 2500 may be integrated into the server 110. For example, the service request allocation device 2500 may be integrated into the processing engine 112.

The detection module 2530 may be configured to determine whether the transport capacity of the target region is insufficient when an event of preset types is detected.

In some alternative embodiments of the present disclosure, the event of a preset type may include at least one of weather of a preset type, a rush hour, a festival, or a conference.

In some embodiments of the present disclosure, the transport capacity of the target region may be determined only when a certain preset triggering condition is satisfied. Specifically, whether the transport capacity of the target region is insufficient may be determined when an event of a preset type is detected, wherein the event of a preset type may include at least one of weather of a preset type, a rush hour, a festival, or a conference.

In some embodiments of the present disclosure, the weather of the preset type may include rain, snow, wind, smog, hail, or the like, or any other bad weather that may affect traffic condition. The festival may include a festival when a great number of people intensively travel, such as National Day, Labor Day, etc. It should be understood that the event of a preset type may be any other event, such as a star concert, and so on. The present disclosure is not intended to be limiting.

Generally, an event of a preset type may affect traffic condition in some service regions. For example, if the event of the preset type is "rush hour," the traffic condition of a service region with relatively more office buildings may be congested.

In some embodiments of the present disclosure, current weather information may be obtained from the website of a weather bureau or the Internet, and whether the current weather is the weather of a preset type may be determined based on the current weather information. If the current weather is the weather of a preset type, it may be determined that an event of a preset type has happened. Alternatively, current time information may be obtained and whether it is a rush hour or a festival may be determined based on the current time information.

The modules in the service request allocation device 2500 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

The present disclosure may also provide a second computer storage medium including second instructions. When executing by at least one processor, the second instructions may direct the at least one processor to perform a process (e.g., process 1800, process 1900) described elsewhere in the present disclosure.

Figure 26:
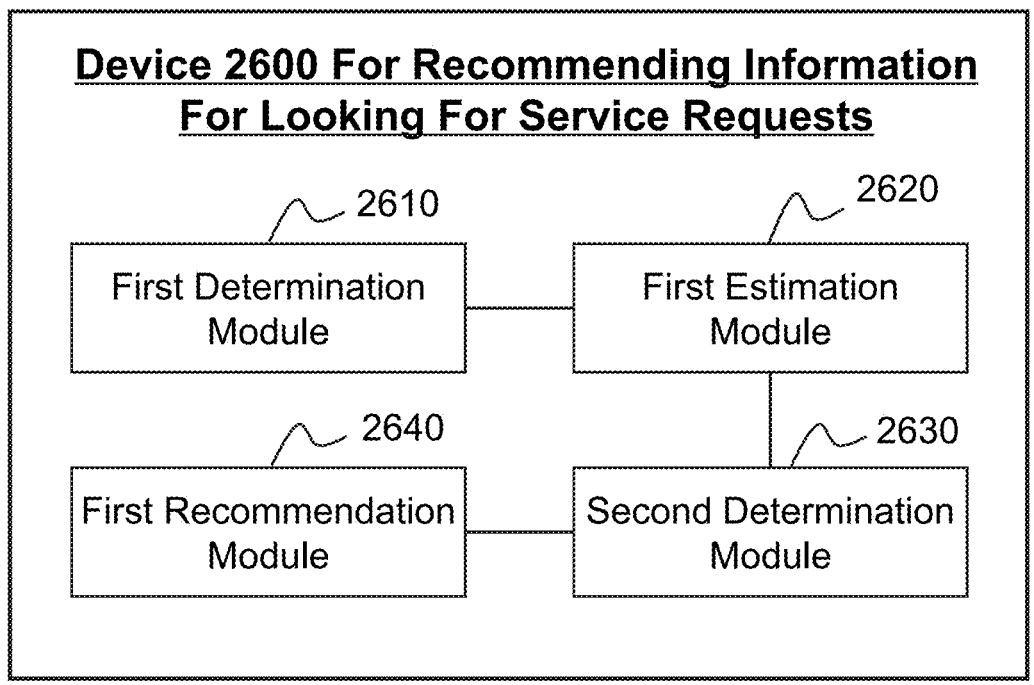
FIG. 26 is a block diagram illustrating an exemplary device for recommending information for looking for service requests according to some embodiments of the present disclosure.

FIG. 26 is a block diagram illustrating an exemplary device for recommending information for looking for service requests according to some embodiments of the present disclosure. The device 2600 for recommending information for looking for service requests may include a first determination module 2610, a first estimation module 2620, a second determination module 2630, and a first recommendation module 2640. In some embodiments, the device 2600 may be integrated into the server 110. For example, the device 2600 may be integrated into the processing engine 112.

The first determination module 2610 may be configured to determine an estimated travel time from the location of an available service provider to a candidate region.

In some embodiments of the present disclosure, an area may be geographically divided into N geographical regions, each geographical region corresponding to a certain range of geographical coordinates. More descriptions of the division of the regions may be found elsewhere in the present disclosure (e.g., FIGS. 4-9, 18-19, and the descriptions thereof). In some embodiments, the location of an available service provider (i.e., a driver associated with transport capacity scheduling) may be obtained based on Global Positioning System (GPS) data received from a user terminal (e.g., the provider terminal 140) associated with the available service provider. In some embodiments, the GPS data may be determined by a GPS chipset of the user terminal. After the location of the available service provider is determined, the geographic region where the available service provider locates may be determined. Any one of the (N−1) geographic regions other than the geographical region where the available service provider locates may be determined as the above-described candidate region.

After the location of the available service provider is located, the travel distance from the location of the available service provider to the candidate region may be determined based on the coordinate of the location of the available service provider and the coordinate range of the candidate region. In some embodiments of the present disclosure, the term "a travel distance from the location of the available service provider to the candidate region" refers to the travel distance from the location of the available service provider to the center point of the candidate region, or the travel distance from the location of the available service provider to any point in the candidate region (such as the point nearest to the location of the available service provider), and the travel distance refers to the length of a planned navigation path. Finally, an estimated travel time T from the location of the available service provider to the candidate region may be determined based on the travel distance and an estimated travel speed of the available service provider.

In some embodiments, the first determination module 2610 may be configured to determine the estimated travel time from the location of the available service provider to the candidate region in response to a request for looking for service requests initiated by the available service provider. As described above, the available service provider may initiate a request for looking for service requests to a transport capacity scheduling server (e.g., the server 110) via a user terminal (e.g., the provider terminal 140), wherein the request for looking for service requests may be generated based on an operation of looking for service requests performed by the available service provider on the user terminal. After the transport capacity scheduling server receives the request for looking for service requests from the available service provider, the first determination module 101 may determine the estimated travel time from the location of the available service provider to the candidate region based on the operation of looking for service requests corresponding to the request for looking for service requests.

In some embodiments, the device 2600 for recommending information for looking for service requests may also include an alert module which may be configured to transmit a message reminding the available service provider to transmit the request for looking for service requests to the device 2600 in response to a detection that a time period within which the available service provider is waiting for receiving service requests is larger than a predetermined time threshold (e.g., 10 minutes) before the estimated travel time from the location of the available service provider to the candidate region is determined in response to a request for looking for service requests initiated by the available service provider. The predetermined time threshold may be set according to the actual application, and the present disclosure is not intended to be limiting. For example, when the transport capacity scheduling server detects that no service request is allocated to an available service provider for a long time, the transport capacity scheduling server may push interface information for reminding the available service provider to look for service requests to the user terminal, so as to improve the efficiency in looking for service requests of the available service provider.

The first estimation module 2620 may be configured to estimate a profit value if the available service provider goes to the candidate region and is allocated a service request based on the transaction data associated with transport capacity scheduling of the candidate region.

The transaction data associated with transport capacity scheduling of the candidate region may be various types of transaction data generated based on service requests associated with transport capacity scheduling in the candidate region, such as historical data of service requests associated with transport capacity scheduling, including but not limited to historical data within various historical time periods, for example, the number count of service requests associated with transport capacity scheduling, an average service fee, the number count of available service providers, a transport capacity shortage, etc.

The second determination module 2630 may be configured to determine the candidate region as a recommendation region for looking for service requests (also referred to as a "target region") based on a result of the determination that a rate of the profit value to the estimated travel time satisfies a preset condition.

In some embodiments, the preset condition may refer to that the rate of the profit value to the estimated travel time of the candidate region is in top N (N 1) of a descending ranking of the rate of the profit value to the estimated travel time of each candidate region.

In some alternative embodiments, the preset condition may refer to that the rate of the profit value to the estimated travel time of the candidate region is larger than a predetermined threshold.

It should be noted that in some embodiments, if there is a negative profit value within the profit values corresponding to a plurality of candidate regions, the negative profit value may be filtered out first, and then whether the rate of the profit value corresponding to the candidate region to the estimated travel time satisfies the preset condition may be determined.

The first recommendation module 2640 may be configured to generate and transmit recommendation information for looking for service requests to a user terminal (e.g., the provider terminal 140) associated with the available service provider based on the recommendation region.

In some embodiments, the recommendation information for looking for service requests may include region information (e.g., coordinate information, business district information) of the recommendation region for looking for service requests, the profit value of the recommendation region for looking for service requests, the travel cost from the location of the available service provider to the recommendation region for looking for service requests, the estimated travel time from the location of the available service provider to the recommendation region for looking for service requests, or the like, or a combination thereof. The recommendation information for looking for service requests may also include information that suggests the available service provider go to a certain candidate region to receive service requests, etc.

In some embodiments, the first recommendation module 2640 may be configured to rank the determined one or more recommendation regions for looking for service requests from high to low according to the rates of the profit value to the estimated travel time corresponding to the one or more recommendation regions, and generate and transmit the recommendation information for looking for service requests to the user terminal associated with the available service provider based on the ranked one or more recommendation regions.

The modules in the device 2600 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 27:
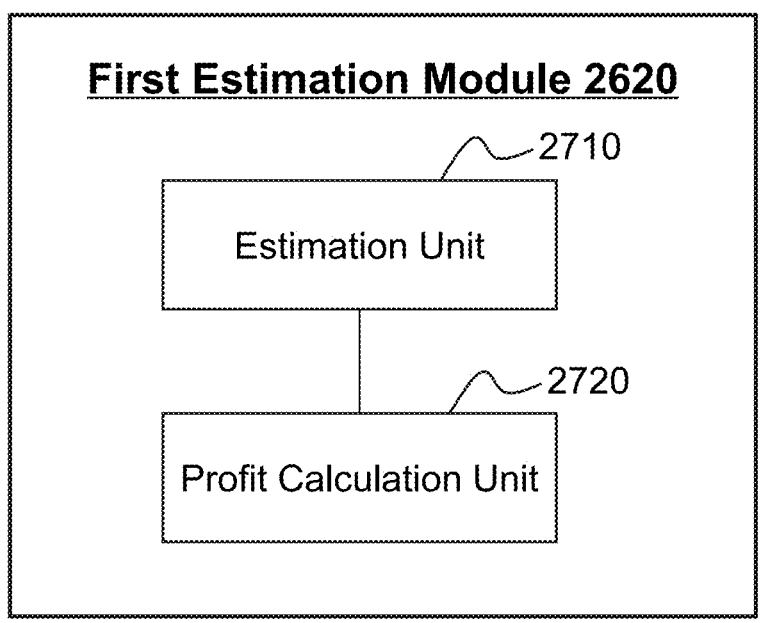
FIG. 27 is a block diagram illustrating an exemplary first estimation module according to some embodiments of the present disclosure.

FIG. 27 is a block diagram illustrating an exemplary first estimation module according to some embodiments of the present disclosure. The first estimation module 2620 may include an estimation unit 2710 and a profit calculation unit 2720.

The estimation unit 2710 may be configured to determine a probability that the available service provider is allocated a service request if the available service provider arrives in the candidate region and a service fee of the service request allocated to the available service provider based on the transaction data associated with transport capacity scheduling of the candidate region.

In some alternative embodiments, an average service fee of service requests in the candidate region may be determined as the service fee of the service request allocated to the available service provider.

In some alternative embodiments, a service fee with the highest occurrence frequency may be obtained from a plurality of historical service fees based on the transaction data associated with transport capacity scheduling of the candidate region and may be determined as the service fee of the service request allocated to the available service provider.

In some alternative embodiments, the distribution of a plurality of historical service fees in the candidate region may be obtained based on the transaction data associated with transport capacity scheduling of the candidate region, and a specific service fee interval within which the number count of historical service fees is maximum among a plurality of service fee intervals may be identified and determined as the service fee of the service request allocated to the available service provider.

The profit calculation unit 2720 may be configured to determine a profit value if the available service provider goes to the candidate region and is allocated a service request based on the probability and the service fee.

The units in the first estimation module 2620 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the units may be combined into a single module, and any one of the units may be divided into two or more sub-units.

Figure 28:
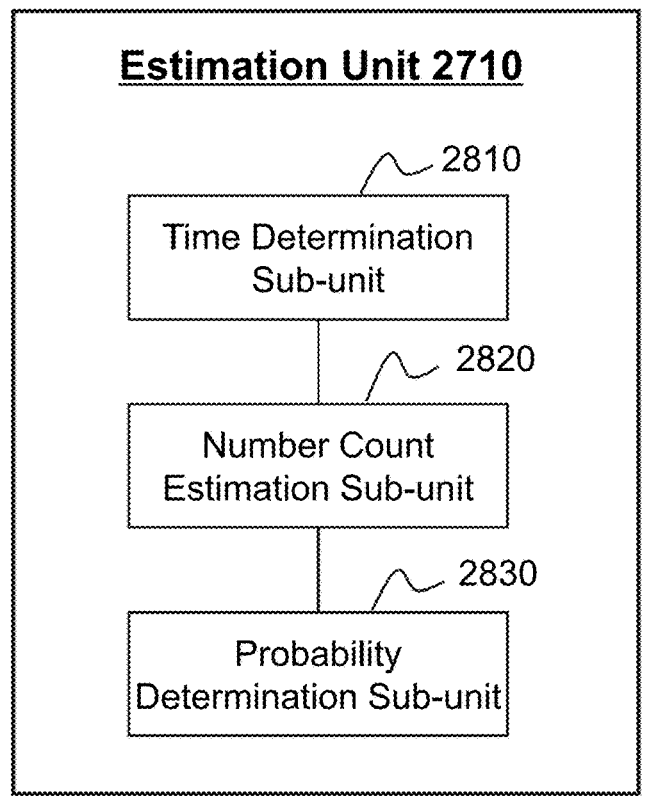
FIG. 28 is a block diagram illustrating an exemplary estimation unit according to some embodiments of the present disclosure.

FIG. 28 is a block diagram illustrating an exemplary estimation unit according to some embodiments of the present disclosure. The estimation unit 2710 may include a time determination sub-unit 2810, a number count estimation sub-unit 2820, and a probability determination sub-unit 2830.

The time determination sub-unit 2810 may be configured to determine a prediction time period based on the estimated travel time.

In some embodiments, the prediction time period may be a time period before an estimated time point at which the available service provider arrives in the candidate region according to the estimated travel time or a time period after the estimated time point. For example, if the estimated time point at which the available service provider arrives in the candidate region is 10:00 a.m. on M day, the prediction time period may be determined as an hour from 10:00 a.m. to 11:00 a.m. on M day.

The number count estimation sub-unit 2820 may be configured to determine a transport capacity shortage of the candidate region and a number count of available service providers in the candidate region within the prediction time period based on the transaction data associated with transport capacity scheduling of the candidate region. As used herein, the transport capacity shortage refers to a difference between the number count of service requests and the number count of available service providers in the prediction time period.

In some embodiments of the present disclosure, the transport capacity shortage and the number count of available service providers may be predicted based on transaction data associated with transport capacity scheduling in at least one historical time period corresponding to the prediction time period.

In some embodiments, an average transport capacity shortage of the candidate region and an average number count of available service providers in the candidate region may be predicted based on transaction data associated with transport capacity scheduling in the at least one historical time period corresponding to the prediction time period, and further the transport capacity shortage of the candidate region and the number count of available service providers in the candidate region within the prediction time period may be determined. For example, if the determined prediction time period is 10:00 a.m. to 11:00 a.m. on M day based on the estimated travel time, the average transport capacity shortage of the candidate region and the average number count of available service providers in the candidate region may be determined based on service request information in a candidate region Q between 10:00 a.m. to 11:00 a.m. in K days before M day and the number count of days "K", and the average transport capacity shortage and the average number count of available service providers may be determined as the transport capacity shortage of the candidate region and the number count of available service providers in the candidate region within the prediction time period, respectively. In addition, the transport capacity shortage and the number count of available service providers in the prediction time period may be determined based on transaction data associated with transport capacity scheduling in any other historical time period equal to the prediction time period.

The probability determination sub-unit 2830 may be configured to determine a rate of the transport capacity shortage to the number count of available service providers and determine the rate as the probability that the available service provider is allocated a service request in the candidate region.

According to the above example, if it is determined that the transport capacity shortage in the candidate region Q is 100 and the number count of available service providers is 200 between 10:00 a.m. to 11:00 a.m. on M day, the probability that the available service provider is allocated a service request in the candidate region Q may be determined as 100/200 (i.e., 0.5).

It should be noted that the probability that the available service provider is allocated a service request may also be affected by a credit score or a rating of the available service provider. For example, for a specific candidate region, for an available service provider with a relatively good credit score or a relatively high rating, the probability that he or she is allocated a service request is relatively high; whereas for an available service provider with a relatively bad credit score or a relatively low rating, the probability that he or she is allocated a service request is relatively low. As used herein, the credit score or the rating of the available service provider may be determined based on a plurality of factors such as the number count of historical service transactions, the number count of refuses for providing services, a taxi-hailing service quality, timeliness information associated with delivering passengers to destinations, evaluation information provided by the passengers, or the like, or a combination thereof. Since the process for determining the credit score or the rating of the available service provider is apparent to those skilled in the art, it is not described in detail herein.

In some alternative embodiments, the transport capacity scheduling server may provide a priority to an available service provider with a relatively good credit score or a relatively high rating in the candidate region, so that for the available service provider with a relatively good credit score or a relatively high rating, the probability that he or she is allocated a service request may be higher than the rate of the transport capacity shortage to the number count of available service providers, whereas, for the available service provider with a relatively bad credit score or a relatively low rating, the probability that he or she is allocated a service request may be lower than the rate of the transport capacity shortage to the number count of available service providers. For example, if it is determined that an average probability that an available service provider is allocated a service request in a candidate region is 0.5, the probability that an available service provider with a relatively good credit score or a relatively high rating is allocated a service request may be higher than 0.5 (e.g., 0.8), whereas, the probability that an available service provider with a relatively bad credit score or a relatively low rating is allocated a service request may be lower than 0.5 (e.g., 0.3).

The sub-units in the estimation unit 2710 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the sub-units may be combined into a single unit, and any one of the sub-units may be divided into two or more sub-units.

Figure 29:
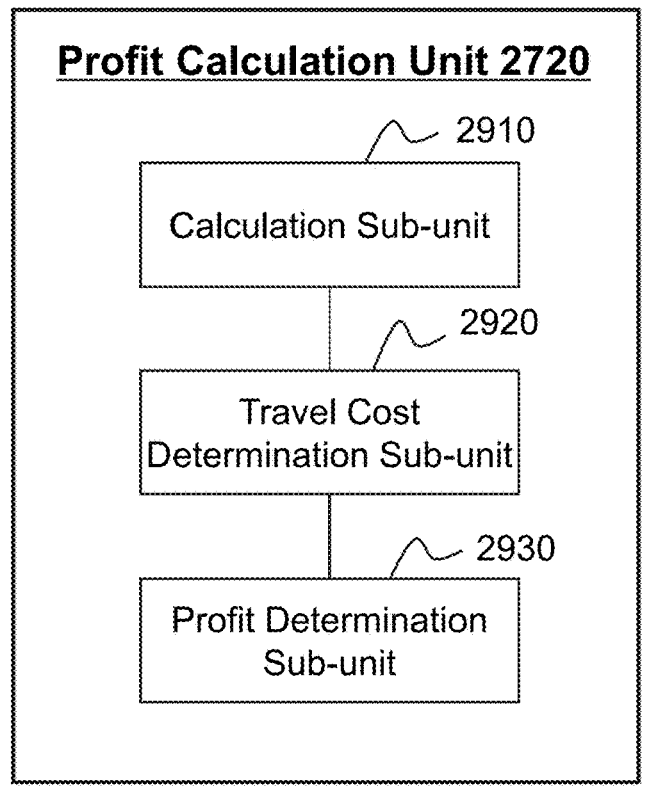
FIG. 29 is a block diagram illustrating an exemplary profit calculation unit according to some embodiments of the present disclosure.

FIG. 29 is a block diagram illustrating an exemplary profit calculation unit according to some embodiments of the present disclosure. The profit calculation unit 2720 may include a calculation sub-unit 2910, a travel cost determination sub-unit 2920, and a profit determination sub-unit 2930.

The calculation sub-unit 2910 may be configured to determine a product of the probability that an available service provider is allocated a service request and a service fee of the service request.

The travel cost determination sub-unit 2920 may be configured to determine a travel cost of the available service provider traveling from the location of the available service provider to the candidate region.

In some embodiments, the location of the available service provider may be determined as a pick-up location, any point in the candidate region may be determined as a destination, and the travel cost may be determined based on a planned route according to the pick-up location and the destination.

The profit determination sub-unit 2930 may be configured to determine a difference value by subtracting the travel cost from the product and determine the difference value as the profit value if the available service provider goes to the candidate region and is allocated a service request.

In some alternative embodiments, the profit calculation unit 2720 may also include a probability and service fee determination sub-unit and a profit calculation sub-unit. The probability and service fee determination sub-unit may be configured to determine a probability that the available service provider is allocated a service request in the candidate region within a preset time period and a service fee of the service request allocated to the available service provider based on the transaction data associated with transport capacity scheduling of the candidate region. The profit calculation sub-unit may be configured to calculate the product of the probability and the service fee and determine the product as the profit value if the available service provider goes to the candidate region and is allocated a service request.

In some alternative embodiments, a service fee of a service request may be determined directly as the profit value if the available service provider goes to the candidate region and is allocated a service request. For example, if the available service provider is a VIP driver, the transport capacity scheduling server may allocate the service request to the driver preferentially, so that the probability that the VIP driver is allocated a service request may be regarded as 1.

The sub-units in the profit calculation unit 2720 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the sub-units may be combined into a single unit, and any one of the sub-units may be divided into two or more sub-units.

Figure 30:
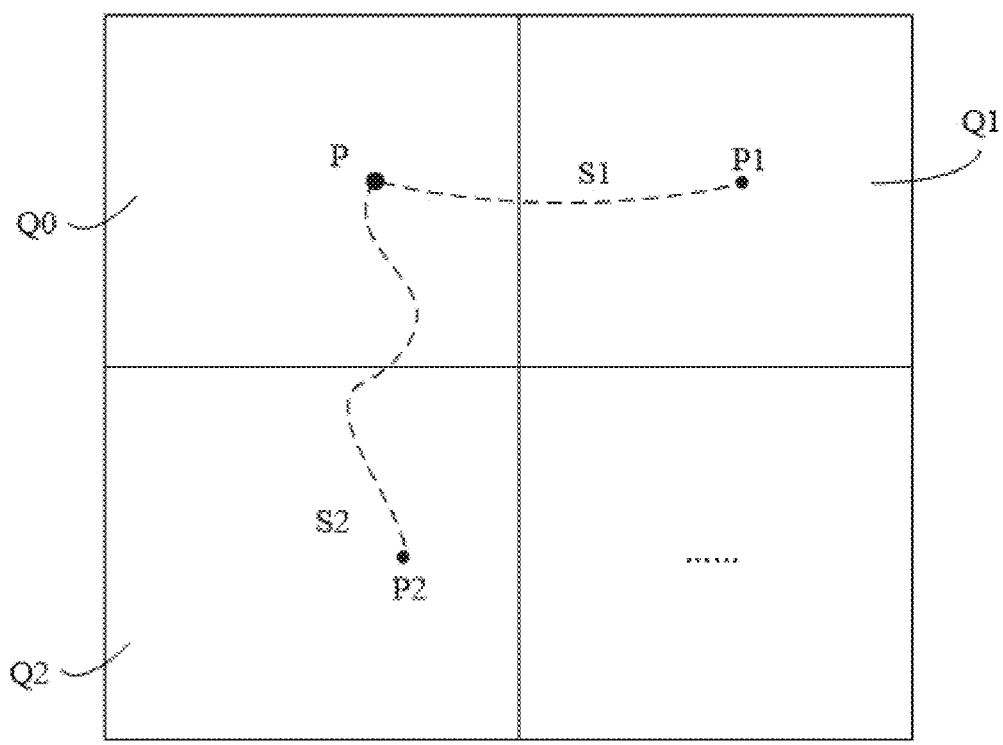
FIG. 30 is a schematic diagram illustrating an exemplary process for pushing recommendation information for looking for service requests according to some embodiments of the present disclosure.

FIG. 30 is a schematic diagram illustrating an exemplary process for pushing recommendation information for looking for service requests according to some embodiments of the present disclosure.

As illustrated in FIG. 30, it is assumed that a city is geographically divided into N geographic regions including Q0, Q1, Q2 . . . and a driver is in the status of looking for service requests, wherein point P refers to the location of the driver, the geographic region Q0 refers to the region where the driver locates, and point P1 and point P2 are the center points of the geographic regions Q1 and the geographic regions Q2, respectively. Travel path S1 may be planned based on the point P and the center point P1 of the candidate region Q1. It is assumed that an estimated travel time from the point P to the geographic region Q1 is determined as 0.3 hours based on the travel path S1 and a profit value if the driver goes to the geographic region Q1 is estimated as 18

Chinese yuan, the rate of the profit value 18 to the estimated travel time 0.3 hours is 60. Furthermore, travel path S2 may be planned based on the point P and the center point P2 of Q2. It is assumed that the estimated travel time from the point P to the geographic region Q2 is determined as 0.5 hours based on the travel path S2, and the profit value if the driver goes to the geographic region Q2 is determined as 18 yuan, the rate of the profit value 20 to the estimated travel time 0.5 hours is 40. If the preset condition is that the rate of the profit value corresponding to the candidate region to the estimated travel time is greater than a predetermined threshold 50, the candidate region Q1 may be determined as a recommendation region (i.e., a target region) for looking for service requests, and the recommendation information for looking for service requests including the recommendation region for looking for service requests Q1 may be generated and transmitted to the user terminal associated with the driver. For example, the recommendation information for looking for service requests may include information such as the profit value of 18 Chinese yuan of the recommendation region for looking for service requests Q1, the estimated travel time 0.3 hours from the location of the driver to the recommendation region for looking for service requests Q1, the information that suggests the driver to go to the recommendation region for looking for service requests Q1 to look for service requests, or the like, or a combination thereof.

According to the above example, if the preset condition is that the rate of the profit value corresponding to the candidate region to the estimated travel time is greater than a predetermined threshold 30, the geographic region Q1 and the geographic region Q2 may be both determined as recommended regions for looking for service requests. In this situation, the geographic regions may be ranked based on the rates of the profit value to the estimated travel time from high to low, such as from 60 to 40. Accordingly, recommendation information for looking for service requests including the recommended geographic region Q1 and the recommended geographic region Q2 may be generated, in which information associated with the region Q1 may be placed in a front position, which may be convenient to be viewed by the driver.

According to some embodiments illustrated in FIG. 30, if it is determined that the profit value of the geographic region Q0 where the driver locates is 20 in 0.3 hours and the rate of the profit value 20 to the preset time period is 66.66, which is greater than the predetermined condition 50, the geographic region Q0 may be determined as a recommendation region for looking for service requests, recommendation information for looking for service requests including the geographic region Q0 may be generated, and the driver may be suggested to continue looking for service requests in the geographic region Q0.

Figure 31:
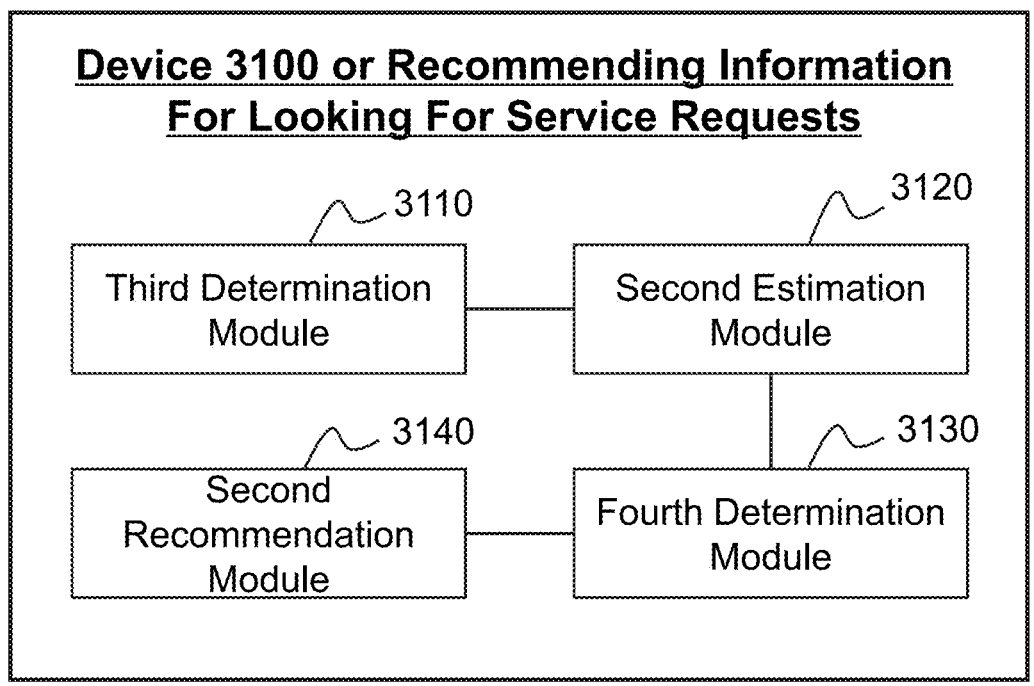
FIG. 31 is a block diagram illustrating an exemplary device for recommending information for looking for service requests according to some embodiments of the present disclosure.

FIG. 31 is a block diagram illustrating an exemplary device for recommending information for looking for service requests according to some embodiments of the present disclosure. The device 3100 for recommending information for looking for service requests may include a third determination module 3110, a second estimation module 3120, a fourth determination module 3130, and a second recommendation module 3140. In some embodiments, the device 3100 may be integrated into the server 110. For example, the device 3100 may be integrated into the processing engine 112.

The third determination module 3110 may be configured to determine a candidate region where an available service provider locates based on the location of the available service provider.

In some embodiments of the present disclosure, an area may be geographically divided into N geographical regions, each geographical region corresponding to a certain range of geographical coordinates. In some embodiments, the location of an available service provider (i.e., a driver of transport capacity scheduling) may be obtained based on Global Positioning System (GPS) data received from a user terminal associated with the available service provider. After the location of the available service provider is determined, the geographic region where the available service provider locates may be determined. Any one of the (N−1) geographic regions other than the geographical region where the available service provider locates may be determined as the above-described candidate region.

The second estimation module 3120 may be configured to estimate a profit value if the available service provider stays in the candidate region and is allocated a service request within a preset time period based on transaction data associated with transport capacity scheduling of the candidate region.

In some embodiments, the preset time period may be a time period from a current time point to a future time point, such as 0.5 hours from the current time point.

In some embodiments, a probability that the available service provider is allocated a service request if the available service provider stays in the candidate region and a service fee of the service request allocated to the available service provider within a preset time period may be determined based on the transaction data associated with transport capacity scheduling of the candidate region. A product of the probability and the service fee may be determined, and the product may be determined as the profit value if the available service provider stays in the candidate region and is allocated a service request. More descriptions of the determination of the probability and the service fee may be found elsewhere in the present disclosure (e.g., FIG. 28 and the description thereof).

In some embodiments of the present disclosure, since the available service provider locates in the candidate region, the travel cost during the process for looking for service requests may be negligible.

The fourth determination module 3130 may be configured to determine the candidate region as a recommendation region for looking for service requests based on a result of the determination that a rate of the profit value to the preset time period satisfies a preset condition. More descriptions of the preset condition may be found elsewhere in the present disclosure (e.g., FIG. 26 and the description thereof).

The second recommendation module 3140 may be configured to generate and transmit recommendation information for looking for service requests to a user terminal associated with the available service provider based on the recommendation region.

In some embodiments, the recommendation information for looking for service requests may include region information of the recommendation region for looking for service requests, the profit value of the recommendation region for looking for service requests, the travel cost from the location of the available service provider to the recommendation region for looking for service requests, the estimated travel time from the location of the available service provider to the recommendation region for looking for service requests, or the like, or a combination thereof. The recommendation information for looking for service requests may also include information that suggests the available service provider to go a certain candidate region to receive service requests, etc.

The modules in the device 3100 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

The present disclosure may also provide a third computer storage medium including third instructions. When executing by at least one processor, the third instructions may direct the at least one processor to perform a process (e.g., process 3200, process 3300) described elsewhere in the present disclosure.

Figure 32:
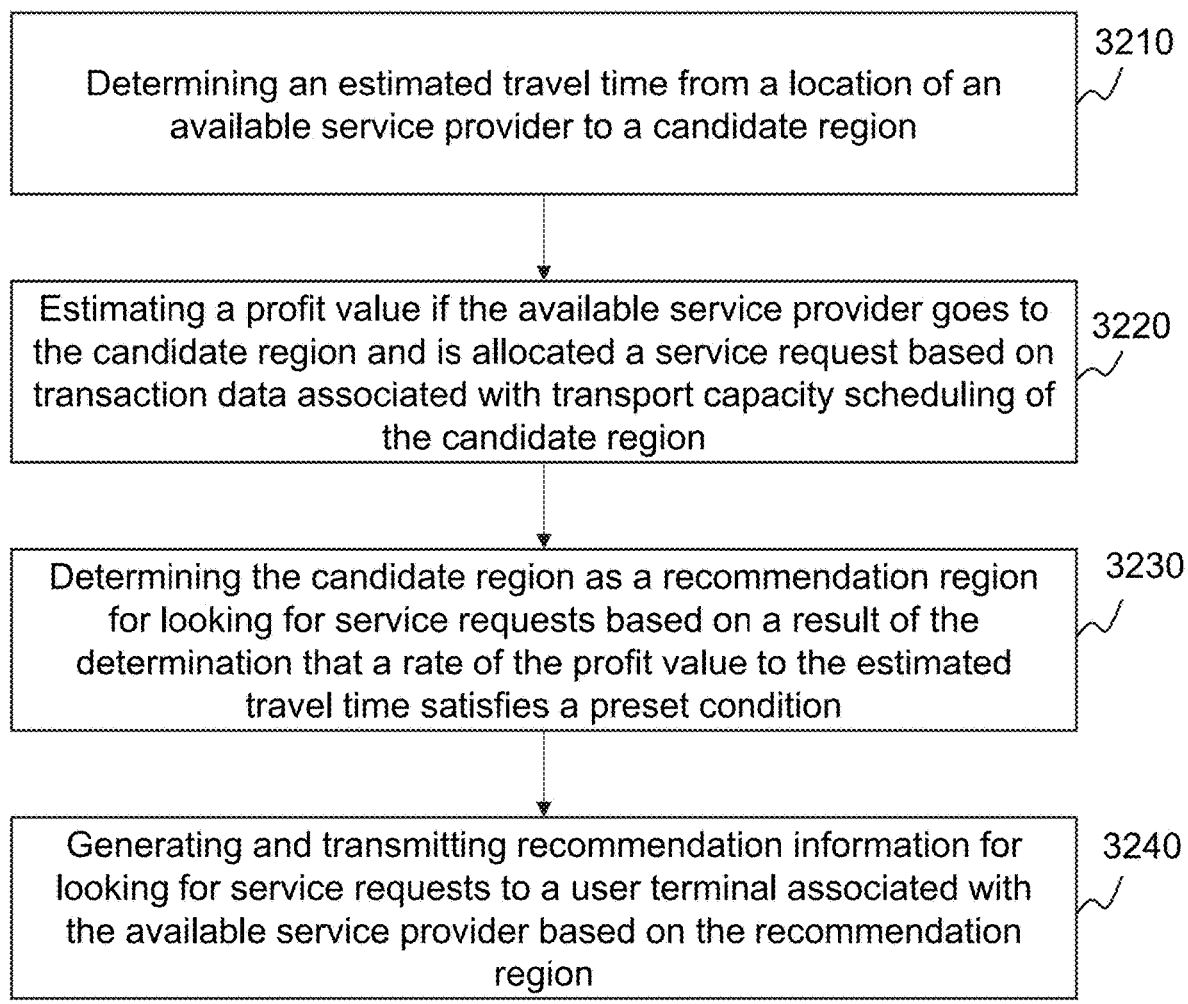
FIG. 32 is a flowchart illustrating an exemplary process for transport capacity scheduling according to some embodiments of the present disclosure.

FIG. 32 is a flowchart illustrating an exemplary process for transport capacity scheduling according to some embodiments of the present disclosure. The process 3200 may be executed by the on-demand service system 100. For example, the process 3200 may be implemented as a set of instructions (e.g., an application) stored in the storage ROM 230 or RAM 240. The processor 220 and/or the modules and/or units in FIGS. 26-29 may execute the set of instructions, and when executing the instructions, the processor 220, the modules, and/or the units may be configured to perform the process 3200. The operations of the illustrated process presented below are intended to be illustrative. In some embodiments, the process 3200 may be accomplished with one or more additional operations not described and/or without one or more of the operations discussed. Additionally, the order in which the operations of the process as illustrated in FIG. 32 and described below is not intended to be limiting.

In 3210, an estimated travel time from the location of an available service provider to a candidate region may be determined.

In some embodiments of the present disclosure, an area may be geographically divided into N geographical regions, each geographical region corresponding to a certain range of geographical coordinates. In some embodiments, the location of an available service provider (i.e., a driver associated with transport capacity scheduling) may be obtained based on Global Positioning System (GPS) data received from a user terminal (e.g., the provider terminal 140) associated with the available service provider. In some embodiments, the GPS data may be determined by a GPS chipset of the user terminal. After the location of the available service provider is determined, the geographic region where the available service provider locates may be determined. Any one of the (N−1) geographic regions other than the geographical region where the available service provider locates may be determined as the above-described candidate region.

After the location of the available service provider is located, the travel distance from the location of the available service provider to the candidate region may be determined based on the coordinate of the location of the available service provider and the coordinate range of the candidate region. In some embodiments of the present disclosure, the term "a travel distance from the location of the available service provider to the candidate region" refers to the travel distance from the location of the available service provider to the center point of the candidate region, or the travel distance from the location of the available service provider to any point in the candidate region (such as the point nearest to the location of the available service provider), and the travel distance refers to the length of a planned navigation path. Finally, an estimated travel time T from the location of the available service provider to the candidate region may be determined based on the travel distance and an estimated travel speed of the available service provider.

In some alternative embodiments, the determining the estimated travel time from the location of an available service provider to a candidate region may include the following operations. The estimated travel time from the location of the available service provider to the candidate region may be determined in response to a request for looking for service requests initiated by the available service provider. As described above, the available service provider may initiate a request for looking for service requests to a transport capacity scheduling server (e.g., the server 110) via a user terminal (e.g., the provider terminal 140), wherein the request for looking for service requests may be generated based on an operation of looking for service requests performed by the available service provider on the user terminal. After the transport capacity scheduling server receives the request for looking for service requests from the available service provider, the estimated travel time from the location of the available service provider to the candidate region may de determined based on the operation of looking for service requests corresponding to the request for looking for service requests.

In some alternative embodiments, before determining the estimated travel time from the location of an available service provider to a candidate region, the method may further include the following operations. A message reminding the available service provider to transmit the request for looking for service requests to the system in response to a detection that a time period within which the available service provider is waiting for receiving service requests is larger than a predetermined time threshold (e.g., 10 minutes) before the estimated travel time from the location of the available service provider to the candidate region is determined in response to a request for looking for service requests initiated by the available service provider. The predetermined time threshold may be set according to the actual application, and the present disclosure is not intended to be limiting. For example, when the transport capacity scheduling server detects that no service request is allocated to an available service provider for a long time, the transport capacity scheduling server may push interface information for reminding the available service provider to look for service requests to the user terminal, so as to improve the efficiency in looking for service requests of the available service provider.

In 3220, a profit value if the available service provider goes to the candidate region and is allocated a service request may be estimated based on transaction data associated with transport capacity scheduling of the candidate region.

The transaction data associated with transport capacity scheduling of the candidate region may be various types of transaction data generated based on service requests associated with transport capacity scheduling in the candidate region, such as historical data of service requests associated with transport capacity scheduling, including but not limited to historical data within various historical time periods, for example, the number count of service requests associated with transport capacity scheduling, an average service fee, the number count of available service providers, a transport capacity shortage, etc.

In some alternative embodiments, operation 3220 may include operation 3201 and operation 3202.

In 3201, a probability that the available service provider is allocated a service request if the available service provider arrives in the candidate region and a service fee of the service request allocated to the available service provider may be determined based on the transaction data associated with transport capacity scheduling of the candidate region.

In some alternative embodiments, an average service fee of service requests in the candidate region may be determined as the service fee of the service request allocated to the available service provider.

In some alternative embodiments, a service fee with the highest occurrence frequency may be obtained from a plurality of historical service fees based on the transaction data associated with transport capacity scheduling of the candidate region and may be determined as the service fee of the service request allocated to the available service provider.

In some alternative embodiments, the distribution of a plurality of historical service fees in the candidate region may be obtained based on the transaction data associated with transport capacity scheduling of the candidate region, and a specific service fee interval within which the number count of historical service fees is maximum among a plurality of service fee intervals may be identified and determined as the service fee of the service request allocated to the available service provider.

In some alternative embodiments, operation 3201 may include operation 3211, operation 3221, and operation 3231.

In 3211, a prediction time period may be determined based on the estimated travel time.

In some embodiments, the prediction time period may be a time period before an estimated time point at which the available service provider arrives in the candidate region according to the estimated travel time or a time period after the estimated time point. For example, if the estimated time point at which the available service provider arrives in the candidate region is 10:00 a.m. on M day, the prediction time period may be determined as an hour from 10:00 a.m. to 11:00 a.m. on M day.

In 3221, a transport capacity shortage of the candidate region and the number count of available service providers in the candidate region within the prediction time period may be determined based on the transaction data associated with transport capacity scheduling of the candidate region.

In some embodiments of the present disclosure, the transport capacity shortage and the number count of available service providers may be predicted based on transaction data associated with transport capacity scheduling in at least one historical time period corresponding to the prediction time period.

In some embodiments, an average transport capacity shortage of the candidate region and an average number count of available service providers in the candidate region may be predicted based on transaction data associated with transport capacity scheduling in the at least one historical time period corresponding to the prediction time period, and further the transport capacity shortage of the candidate region and the number count of available service providers in the candidate region within the prediction time period may be determined. For example, if the determined prediction time period is 10:00 a.m. to 11:00 a.m. on M day based on the estimated travel time, the average transport capacity shortage of the candidate region and the average number count of available service providers in the candidate region may be determined based on service request information in a candidate region Q between 10:00 a.m. to 11:00 a.m. in K days before M day and the number count of days "K", and the average transport capacity shortage and the average number count of available service providers may be determined as the transport capacity shortage of the candidate region and the number count of available service providers in the candidate region within the prediction time period, respectively. In addition, the transport capacity shortage and the number count of available service providers in the prediction time period may be determined based on transaction data associated with transport capacity scheduling in any other historical time period equal to the prediction time period.

In 3231, the rate of the transport capacity shortage to the number count of available service providers may be determined and the rate may be determined as the probability that the available service provider is allocated a service request in the candidate region.

According to the above example, if it is determined that the transport capacity shortage in the candidate region Q is 100 and the number count of available service providers is 200 between 10:00 a.m. to 11:00 a.m. on M day, the probability that the available service provider is allocated a service request in the candidate region Q may be determined as 100/200 (i.e., 0.5).

It should be noted that the probability that the available service provider is allocated a service request may also be affected by a credit score or a rating of the available service provider. For example, for a specific candidate region, for an available service provider with a relatively good credit score or a relatively high rating, the probability that he or she is allocated a service request is relatively high; whereas for an available service provider with a relatively bad credit score or a relatively low rating, the probability that he or she is allocated a service request is relatively low. As used herein, the credit score or the rating of the available service provider may be determined based on a plurality of factors such as the number count of historical service transactions, the number count of refuses for providing services, a taxi-hailing service quality, timeliness information associated with delivering passengers to destinations, evaluation information provided by the passengers, or the like, or a combination thereof. Since the process for determining the credit score or the rating of the available service provider is apparent to those skilled in the art, it is not described in detail herein.

In some alternative embodiments, the transport capacity scheduling server may provide a priority to an available service provider with a relatively good credit score or a relatively high rating in the candidate region, so that for the available service provider with a relatively good credit score or a relatively high rating, the probability that he or she is allocated a service request may be higher than the rate of the transport capacity shortage to the number count of available service providers, whereas, for the available service provider with a relatively bad credit score or a relatively low rating, the probability that he or she is allocated a service request may be lower than the rate of the transport capacity shortage to the number count of available service providers. For example, if it is determined that an average probability that an available service provider is allocated a service request in a candidate region is 0.5, the probability that an available service provider with a relatively good credit score or a relatively high rating is allocated a service request may be higher than 0.5 (e.g., 0.8), whereas, the probability that an available service provider with a relatively bad credit score or a relatively low rating is allocated a service request may be lower than 0.5 (e.g., 0.3).

In 3202, a profit value if the available service provider goes to the candidate region and is allocated a service request may be determined based on the probability and the service fee.

In some embodiments, operation 3202 may include operation 3212, operation 3222, and operation 3232.

In 3212, a product of the probability that an available service provider is allocated a service request and a service fee of the service request may be determined.

In 3222, a travel cost of the available service provider travelling from the location of the available service provider to the candidate region may be determined.

In some embodiments, the location of the available service provider may be determined as a pick-up location, any point in the candidate region may be determined as a destination, and the travel cost may be determined based on a planned route according to the pick-up location and the destination.

In 3232, a difference value may be determined by subtracting the travel cost from the product and the difference value may be determined as the profit value if the available service provider goes to the candidate region and is allocated a service request.

In some alternative embodiments, operation 3202 may further include determining a probability that the available service provider is allocated a service request in the candidate region within a preset time period and a service fee of the service request allocated to the available service provider based on the transaction data associated with transport capacity scheduling of the candidate region. The product of the probability and the service fee may be calculated and the product may be determined as the profit value if the available service provider goes to the candidate region and is allocated a service request.

In some alternative embodiments, a service fee of a service request may be determined directly as the profit value if the available service provider goes to the candidate region and is allocated a service request. For example, if the available service provider is a VIP driver, the transport capacity scheduling server may allocate the service request to the driver preferentially, so that the probability that the VIP driver is allocated a service request may be regarded as 1.

In 3230, the candidate region may be determined as a recommendation region for looking for service requests based on a result of the determination that the rate of the profit value to the estimated travel time satisfies a preset condition.

In some embodiments, the preset condition may refer to that the rate of the profit value to the estimated travel time of the candidate region is in top N (N 1) of a descending ranking of the rate of the profit value to the estimated travel time of each candidate region.

In some alternative embodiments, the preset condition may refer to that the rate of the profit value to the estimated travel time of the candidate region is larger than a predetermined threshold.

In 3240, recommendation information for looking for service requests may be generated and transmitted to a user terminal associated with the available service provider based on the recommendation region.

In some embodiments, the recommendation information for looking for service requests may include region information of the recommendation region for looking for service requests, the profit value of the recommendation region for looking for service requests, the travel cost from the location of the available service provider to the recommendation region for looking for service requests, the estimated travel time from the location of the available service provider to the recommendation region for looking for service requests, or the like, or a combination thereof. The recommendation information for looking for service requests may also include information that suggests the available service provider go to a certain candidate region to receive service requests, etc.

In some embodiments, the determined one or more recommendation regions for looking for service requests may be ranked from high to low according to the rates of the profit value to the estimated travel time corresponding to the one or more recommendation regions, and the recommendation information for looking for service requests may be generated and transmitted to the user terminal associated with the available service provider based on the ranked one or more recommendation regions.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 33:
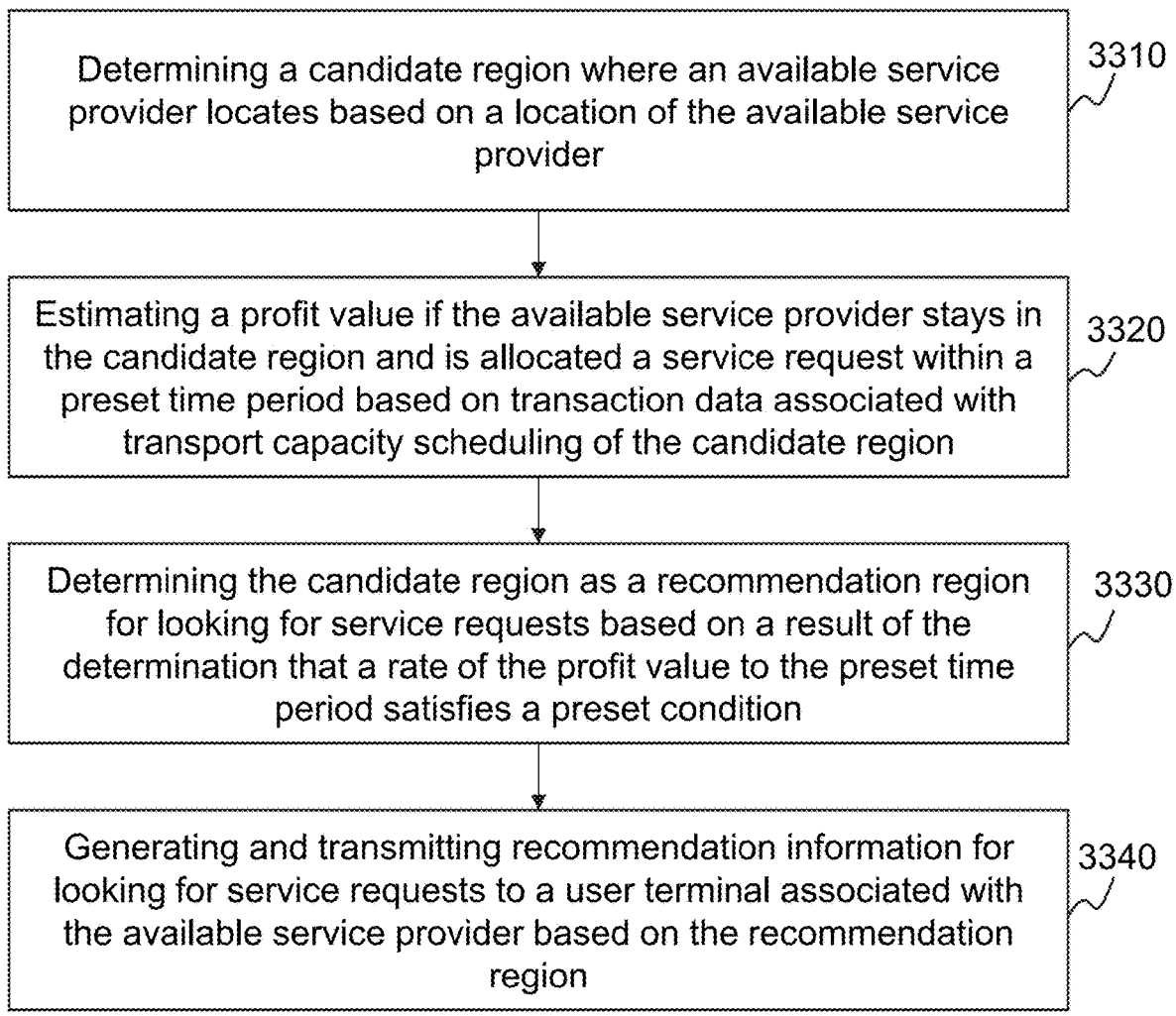
FIG. 33 is a flowchart illustrating an exemplary process for transport capacity scheduling according to some embodiments of the present disclosure.

FIG. 33 is a flowchart illustrating an exemplary process for transport capacity scheduling according to some embodiments of the present disclosure. The process 3300 may be executed by the on-demand service system 100. For example, the process 3300 may be implemented as a set of instructions (e.g., an application) stored in the storage ROM 230 or RAM 240. The processor 220 and/or the modules in FIG. 31 may execute the set of instructions, and when executing the instructions, the processor 220 and/or the modules may be configured to perform the process 3300. The operations of the illustrated process presented below are intended to be illustrative. In some embodiments, the process 3300 may be accomplished with one or more additional operations not described and/or without one or more of the operations discussed. Additionally, the order in which the operations of the process as illustrated in FIG. 33 and described below is not intended to be limiting.

In 3310, a candidate region where an available service provider locates may be determined based on a location of the available service provider.

In some embodiments of the present disclosure, an area may be geographically divided into N geographical regions, each geographical region corresponding to a certain range of geographical coordinates. In some embodiments, the location of an available service provider (i.e., a driver of transport capacity scheduling) may be obtained based on Global Positioning System (GPS) data received from a user terminal associated with the available service provider. After the location of the available service provider is determined, the geographic region where the available service provider locates may be determined. Any one of the (N−1) geographic regions other than the geographical region where the available service provider locates may be determined as the above-described candidate region.

In 3320, a profit value if the available service provider stays in the candidate region and is allocated a service request within a preset time period may be estimated based on transaction data associated with transport capacity scheduling of the candidate region.

In some embodiments, the preset time period may be a time period from a current time point to a future time point, such as 0.5 hours from the current time point.

In some embodiments, a probability that the available service provider is allocated a service request if the available service provider stays in the candidate region and a service fee of the service request allocated to the available service provider within a preset time period may be determined based on the transaction data associated with transport capacity scheduling of the candidate region. A product of the probability and the service fee may be determined, and the product may be determined as the profit value if the available service provider stays in the candidate region and is allocated a service request. More descriptions of the determination of the probability and the service fee may be found elsewhere in the present disclosure (e.g., operation 3201 and the description thereof).

In some embodiments of the present disclosure, since the available service provider locates in the candidate region, the travel cost during the process for looking for service requests may be negligible.

In 3330, the candidate region may be determined as a recommendation region for looking for service requests based on a result of the determination that a rate of the profit value to the preset time period satisfies a preset condition. More descriptions of the preset condition may be found elsewhere in the present disclosure (e.g., FIG. 26 and the description thereof).

In 3340, recommendation information for looking for service requests may be generated and transmitted to a user terminal associated with the available service provider based on the recommendation region.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 34:
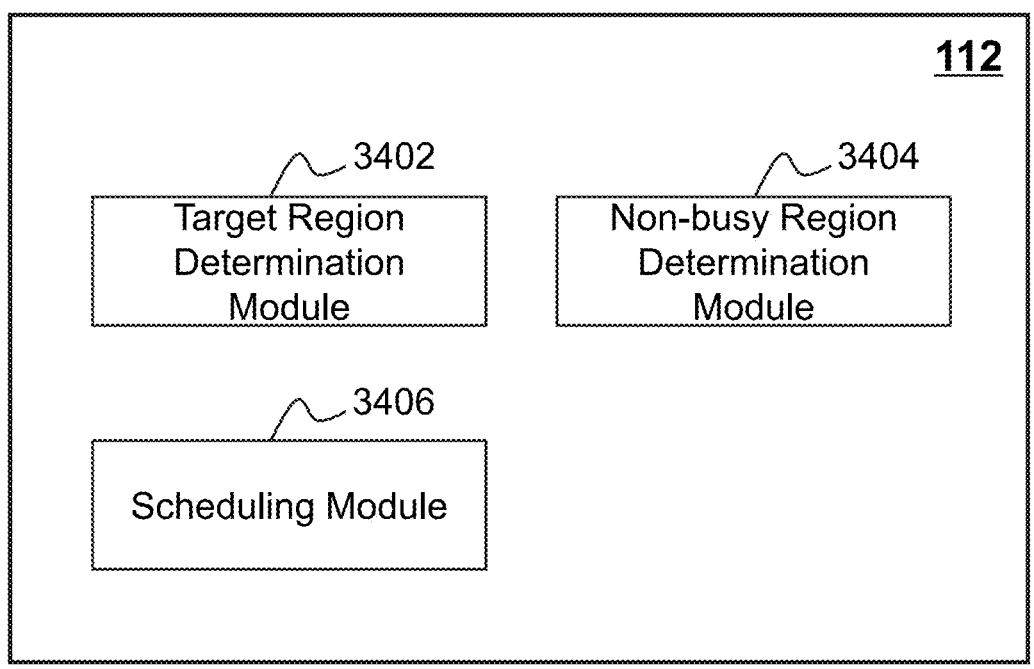
FIG. 34 is a block diagram illustrating an exemplary processing engine according to some embodiments of the present disclosure.

FIG. 34 is a block diagram illustrating an exemplary processing engine according to some embodiments of the present disclosure. The processing engine 112 may include a target region determination module 3402, a non-busy region determination module 3404, and a scheduling module 3406.

The target region determination module 3402 may be configured to determine a target region, wherein a plurality of service requests that satisfy a preset condition initiate from the target region. The plurality of service requests may be initiated via a plurality of user terminals associated with a plurality of service requesters. As used herein, the preset condition may be associated with a transport capacity of the target region. As described elsewhere in the present disclosure, the transport capacity may be associated with the number count of available service providers in the target region and the number count of service requests to be allocated in the target region. In some embodiments, the preset condition may be that the number count of available service providers in the target region is less than the number count of the plurality of service requests initiated from the target region.

The non-busy region determination module 3404 may be configured to determine a non-busy region based on information of the target region, the non-busy region including one or more available service providers that are free to accept a service request. In some embodiments, as described in connection with FIG. 7, the non-busy region determination module 3404 may determine the non-busy region based on the boundary (e.g., the rectangle boundary) of the target region. In some embodiments, as described in connection with FIG. 18, the non-busy region determination module 3404 may randomly select a candidate region near the target region as the non-busy region. As used herein, "near" refers to that the distance between the center point of the candidate region and the center point of the target region is less than a distance threshold.

The scheduling module 3406 may be configured to transmit a scheduling instruction associated with the plurality of service requests to a user terminal associated with at least one of the one or more available service providers in the non-busy region via a network. The scheduling instruction may include information inquiring whether the at least one of the one or more available service providers in the non-busy region agrees to go to the target region, wherein at least portion of the scheduling instruction is displayed via a graphic user interface of an application executed by the user terminal.

The modules in the processing engine 112 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units.

Figure 35:
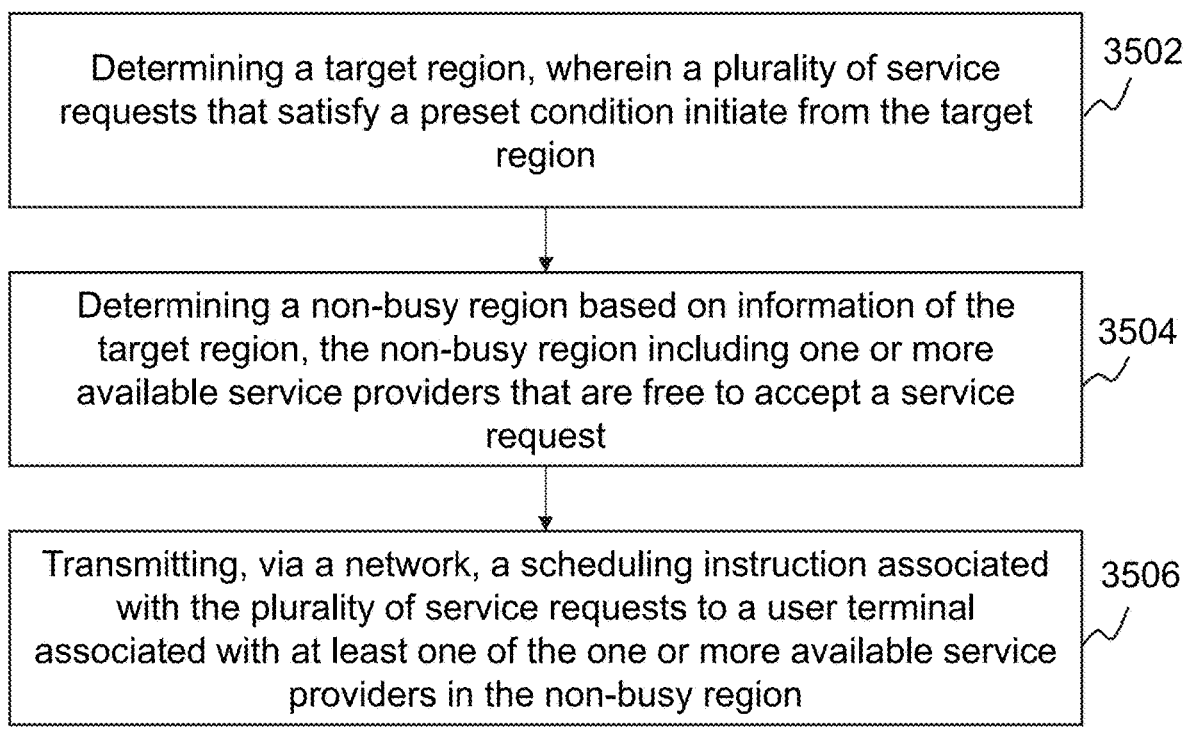
FIG. 35 is a flowchart illustrating an exemplary process for transport capacity scheduling according to some embodiments of the present disclosure.

FIG. 35 is a flowchart illustrating an exemplary process for transport capacity scheduling according to some embodiments of the present disclosure. The process 3500 may be executed by the on-demand service system 100. For example, the process 3500 may be implemented as a set of instructions (e.g., an application) stored in the storage ROM 230 or RAM 240. The processor 220 and/or modules in the FIG. 34 may execute the set of instructions, and when executing the instructions, the processor 220 and/or the modules may be configured to perform the process 3500. The operations of the illustrated process presented below are intended to be illustrative. In some embodiments, the process 3500 may be accomplished with one or more additional operations not described and/or without one or more of the operations discussed. Additionally, the order in which the operations of the process as illustrated in FIG. 35 and described below is not intended to be limiting.

In 3502, the processing engine 112 (e.g., the target region determination module 3402) (e.g., the processing circuits of the processor 220) may determine a target region, wherein a plurality of service requests that satisfy a preset condition initiate from the target region. The plurality of service requests may be initiated via a plurality of user terminals (e.g., requester terminals 130) associated with a plurality of service requesters. As used herein, the preset condition may be associated with a transport capacity of the target region. As described elsewhere in the present disclosure, the transport capacity may be associated with the number count of available service providers in the target region and the number count of service requests to be allocated in the target region. In some embodiments, the preset condition may be that the number count of available service providers in the target region is less than the number count of the plurality of service requests initiated from the target region.

In some embodiments, in order to determine the target region, the processing engine 112 may divide a predetermined area (e.g., a city, a district, a geographic region) into a plurality of candidate regions based on a target radius and a target service request number by using a clustering algorithm (e.g., a Dbscan algorithm). In some embodiments, the processing engine 112 may divide the predetermined area into a plurality of candidate regions based on the distribution of buildings in the predetermined area. Further, the processing engine 112 may select the target region from the plurality of candidate regions based on one or more parameters associated with transport capacity. More descriptions of the division of the area may be found elsewhere in the present disclosure (e.g., FIGS. 4-9, 18-19, and the descriptions thereof).

Take a specific candidate region as an example, as described in connection with FIGS. 6-9; the processing engine 112 may determine whether the allocation rate of the candidate region is less than an allocation rate threshold (e.g., the predetermined allocation rate). According to a result of the determination that the allocation rate is less than the allocation rate threshold, the processing engine 112 may determine whether the ratio of the number count of available service providers in the candidate region to the number count of service requests to be allocated in the candidate region is less than a ratio threshold (e.g., the estimated ratio of the number count of available service providers to the number count of service requests to be allocated). According to a result of the determination that the ratio of the number count of available service providers in the candidate region to the number count of service requests to be allocated in the candidate region is less than the ratio threshold, the processing engine 112 may determine the candidate region as the target region.

Also take the specific candidate region as an example, as described in connection with FIG. 18; the processing engine 112 may identify a region which lacks service providers from the plurality of candidate regions as the target region. As used herein, the term "lacks service providers" refers to that the ratio of the number count of available service providers in the region to the number count of service requests to be allocated in the region is less than a predetermined threshold or the number count of available service providers in the region is less than the number count of service requests to be allocated in the region.

In 3504, the processing engine 112 (e.g., the non-busy region determination module 3404) (e.g., the processing circuits of the processor 220) may determine a non-busy region based on the information of the target region, the non-busy region including one or more available service providers that are free to accept a service request.

In some embodiments, as described in connection with FIG. 7, the processing engine 112 may determine the non-busy region based on the boundary (e.g., the rectangle boundary) of the target region. The processing engine 112 may obtain an expansion parameter associated with the target region and determine a modified boundary (e.g., the new boundary) based on the expansion parameter. Further, the processing engine 112 may determine the non-busy region based on the modified boundary. For example, the processing engine 112 may determine a region difference between the modified boundary and the boundary of the target region and determine the region difference as the non-busy region. More descriptions may be found elsewhere in the present disclosure (e.g., FIG. 7 and the description thereof).

In some embodiments, the expansion parameter may be default settings of the on-demand service system 100 or may be adjustable under different situations. For example, during rush hours, the expansion parameter may be relatively large as one having ordinary skills would understand, whereas during non-rush hours, the expansion parameter may be relatively small as one having ordinary skills would understand. As another example, the expansion parameter may be negatively correlated with the ratio of the number count of available service providers to the number count of service requests to be allocated in the target region. The larger the ratio is, the smaller the expansion parameter may be; the smaller the ratio is, the larger the expansion parameter may be.

In some embodiments, as described in connection with FIG. 18, the processing engine 112 may randomly select a candidate region near the target region as the non-busy region. As used herein, "near" refers to that the distance between the center point of the candidate region and the center point of the target region is less than a distance threshold.

In 3506, the processing engine 112 (e.g., the scheduling module 3406) (e.g., the processing circuits of the processor 220) may transmit a scheduling instruction associated with the plurality of service requests to a user terminal (e.g., the provider terminal 140) associated with at least one of the one or more available service providers in the non-busy region via a network (e.g., the network 120). The scheduling instruction may include information inquiring whether the at least one of the one or more available service providers in the non-busy region agrees to go to the target region. The scheduling instruction may further include information such as a traffic condition associated with the target region, an estimated route from the location of the at least one of the one or more available service providers to the target region, etc.

In some embodiments, the scheduling instruction may be expressed in the format of a text, a chart, an image, audio, a video, or the like, or a combination thereof. In some embodiments, at least portion of the scheduling instruction may be displayed via a graphic user interface of an application executed by the user terminal (e.g., the provider terminal 140). For example, the user terminal may display an interface message including one or more user interface elements (e.g., a "confirmation" button, a "refuse" button) on the graphic user interface. As another example, the processing engine 112 may display the route from the location of the at least one of the one or more available service providers to the target region on the graphic user interface.

Further, in response to an acceptance of the scheduling instruction received from the user terminal associated with the at least one of the one or more available service providers in the non-busy region, the processing engine 112 may transmit the information (e.g., the start location, the destination) of at least one of the plurality of service requests to the user terminal associated with the at least one of the one or more available service providers in the non-busy region. In some embodiments, the start location of the at least one of the plurality of service requests may be the location of a user terminal (e.g., the requester terminal 130) associated with the at least one of the plurality of service requests, which may be determined according to GPS data transmitted by the requester terminal 130.

In some embodiments, as described in connection with FIG. 8, the processing engine 112 may identify a scheduling location (also referred to as a "core location") in the target region, wherein a service request density within a predetermined range (e.g., 100 m, 200 m, 500 m, 1 km) of the scheduling location is larger than a density threshold. As used herein, the service request density of a region refers to the rate of the number count of service requests in the region to an area of the region. The processing engine 112 may further determine the distance between the location of the at least one of the one or more available service providers and the scheduling location and determine whether the distance is less than a distance threshold. According to a result of the determination that the distance is less than the distance threshold, the processing engine 112 may transmit information (e.g., address information) of the scheduling location to the user terminal associated with the at least one of the one or more available service providers. More descriptions of the scheduling location may be found elsewhere in the present disclosure (e.g., FIG. 8 and the description thereof).

In some embodiments, as described in connection with FIG. 19, the processing engine 112 may determine a first time point at which the acceptance of the scheduling instruction is received from the user terminal of the at least one of the one or more available service providers in the non-busy region or a second time point at which the at least one of the one or more available service providers in the non-busy region arrives in the target region. The processing engine 112 may determine a service time period for the at least one of the one or more available service providers in the non-busy region based on a predetermined time period (e.g., the preset service time period) and at least one of the first time point or the second time point and transmit the information of the at least one of the plurality of service requests initiated from the target region to the user terminal associated with the at least one of the one or more available service providers in the non-busy region during the service time period. More descriptions of the service time period may be found elsewhere in the present disclosure (e.g., FIG. 19 and the description thereof).

In some embodiments, as described in connection with FIG. 19, the processing engine 112 may determine the time interval between the first time point (i.e., the time point at which the acceptance of the scheduling instruction is received) and the second time point (i.e., the time point at which the at least one of the one or more available service providers in the non-busy region arrives in the target region). The processing engine 112 may determine whether the time interval is less than a time interval threshold and transmit information indicative of a reward to the application executed by the user terminal associated with the at least one of the one or more available service providers in the non-busy region based on a result of the determination that the time interval is less than the time interval threshold. The reward may include a discount, a cash bonus, a voucher, etc.

In some embodiments, as described in connection with FIG. 19, the processing engine 112 may transmit the scheduling instruction to one or more user terminals associated with the one or more available service providers in the non-busy region and may receive one or more acceptances indicating that corresponding part of the one or more available service providers agree to go to the target region from the one or more user terminals of the one or more available service providers. The processing engine 112 may further determine whether the number count of the received one or more acceptances is larger than a predetermined threshold. According to a result of the determination that the number count of the one or more acceptances is larger than the predetermined threshold, the processing engine 112 may stop transmitting the scheduling instruction to the one or more user terminals associated with the one or more available service providers in the non-busy region.

In some embodiments, as described in connection with FIG. 32, the processing engine 112 may determine an estimated travel time from the location of the at least one of the one or more available service providers to the target region and a profit value associated with the at least one of the one or more available service providers if the at least one of the one or more available service providers arrives in the target region. The processing engine 112 may further determine whether the rate of the profit value to the estimated travel time is larger than a rate threshold. According to a result of the determination that the rate of the profit value to the estimated travel time is larger than the rate threshold, the processing engine 112 transmit the scheduling instruction associated with the plurality of service requests to the application executed by the user terminal associated with the at least one of the one or more available service providers. In some embodiments, the processing engine 112 may determine the profit value based on the travel cost of the at least one of the one or more available service providers travelling from the location of the at least one of the one or more available service providers to the target region, the probability that the at least one of the one or more available service providers is allocated a service request if the at least one of the one or more available service providers arrives in the target region, and/or a service fee of the service request allocated to the at least one of the one or more available service providers if the at least one of the one or more available service providers arrives in the target region. More descriptions may be found elsewhere in the present disclosure (e.g., FIG. 32 and the description thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 3500. In the storing operation, the processing engine 112 may store the target region, the number count of service providers, and/or the number count of the plurality of service requests in any storage device (e.g., the storage 150) disclosed elsewhere in the present disclosure.

Figure 36:
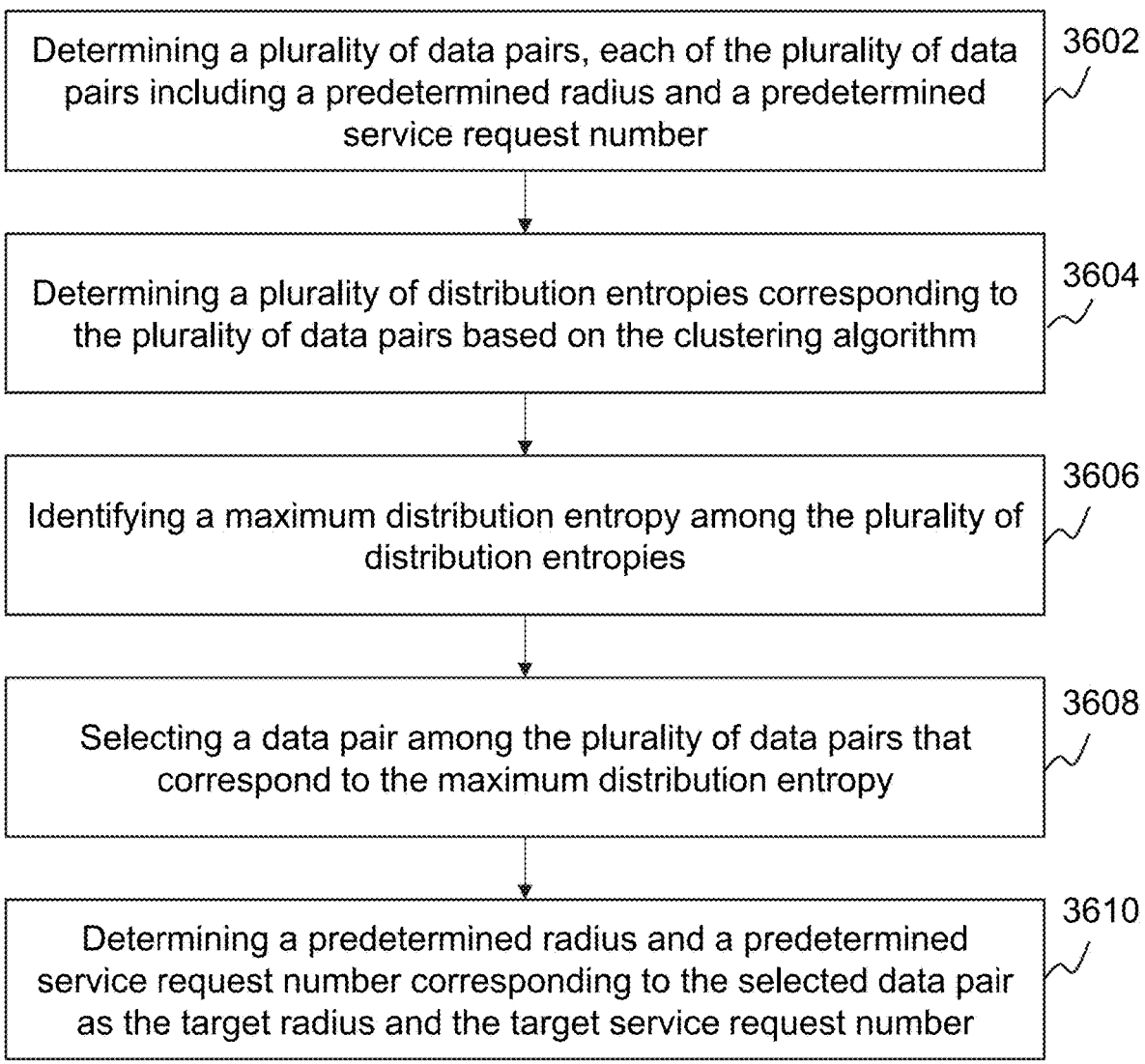
FIG. 36 is a flowchart illustrating an exemplary process for determining a target radius and a target service request number according to some embodiments of the present disclosure.

FIG. 36 is a flowchart illustrating an exemplary process for determining a target radius and a target service request number according to some embodiments of the present disclosure. The process 3600 may be executed by the on-demand service system 100. For example, the process 3600 may be implemented as a set of instructions (e.g., an application) stored in the storage ROM 230 or RAM 240. The processor 220 and/or the target region determination module 3402 may execute the set of instructions, and when executing the instructions, the processor 220 and/or the target region determination module 3402 may be configured to perform the process 3600. The operations of the illustrated process presented below are intended to be illustrative. In some embodiments, the process 3600 may be accomplished with one or more additional operations not described and/or without one or more of the operations discussed. Additionally, the order in which the operations of the process as illustrated in FIG. 36 and described below is not intended to be limiting. In some embodiments, operation 3502 of process 3500 may be performed based on the process 3600.

In 3602, the processing engine 112 (e.g., the target region determination module 3402) (e.g., the processing circuits of the processor 220) may determine a plurality of data pairs, each of the plurality of data pairs including a predetermined radius and a predetermined service request number. As used herein, the predetermined radius and the predetermined service request number refer to two parameters associated with a clustering operation (e.g., the Dbscan algorithm). As described elsewhere in the present disclosure, according to the Dbscan algorithm, an area may be divided into a plurality of regions based on the two parameters, each of the plurality of regions having a radius less than the predetermined radius and the number count of service requests in the region being larger than the predetermined service request number.

In some embodiments, the predetermined radius and the predetermined service request number in each data pairs may be default settings of the on-demand service system 100 or may be adjustable under different situations. Take a specific data pair as an example, as described in connection with FIGS. 15A-15D, the processing engine 112 may determine the predetermined radius and the predetermined service request number according to equation (4) and equation (5) respectively.

In 3604, the processing engine 112 (e.g., the target region determination module 3402) (e.g., the processing circuits of the processor 220) may determine a plurality of distribution entropies corresponding to the plurality of data pairs based on a clustering algorithm (e.g., the Dbscan algorithm). Take a specific data pair as an example, the processing engine 112 may determine a distribution entropy corresponding to the specific data pair according to equation (1).

In 3606, the processing engine 112 (e.g., the target region determination module 3402) (e.g., the processing circuits of the processor 220) may identify a maximum distribution entropy among the plurality of distribution entropies.

In 3608, the processing engine 112 (e.g., the target region determination module 3402) (e.g., the processing circuits of the processor 220) may select a data pair among the plurality of data pairs that corresponds to the maximum distribution entropy.

In 3610, the processing engine 112 (e.g., the target region determination module 3402) (e.g., the processing circuits of the processor 220) may determine a predetermined radius and a predetermined service request number corresponding to the selected data pair as the target radius and the target service request number.

More descriptions of the Dbscan algorithm and the distribution entropy may be found elsewhere in the present disclosure (e.g., FIGS. 15A-15D and the descriptions thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "some embodiments," and/or "some embodiments" mean that a particular feature, structure or characteristic described in connection with some embodiments is included in at least one embodiment of the present disclosure. Therefore, it is emphasized and should be appreciated that two or more references to "some embodiments," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for transport capacity scheduling, comprising:
at least one storage device including a set of instructions;
at least one processor in communication with the at least one storage device, wherein when executing the set of instructions, the at least one processor is configured to cause the system to:
   determine a target region, wherein a plurality of service requests that satisfy a preset condition initiate from the target region, the plurality of service requests being initiated via a plurality of user terminals associated with a plurality of service requesters;
   determine a non-busy region based on information of the target region, the non-busy region including one or more available service providers that are free to accept a service request; and
   transmit, via a network, a scheduling instruction associated with the plurality of service requests to a user terminal associated with at least one of the one or more available service providers in the non-busy region, the scheduling instruction including information inquiring whether the at least one of the one or more available service providers in the non-busy region agrees to go to the target region, wherein at least portion of the scheduling instruction is displayed via a graphic user interface of an application executed by the user terminal, wherein to determine the target region, the at least one processor is configured to cause the system further to:
      determine a target radius and a target service request number;
      divide a predetermined area into a plurality of candidate regions based on the target radius and the target service request number by using a clustering algorithm;
      for at least one of the plurality of candidate regions, determine whether an allocation rate is less than an allocation rate threshold;
      determine whether a ratio of a number count of available service providers in the candidate region to a number count of service requests to be allocated in the candidate region is less than a ratio threshold based on a result of the determination that the allocation rate is less than the allocation rate threshold; and
      determine the candidate region as the target region based on a result of the determination that the ratio of the number count of available service providers in the candidate region to the number count of service requests to be allocated in the candidate region is less than the ratio threshold,
      wherein to determine the target radius and the target service request number, the at least one processor is configured to cause the system further to:
         determine a plurality of data pairs, each of the plurality of data pairs including a predetermined radius and a predetermined service request number;
         determine a plurality of distribution entropies corresponding to the plurality of data pairs based on the clustering algorithm;
         identify a maximum distribution entropy among the plurality of distribution entropies;
         select a data pair among the plurality of data pairs that correspond to the maximum distribution entropy; and
         determine a predetermined radius and a predetermined service request number corresponding to the selected data pair as the target radius and the target service request number.

2. The system of claim 1, wherein to determine the non-busy region based on the information of the target region, the at least one processor is configured to cause the system further to:
   determine a boundary of the target region;
   obtain an expansion parameter associated with the target region;
   determine a modified boundary based on the expansion parameter; and
   determine the non-busy region based on the modified boundary.

3. The system of claim 1, wherein the at least one processor is configured to cause the system further to:
   in response to an acceptance of the scheduling instruction received from the user terminal associated with the at least one of the one or more available service providers in the non-busy region, transmit information of at least one of the plurality of service requests to the user terminal associated with the at least one of the one or more available service providers in the non-busy region, wherein
   the information of the at least one of the plurality of service requests transmitted to the user terminal associated with the at least one of the one or more available service providers in the non-busy region includes a location associated with the at least one of the plurality of service request, the location associated with the at least one of the plurality of service requests being determined according to GPS data transmitted by a user terminal associated with the at least one of the plurality of service requests.

4. The system of claim 3, wherein the at least one processor is configured to cause the system further to:
   transmit the scheduling instruction to one or more user terminals associated with the one or more available service providers in the non-busy region;

receive, from the one or more user terminals of the one or more available service providers, one or more acceptances indicating that corresponding part of the one or more available service providers agree to go to the target region;

determine a number count of the received one or more acceptances;

determine whether the number count of the one or more acceptances is larger than a predetermined threshold; and stop transmitting the scheduling instruction to the one or more user terminals associated with the one or more available service providers in the non-busy region based on a result of the determination that the number count of the one or more acceptances is larger than the predetermined threshold.

5. The system of claim 1, wherein the at least one processor is configured to cause the system further to:
determine a location of the at least one of the one or more available service providers in the non-busy region based on GPS (Global Positioning System) data received from the application executed by the user terminal associated with the at least one of the one or more available service providers, the GPS data being determined by a GPS chipset of the user terminal.

6. The system of claim 5, wherein the at least one processor is configured to cause the system further to:
identify a scheduling location in the target region, wherein a service request density within a predetermined range of the scheduling location is larger than a density threshold;
determine a distance between the location of the at least one of the one or more available service providers and the scheduling location;
determine whether the distance between the location of the at least one of the one or more available service providers and the scheduling location is less than a distance threshold; and
transmit information of the scheduling location to the user terminal associated with the at least one of the one or more available service providers based on a result of the determination that the distance between the location of the at least one of the one or more available service providers and the scheduling location is less than the distance threshold.

7. The system of claim 5, wherein to transmit the scheduling instruction associated with the plurality of service requests to the user terminal associated with the at least one of the one or more available service providers in the non-busy region, the at least one processor is configured to cause the system further to:
determine an estimated travel time from the location of the at least one of the one or more available service providers to the target region;
determine a profit value associated with the at least one of the one or more available service providers if the at least one of the one or more available service providers arrives in the target region;
determine whether a rate of the profit value to the estimated travel time is larger than a rate threshold; and
transmit the scheduling instruction associated with the plurality of service requests to the application executed by the user terminal associated with the at least one of the one or more available service providers based on a result of the determination that the rate of the profit value to the estimated travel time is larger than the rate threshold.

8. The system of claim 7, wherein to estimate the profit value associated with the at least one of the one or more available service providers, the at least one processor is configured to cause the system further to:
estimate a travel cost of the at least one of the one or more available service providers travelling from the location of the at least one of the one or more available service providers to the target region;
determine a probability that the at least one of the one or more available service providers is allocated a service request if the at least one of the one or more available service providers arrives in the target region;
estimate a service fee of the service request allocated to the at least one of the one or more available service providers if the at least one of the one or more available service providers arrives in the target region; and
estimate the profit value associated with the at least one of the one or more available service providers based on the travel cost, the probability, and the service fee.

9. The system of claim 8, wherein to determine the probability that the at least one of the one or more available service providers is allocated a service request if the at least one of the one or more available service providers arrives in the target region, the at least one processor is configured to cause the system further to:
determine a prediction time period based on the estimated travel time;
estimate a number count of service requests to be allocated in the target region and a number count of available service providers in the target region within the prediction time period; and
determine the probability that the at least one of the one or more available service providers is allocated a service request based on the number count of service requests to be allocated and the number count of available service providers.

10. A method implemented on a computing device having at least one processor, at least one storage device, and a communication platform connected to a network, the method comprising:
determining a target region, wherein a plurality of service requests that satisfy a preset condition initiate from the target region, the plurality of service requests being initiated via a plurality of user terminals associated with a plurality of service requesters;
determining a non-busy region based on information of the target region, the non-busy region including one or more available service providers that are free to accept a service request; and
transmitting, via a network, a scheduling instruction associated with the plurality of service requests to a user terminal associated with at least one of the one or more available service providers in the non-busy region, the scheduling instruction including information inquiring whether the at least one of the one or more available service providers in the non-busy region agrees to go to the target region, wherein at least portion of the scheduling instruction is displayed via a graphic user interface of an application executed by the user terminal, wherein the determining the target region includes:
determining a target radius and a target service request number;
dividing a predetermined area into a plurality of candidate regions based on the target radius and the target service request number by using a clustering algorithm;
for at least one of the plurality of candidate regions, determining whether an allocation rate is less than an allocation rate threshold;

determining whether a ratio of a number count of available service providers in the candidate region to a number count of service requests to be allocated in the candidate region is less than a ratio threshold based on a result of the determination that the allocation rate is less than the allocation rate threshold; and determining the candidate region as the target region based on a result of the determination that the ratio of the number count of available service providers in the candidate region to the number count of service requests to be allocated in the candidate region is less than the ratio threshold, wherein the determining the target radius and the target service request number includes:

determining a plurality of data pairs, each of the plurality of data pairs including a predetermined radius and a predetermined service request number;

determining a plurality of distribution entropies corresponding to the plurality of data pairs based on the clustering algorithm;

identifying a maximum distribution entropy among the plurality of distribution entropies;

selecting a data pair among the plurality of data pairs that correspond to the maximum distribution entropy; and determining a predetermined radius and a predetermined service request number corresponding to the selected data pair as the target radius and the target service request number.

11. The method of claim 10, wherein the determining the non-busy region based on the information of the target region includes:

determining a boundary of the target region;

obtaining an expansion parameter associated with the target region;

determining a modified boundary based on the expansion parameter; and determining the non-busy region based on the modified boundary.

12. The method of claim 10, wherein the method further includes:

in response to an acceptance of the scheduling instruction received from the user terminal associated with the at least one of the one or more available service providers in the non-busy region, transmitting information of at least one of the plurality of service requests to the user terminal associated with the at least one of the one or more available service providers in the non-busy region, wherein the information of the at least one of the plurality of service requests transmitted to the user terminal associated with the at least one of the one or more available service providers in the non-busy region includes a location associated with the at least one of the plurality of service request, the location associated with the at least one of the plurality of service requests being determined according to GPS data transmitted by a user terminal associated with the at least one of the plurality of service requests.

13. The method of claim 12, wherein the method further includes:

transmitting the scheduling instruction to one or more user terminals associated with the one or more available service providers in the non-busy region;

receiving, from the one or more user terminals of the one or more available service providers, one or more acceptances indicating that corresponding part of the one or more available service providers agree to go to the target region;

determining a number count of the received one or more acceptances;

determining whether the number count of the one or more acceptances is larger than a predetermined threshold; and stopping transmitting the scheduling instruction to the one or more user terminals associated with the one or more available service providers in the non-busy region based on a result of the determination that the number count of the one or more acceptances is larger than the predetermined threshold.

14. The method of claim 10, wherein the method further includes:

determining a location of the at least one of the one or more available service providers in the non-busy region based on GPS (Global Positioning System) data received from the application executed by the user terminal associated with the at least one of the one or more available service providers, the GPS data being determined by a GPS chipset of the user terminal.

15. The method of claim 14, wherein the method further includes:

identifying a scheduling location in the target region, wherein a service request density within a predetermined range of the scheduling location is larger than a density threshold;

determining a distance between the location of the at least one of the one or more available service providers and the scheduling location;

determining whether the distance between the location of the at least one of the one or more available service providers and the scheduling location is less than a distance threshold; and transmitting information of the scheduling location to the user terminal associated with the at least one of the one or more available service providers based on a result of the determination that the distance between the location of the at least one of the one or more available service providers and the scheduling location is less than the distance threshold.

16. The method of claim 14, wherein the transmitting the scheduling instruction associated with the plurality of service requests to the user terminal associated with the at least one of the one or more available service providers in the non-busy region includes:

determining an estimated travel time from the location of the at least one of the one or more available service providers to the target region;

determining a profit value associated with the at least one of the one or more available service providers if the at least one of the one or more available service providers arrives in the target region;

determining whether a rate of the profit value to the estimated travel time is larger than a rate threshold; and transmitting the scheduling instruction associated with the plurality of service requests to the application executed by the user terminal associated with the at least one of the one or more available service providers based on a result of the determination that the rate of the profit value to the estimated travel time is larger than the rate threshold.

17. The method of claim 16, wherein the estimating the profit value associated with the at least one of the one or more available service providers includes:
    estimating a travel cost of the at least one of the one or more available service providers travelling from the location of the at least one of the one or more available service providers to the target region;
    determining a probability that the at least one of the one or more available service providers is allocated a service request if the at least one of the one or more available service providers arrives in the target region;
    estimating a service fee of the service request allocated to the at least one of the one or more available service providers if the at least one of the one or more available service providers arrives in the target region; and
    estimating the profit value associated with the at least one of the one or more available service providers based on the travel cost, the probability, and the service fee.

18. The method of claim 17, wherein the determining the probability that the at least one of the one or more available service providers is allocated a service request if the at least one of the one or more available service providers arrives in the target region includes:
    determining a prediction time period based on the estimated travel time;
    estimating a number count of service requests to be allocated in the target region and a number count of available service providers in the target region within the prediction time period; and
    determining the probability that the at least one of the one or more available service providers is allocated a service request based on the number count of service requests to be allocated and the number count of available service providers.

19. A non-transitory computer readable medium, comprising a set of instructions for transport capacity scheduling, wherein when executed by at least one processor, the set of instructions directs the at least one processor to effectuate a method, the method comprising:
    determining a target region, wherein a plurality of service requests that satisfy a preset condition initiate from the target region, the plurality of service requests being initiated via a plurality of user terminals associated with a plurality of service requesters;
    determining a non-busy region based on information of the target region, the non-busy region including one or more available service providers that are free to accept a service request; and
    transmitting, via a network, a scheduling instruction associated with the plurality of service requests to a user terminal associated with at least one of the one or more available service providers in the non-busy region, the scheduling instruction including information inquiring whether the at least one of the one or more available service providers in the non-busy region agrees to go to the target region, wherein at least portion of the scheduling instruction is displayed via a graphic user interface of an application executed by the user terminal, wherein the determining the target region includes:
    determining a target radius and a target service request number;
    dividing a predetermined area into a plurality of candidate regions based on the target radius and the target service request number by using a clustering algorithm;
    for at least one of the plurality of candidate regions,
        determining whether an allocation rate is less than an allocation rate threshold;
        determining whether a ratio of a number count of available service providers in the candidate region to a number count of service requests to be allocated in the candidate region is less than a ratio threshold based on a result of the determination that the allocation rate is less than the allocation rate threshold; and
        determining the candidate region as the target region based on a result of the determination that the ratio of the number count of available service providers in the candidate region to the number count of service requests to be allocated in the candidate region is less than the ratio threshold,
    wherein the determining the target radius and the target service request number includes:
        determining a plurality of data pairs, each of the plurality of data pairs including a predetermined radius and a predetermined service request number;
        determining a plurality of distribution entropies corresponding to the plurality of data pairs based on the clustering algorithm;
        identifying a maximum distribution entropy among the plurality of distribution entropies;
        selecting a data pair among the plurality of data pairs that correspond to the maximum distribution entropy; and
        determining a predetermined radius and a predetermined service request number corresponding to the selected data pair as the target radius and the target service request number.

20. The non-transitory computer readable medium of claim 19, wherein the determining the non-busy region based on the information of the target region includes:
    determining a boundary of the target region;
    obtaining an expansion parameter associated with the target region;
    determining a modified boundary based on the expansion parameter; and
    determining the non-busy region based on the modified boundary.

* * * * *